US012653342B2

(12) United States Patent
Albrecht et al.

(10) Patent No.: US 12,653,342 B2
(45) Date of Patent: Jun. 16, 2026

(54) HOPPER LIGHTING FOR PELLET GRILLS

(71) Applicant: Weber-Stephen Products LLC, Palatine, IL (US)

(72) Inventors: Ethan Albrecht, Evanston, IL (US); Gregory J. Dykes, Elmhurst, IL (US)

( * ) Notice: Subject to any disclaimer, the term of this patent is extended or adjusted under 35 U.S.C. 154(b) by 368 days.

(21) Appl. No.: 18/393,288

(22) Filed: Dec. 21, 2023

(65) Prior Publication Data

US 2025/0204724 A1 Jun. 26, 2025

(51) Int. Cl.
*A47J 37/07* (2006.01)

(52) U.S. Cl.
CPC ......... *A47J 37/079* (2013.01); *A47J 37/0704* (2013.01)

(58) Field of Classification Search
CPC ..... A47J 37/0704; A47J 37/079; F24B 13/04; F24B 1/024
USPC ............. 126/73, 502, 25 B, 25 R; 110/101 C
See application file for complete search history.

(56) References Cited

U.S. PATENT DOCUMENTS

| | | | | |
|---|---|---|---|---|
| 6,039,470 | A | * | 3/2000 | Conwell ................. B01F 25/50 366/137 |
| 7,870,854 | B2 | | 1/2011 | Lau et al. |

| | | | | |
|---|---|---|---|---|
| 9,752,778 | B2 | | 9/2017 | Jones |
| 9,913,559 | B2 | * | 3/2018 | Polter ..................... A47J 37/07 |
| 11,248,800 | B2 | | 2/2022 | Donnelly et al. |
| 2020/0214503 | A1 | * | 7/2020 | Altenritter ............. F24B 13/04 |
| 2021/0196078 | A1 | | 7/2021 | Colston et al. |
| 2021/0338009 | A1 | | 11/2021 | Witzel et al. |
| 2021/0369004 | A1 | | 12/2021 | Iveson et al. |
| 2023/0095611 | A1 | | 3/2023 | Smith et al. |

OTHER PUBLICATIONS

"Traeger Pellet Sensor", accessed on Feb. 7, 2024 from https://www.traeger.com/accessories/traeger-pellet-sensor.
International Searching Authority, "International Search Report and Written Opinion," issued in connection with International Patent Application No. PCT/US2024/054648, mailed on Feb. 20, 2025, 9 pages.

* cited by examiner

*Primary Examiner* — Vivek K Shirsat
(74) *Attorney, Agent, or Firm* — Avantech Law, LLP

(57) ABSTRACT

Hopper lighting for pellet grills is disclosed. An example pellet grill includes a hopper, a lighting module, and a controller. The hopper includes a pellet fuel storage compartment. The pellet fuel storage compartment is configured to contain pellet fuel. The lighting module includes a light source. The light source is configured to display light into, onto, or across the pellet fuel storage compartment when the light source is activated. The controller is configured to activate the light source in response to detecting an occurrence of an activation triggering event.

21 Claims, 19 Drawing Sheets

SECTION A-A

FIRST COLOR OF LIGHT INDICATING FUEL LEVEL IS ABOVE FIRST THRESHOLD

SECOND COLOR OF LIGHT INDICATING FUEL LEVEL IS BELOW FIRST THRESHOLD AND ABOVE SECOND THRESHOLD

THIRD COLOR OF LIGHT INDICATING FUEL LEVEL IS BELOW SECOND THRESHOLD

FIRST COLOR OF LIGHT INDICATING FUEL LEVEL IS ABOVE FIRST THRESHOLD

SECOND COLOR OF LIGHT INDICATING FUEL LEVEL IS BELOW FIRST THRESHOLD AND ABOVE SECOND THRESHOLD

THIRD COLOR OF LIGHT INDICATING FUEL LEVEL IS BELOW SECOND THRESHOLD 1000
212
408  406  404  402
602
604
FIRST COLOR OF LIGHT INDICATING FUEL
LEVEL IS ABOVE FIRST THRESHOLD
SECOND COLOR OF LIGHT INDICATING FUEL
LEVEL IS BELOW FIRST THRESHOLD
AND ABOVE SECOND THRESHOLD
THIRD COLOR OF LIGHT INDICATING FUEL
LEVEL IS BELOW SECOND THRESHOLD
FIG. 10

ACTIVATE LIGHT SOURCE

1700

1702

DETERMINE FUEL LEVEL

1704

IS FUEL LEVEL ABOVE FIRST THRESHOLD?     NO

YES

1706

COMMAND LIGHT SOURCE TO DISPLAY FIRST COLOR

1708

IS FUEL LEVEL ABOVE SECOND THRESHOLD?     NO

YES

1710

COMMAND LIGHT SOURCE TO DISPLAY SECOND COLOR

1712

COMMAND LIGHT SOURCE TO DISPLAY THIRD COLOR

ACTIVATE LIGHT SOURCE

1800

1802

COMMAND LIGHT SOURCE TO DISPLAY COLOR

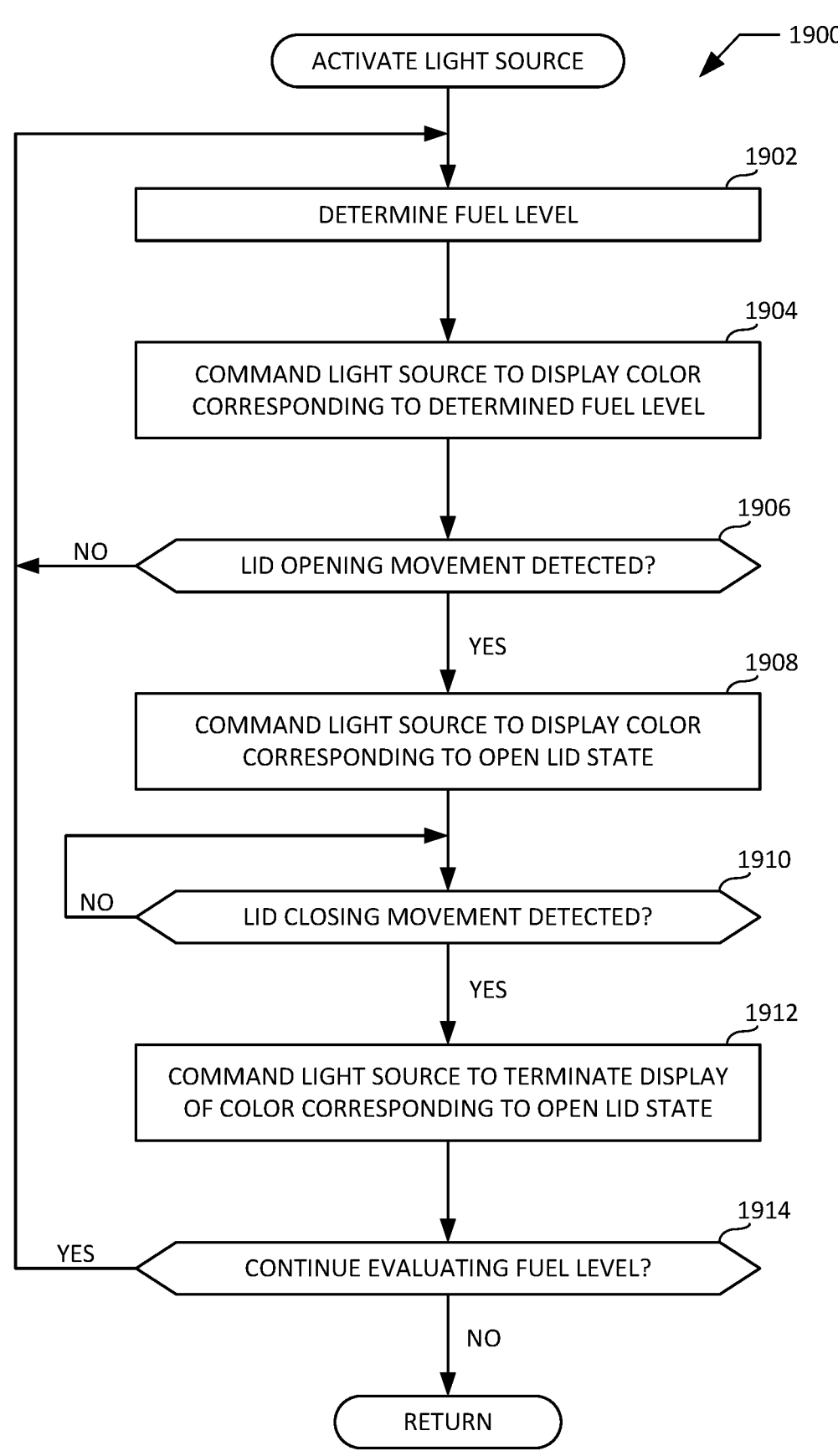

1900

ACTIVATE LIGHT SOURCE

1902

DETERMINE FUEL LEVEL

1904

COMMAND LIGHT SOURCE TO DISPLAY COLOR CORRESPONDING TO DETERMINED FUEL LEVEL

1906

NO ← LID OPENING MOVEMENT DETECTED?

YES

1908

COMMAND LIGHT SOURCE TO DISPLAY COLOR CORRESPONDING TO OPEN LID STATE

1910

NO ← LID CLOSING MOVEMENT DETECTED?

YES

1912

COMMAND LIGHT SOURCE TO TERMINATE DISPLAY OF COLOR CORRESPONDING TO OPEN LID STATE

1914

YES ← CONTINUE EVALUATING FUEL LEVEL?

NO

RETURN

FIG. 19

HOPPER LIGHTING FOR PELLET GRILLS

FIELD OF THE DISCLOSURE

This disclosure relates generally to pellet grills and, more specifically, to hopper lighting for pellet grills.

BACKGROUND

Pellet grills are electronically-controlled cooking devices that are configured to cook (e.g., smoke, grill, bake, roast, broil, sear, and/or otherwise heat) food items located within (e.g., placed on one or more cooking grate(s) positioned within) a cooking chamber of the pellet grill. The controllable electronic components of the pellet grill can be powered via AC power (e.g., supplied to the pellet grill via household electricity or wall power) or DC power (e.g., supplied via an on-board or connected battery and/or DC power supply).

Conventional pellet grills store a volume of combustible pellet fuel (e.g., wood-based pellets) in a hopper that is mounted and/or coupled to the pellet grill. A motor-driven auger in communication with an exit opening of the hopper feeds and/or supplies the pellet fuel from the hopper into a burn pot of the pellet grill in a controlled and/or automated manner. The speed, rate, and/or duty cycle of the auger is typically based on a user-selected temperature (e.g., a temperature setpoint) that is established and/or desired for the cooking chamber of the pellet grill. Pellet fuel that is deposited in the burn pot can initially be ignited via an ignitor (e.g., a DC-powered glow plug) of the pellet grill.

Combustion and/or burning of the pellet fuel within the burn pot produces, generates, and/or outputs heat which is subsequently distributed throughout the cooking chamber in a manner that causes the food items located within the cooking chamber to gradually become cooked. A motor-driven fan is typically implemented to assist with combusting the pellet fuel, and/or to assist with distributing and/or circulating heat (e.g., as may be produced by the combusted pellet fuel) throughout the cooking chamber.

Successful use of a pellet grill typically requires that the level and/or amount of pellet fuel contained in the hopper be checked and/or monitored from time to time to ensure that a sufficient volume of pellet fuel remains to the hopper to enable completion of one or more cooking operation(s) of the pellet grill. Inspection of the level and/or amount of pellet fuel remaining in the hopper is often performed manually (e.g., when a user of the pellet grill lifts a lid of the hopper and looks inside). Pellet grills are routinely used during hours of the day when daylight is lacking, which can make manual visualization of the level and/or amount of pellet fuel remaining in the hopper difficult. In the absence of adequate daylight, some form of auxiliary and/or supplemental lighting may be required for a user of the pellet grill to visually determine the level and/or amount of pellet fuel remaining in the hopper. In some instances, such auxiliary and/or supplemental lighting can be provided via an overhead hardwired light source (e.g., a patio, deck, or garage light). In other instances, such auxiliary and/or supplemental lighting can be provided via a user-controlled lighting instrument (e.g., a flashlight, a flash module of a smartphone, etc.).

BRIEF DESCRIPTION OF THE DRAWINGS

FIG. 10 is a side view of the hopper of FIGS. 4-6, 8, and 9, with the hopper implementing an example third lighting configuration.

FIG. 19 is a flowchart representative of example machine-readable instructions and/or example operations that may be executed by processor circuitry to implement a third lighting activation subroutine via the pellet grill of FIG. 1.

Figure 1:
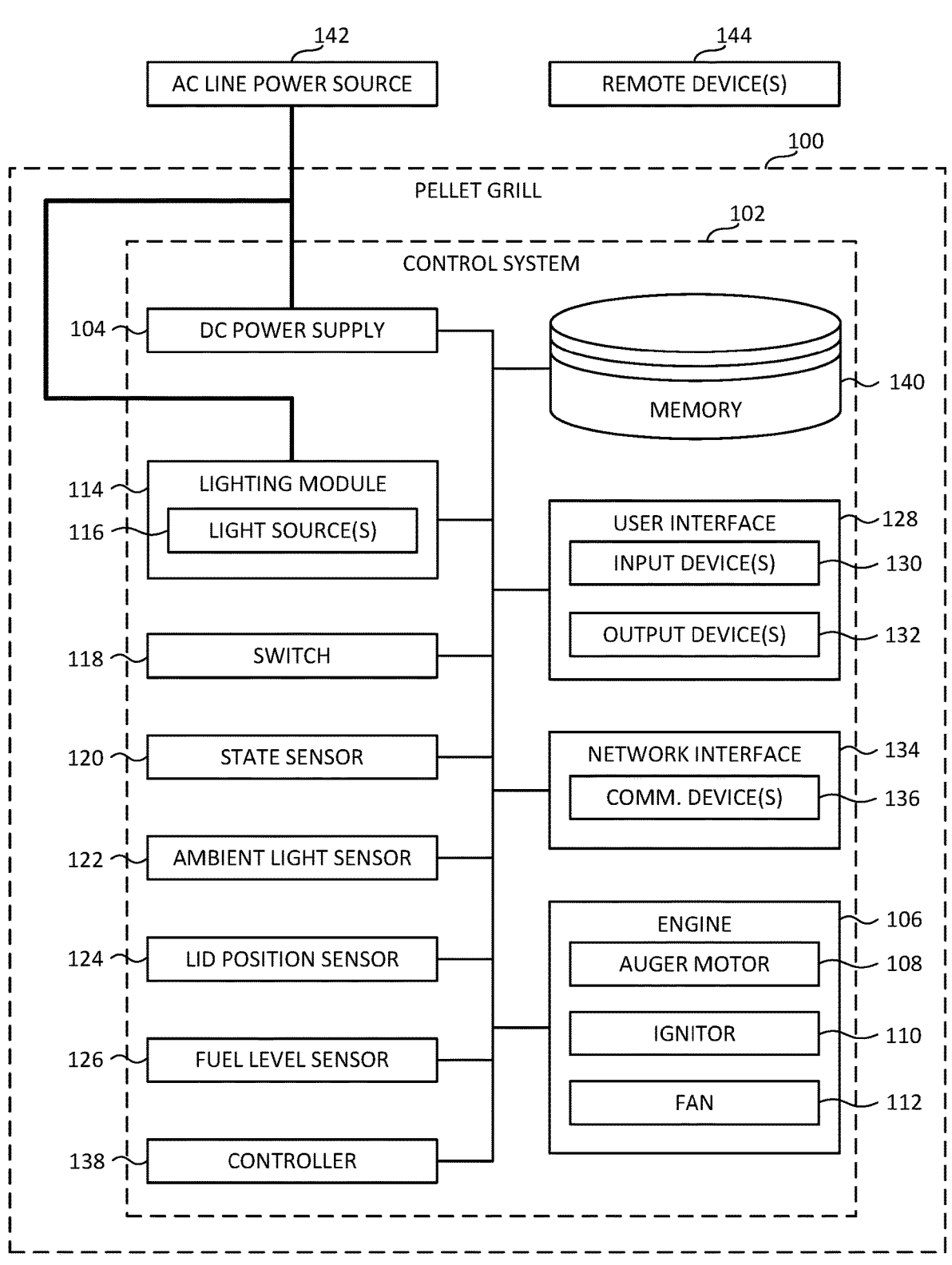
FIG. 1 is a block diagram of an example pellet grill constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

As discussed above, pellet grills are routinely used during hours of the day when daylight is lacking, which can make manual visualization of the level and/or amount of pellet fuel remaining in the hopper difficult. In the absence of adequate daylight, some form of auxiliary and/or supplemental lighting may be required for a user of the pellet grill to visually determine the level and/or amount of pellet fuel remaining in the hopper. In some instances, such auxiliary and/or supplemental lighting can be provided via an overhead hardwired light source (e.g., a patio, deck, or garage light). Such overhead hardwired light sources are not always available however, and, even when available, often have shortcomings with regard to adequately directing and/or focusing light into an interior portion of the hopper of the pellet grill. In other instances, such auxiliary and/or supplemental lighting can be provided via a user-controlled lighting instrument (e.g., a flashlight, a flash module of a smartphone, etc.). While such user-controlled lighting instruments have become relatively commonplace in terms of user availability, the use thereof disadvantageously occupies at least one hand of the user, which may in turn hamper the user's ability to perform one or more other desired operation(s) in relation to the pellet grill.

Unlike the known pellet grills described above, example pellet grills disclosed herein include controllable (e.g., automated) lighting located within the interior of the hopper of the pellet grill. In some disclosed examples, the pellet grill includes a hopper, a lighting module, and a controller. The hopper includes a pellet fuel storage compartment. The pellet fuel storage compartment is configured to contain pellet fuel. The lighting module includes a light source. The light source is configured to display light into, onto, or across the pellet fuel storage compartment when the light source is activated. In some disclosed examples, the controller is configured to activate the light source in response to detecting an occurrence of an activation triggering event. In some disclosed examples, detecting the occurrence of the activation triggering event includes: (1) determining that a control system of the pellet grill is in an ON state or that the control system has initiated a startup sequence; (2) determining that a switch of the pellet grill is in an ON state; (3) determining that a lighting activation request has been received via a user interface or a network interface of the pellet grill; (4) determining that an amount of ambient light detected around an exterior of the pellet grill is below an ambient light threshold; and/or (5) detecting a lid opening movement associated with a lid coupled to the hopper, wherein the lid is movable between a closed position to cover the pellet fuel storage compartment and an open position to provide access to the pellet fuel storage compartment.

In some disclosed examples, the controller is configured to deactivate the light source in response to detecting an occurrence of a deactivation triggering event. In some disclosed examples, detecting the occurrence of the deactivation triggering event includes: (1) determining that a control system of the pellet grill is in an OFF state or that the control system has initiated a shutdown sequence; (2) determining that a switch of the pellet grill is in an OFF state; (3) determining that a lighting deactivation request has been received via a user interface or a network interface of the pellet grill; (4) determining that an amount of ambient light detected around an exterior of the pellet grill is above an ambient light threshold; and/or (5) detecting a lid closing movement associated with a lid coupled to the hopper, wherein the lid is movable between a closed position to cover the pellet fuel storage compartment and an open position to provide access to the pellet fuel storage compartment.

In some disclosed examples, the controller, in connection with activating the light source, is further configured to compare a level of the pellet fuel contained in the pellet fuel storage compartment to a first fuel level threshold and/or a second fuel level threshold, wherein the second fuel level threshold is less than the first fuel level threshold. In response to determining that the level of the pellet fuel is above the first fuel level threshold, the controller is further configured to command the light source to display a first color of light (e.g., a shade of the color green). In response to determining that the level of the pellet fuel is below the first fuel level threshold and above the second fuel level threshold, the controller is further configured to command the light source to display a second color of light (e.g., a shade of the color yellow) different from the first color of light. In response to determining that the level of the pellet fuel is below the second fuel level threshold, the controller is further configured to command the light source to display a third color of light (e.g., a shade of the color red) different from the first color of light and different from the second color of light. In some disclosed examples, implementing a green-yellow-red color scheme in relation to the first color of light, the second color of light, and the third color of light displayed by the light source is advantageous in that it intuitively informs a user of the pellet grill as to the specific pellet fuel level status associated with the hopper of the pellet grill. In this regard, users of various objects implementing a green-yellow-red color scheme conventionally associate the color green with a high, positive, and/or healthy status, the color red with a low, negative, and/or unhealthy status, and the color yellow with a medium or intermediate status between that of green and red.

In some disclosed examples, the controller, in connection with activating the light source, is further configured to detect a lid opening movement associated with a lid coupled to the hopper, wherein the lid is movable between a closed position to cover the pellet fuel storage compartment and an open position to provide access to the pellet fuel storage compartment. In response to detecting the lid opening movement, the controller is further configured to command the light source to display a fourth color of light (e.g., a shade of the color white) different from the first color of light, the second color of light, and the third color of light. Projecting white light (e.g., bright white light) into, onto, and/or across the interior of the hopper (e.g., into, onto, and/or across the pellet fuel storage compartment of the hopper) when the lid of the hopper is open advantageously enhances a user's viewability of the interior of the hopper, which may be beneficial to the user when there is a need to add pellet fuel into the pellet fuel storage compartment of the hopper (e.g., to replace pellet fuel that an engine of the pellet grill has already consumed from the hopper).

In some disclosed examples, the lighting module of the pellet grill is located on and/or in the hopper of the pellet grill at a position that enables light generated by the light source of the lighting module to be projected into, onto, and/or across the pellet fuel storage compartment of the hopper. In some disclosed examples, the light source is a multicolor light-emitting diode (LED), such as a red-green-blue-white (RGBW) LED. In some disclosed examples, the pellet grill includes a fuel level sensor configured to detect the level of the pellet fuel. In some disclosed examples, the fuel level sensor of the pellet grill is located on and/or in hopper of the pellet grill at a position that enables the fuel level sensor to sense, measure, and/or detect the level or amount of pellet fuel present in the pellet fuel storage compartment of the hopper. In some disclosed examples, the fuel level sensor is an infrared sensor.

In some disclosed examples, the lighting module and the fuel level sensor of the pellet grill are respectively mounted on and/or otherwise located along one or more interior wall(s) of the hopper. For example, the lighting module and the fuel level sensor can both be mounted on and/or otherwise located along a front interior wall of the hopper. In some disclosed examples, the pellet grill includes a printed circuit board assembly (PCBA), and the PCBA includes a printed circuit board (PCB), the lighting module, and the fuel level sensor. In some disclosed examples, the PCBA is located along an interior wall of the hopper (e.g., the front interior wall of the hopper) that defines the pellet fuel storage compartment of the hopper.

In some disclosed examples, the hopper includes a lid and a viewing window. The lid of the hopper is movable between a closed position to cover the pellet fuel storage compartment and an open position to provide access to the pellet fuel storage compartment. The viewing window is formed in a wall of the hopper, and is made from a transparent or translucent material. The viewing window accordingly enables viewing of light displayed by the light source when the light source is activated, including while the lid of the hopper is in the closed position. The viewing window accordingly enables a user of the pellet grill to advantageously view a displayed color of light projected into and/or otherwise presented within the pellet fuel storage compartment of the hopper (e.g., by the light source of the lighting module) without requiring the user to open the lid of the hopper. The user can advantageously make an intuitive (e.g., visual) determination as to the level or amount of pellet fuel remaining in the pellet fuel storage compartment of the hopper at any given time based on the color of displayed light that is visible to the user through the viewing window. For example, a user who views the color red via the viewing window of the hopper will intuitively realize that the level and/or amount of pellet fuel occupying the pellet fuel storage compartment is low, and/or that more pellet fuel should be added to the pellet fuel storage compartment so that the pellet grill can continue performing cooking operations that require the use and/or consumption of pellet fuel. Conversely, a user who views the color green via the viewing window of the hopper will intuitively realize that the level and/or amount of pellet fuel occupying the pellet fuel storage compartment is high, and/or that there is no current need to add more pellet fuel to the pellet fuel storage compartment.

The above-identified features as well as other advantageous features of example hopper lighting for pellet grills disclosed herein are further described below in connection with the figures of the application.

As used herein in a mechanical context, the term "configured" means sized, shaped, arranged, structured, oriented, positioned, and/or located. For example, in the context of a first part configured to fit within a second part, the first part is sized, shaped, arranged, structured, oriented, positioned, and/or located to fit within the second part. As used herein in an electrical and/or computing context, the term "configured" means arranged, structured, and/or programmed. For example, in the context of processor circuitry configured to perform a specified operation, the processor circuitry is arranged, structured, and/or programmed (e.g., based on machine-readable instructions) to perform the specified operation.

As used herein, unless otherwise stated, the terms "above" and "below" describe the relationship of two parts relative to Earth. For example, as used herein, a first part is "above" a second part if the second part is closer to Earth than the first part is. As another example, as used herein, a first part is "below" a second part if the first part is closer to Earth than the second part is. It is to be understood that a first part can be above or below a second part with one or more of: another part or parts therebetween; without another part therebetween; with the first and second parts contacting one another; or without the first and second parts contacting one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, the phrase "in electrical communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuit(s) structured to perform one or more specific operation(s), and/or (ii) one or more general purpose electrical circuit(s) programmable with instructions to perform one or more specific operation(s). Example processor circuitry described herein can include any type(s) and/or any number(s) of processor(s), microprocessor(s), controller(s), microcontroller(s), application specific integrated circuit(s) (ASIC(s)), programmable logic device(s) (PLD(s)), field programmable logic device(s), (FPLD(s)), field programmable gate arrays (FPGA(s)), digital signal processor(s) (DSP(s)), graphics processing unit(s) (GPU(s)), central processor unit(s) (CPU(s)), semiconductor-based (e.g., silicon-based) circuit(s), digital circuit(s), analog circuit(s), logic circuit(s), and/or integrated circuit(s) implemented via any type(s) and/or any number(s) of transistor(s), capacitor(s), diode(s), inductor(s), resistor(s), timer(s), counter(s), printed circuit board(s), connector(s), wire(s), and/or other electrical circuit component(s).

As used herein, the terms "non-transitory computer-readable medium" and "non-transitory computer-readable storage medium" are expressly defined to include any type of computer-readable storage device and/or storage disk and to exclude propagating signals and to exclude transmission media.

As used herein, the terms "substantially" and/or "approximately" modify their subjects and/or values to recognize the potential presence of variations that occur in real world applications. For example, "substantially" and/or "approximately" may modify dimensions that may not be exact due to manufacturing tolerances and/or other real-world imperfections as will be understood by persons of ordinary skill in the art. For example, "substantially" and/or "approximately" may indicate such dimensions may be within a tolerance range of +/−10% unless otherwise specified in the description provided herein.

As used herein, the terms "including" and "comprising" (and all forms and tenses thereof) are open-ended terms. Thus, whenever the written description or a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or method actions may be implemented by, for example, the same entity or object. Additionally, although individual features may be included in different examples or claims, these may possibly be combined, and the inclusion in different examples or claims does not imply that a combination of features is not feasible and/or advantageous.

The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C.

As used herein, when the phrase "at least" is used as the transition term in, for example, a preamble of a claim, it is open-ended in the same manner as the term "comprising" and "including" are open-ended. As used herein in the context of describing structures, components, items, objects, and/or things, the phrase "at least one of A and B" is intended to refer to implementations including any of (1) at least one A, (2) at least one B, or (3) at least one A and at least one B. Similarly, as used herein in the context of describing structures, components, items, objects, and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, or (3) at least one A and at least one B.

FIG. 1 is a block diagram of an example pellet grill 100 constructed in accordance with the teachings of this disclosure. The pellet grill 100 of FIG. 1 includes an example control system 102 configured to control manage, perform, carry out, and/or otherwise implement one or more operation(s) of the pellet grill 100 including, for example, for implementing one or more hopper lighting operation(s), protocol(s), and/or process(es). In the illustrated example of FIG. 1, the control system 102 and/or, more generally, the pellet grill 100 includes an example DC power supply 104, an example engine 106 (e.g., including an example auger motor 108, an example ignitor 110, and an example fan 112), an example lighting module 114 (e.g., including one or more example light source(s) 116), an example switch 118, an example state sensor 120, an example ambient light sensor 122, an example lid position sensor 124, an example fuel level sensor 126, an example user interface 128 (e.g., including one or more example input device(s) 130 and one or more example output device(s) 132), an example network interface 134 (e.g., including one or more example communication device(s) 136), an example controller 138, and example memory 140. In other examples, one or more of the aforementioned components of FIG. 1 can be omitted from the control system 102 of the pellet grill 100. In still other examples, the control system 102 of the pellet grill 100 can include one or more other component(s) in addition to or in lieu of the aforementioned components of FIG. 1. The pellet grill 100 of FIG. 1 is configured to communicate (e.g., wirelessly communicate) with one or more example remote device(s) 144, as further described below.

The DC power supply 104 of FIG. 1 receives AC power from an example AC line power source 142 (e.g., a wall outlet) to which the DC power supply 104 and/or, more generally, the control system 102 of the pellet grill 100 is electrically connected. The DC power supply 104 converts AC power received from the AC line power source 142 into DC power that can thereafter be supplied to one or more of the engine 106 (e.g., including the auger motor 108, the ignitor 110, and the fan 112), the lighting module 114 (e.g., including the light source(s) 116), the switch 118, the state sensor 120, the ambient light sensor 122, the lid position sensor 124, the fuel level sensor 126, the user interface 128 (e.g., including the input device(s) 130 and the output device(s) 132), the network interface 134 (e.g., including the communication device(s) 136), the controller 138, and/or the memory 140. In some examples, the distribution of DC power from the DC power supply 104 to any of the aforementioned components of the control system 102 can be controlled and/or managed by the switch 118, the user interface 128, and/or the controller 138. In other examples, the DC power supply 104 of FIG. 1 can alternatively be implemented by a battery (or a plurality of batteries) dedicated to powering one or more of the aforementioned component(s) of the control system 102 of the pellet grill 100 (e.g., the light source(s) 116 of the lighting module 114 of the control system 102).

The engine 106 of FIG. 1 facilitates the performance of one or more cooking operation(s) within a cooking chamber of the pellet grill 100. In the illustrated example of FIG. 1, the engine 106 includes the auger motor 108, the ignitor 110, and the fan 112. The auger motor 108 of the engine 106 controls and/or facilitates the delivery of pellet fuel from a hopper of the pellet grill 100 into a burn pot of the pellet grill 100. In some examples, the auger motor 108 of the engine 106 is implemented as a DC-powered, variable speed motor. The ignitor 110 of the engine 106 controls and/or facilitates the ignition of pellet fuel located within the burn pot of the pellet grill 100. In some examples, the ignitor 110 of the engine 106 is implemented as a DC-powered glow plug. The fan 112 of the engine 106 controls and/or facilitates delivery of an airflow to the pellet fuel located within the burn pot of the pellet grill 100 to control the rate of combustion of such pellet fuel. In some examples, the fan 112 of the engine 106 is implemented as a DC-powered, variable speed fan.

The lighting module 114 of FIG. 1 is configured to project light into, onto, and/or across, and/or to otherwise illuminate an interior portion (e.g., a pellet fuel storage compartment) of a hopper of the pellet grill 100. The lighting module 114 houses, carries, and/or contains one or more light source(s) 116, and can further includes any number of lenses, filters, reflectors, refractors, light pipes, covers, and/or other light-guiding or light-manipulating component(s) of any size, shape, or type. In some examples, the lighting module 114 is mechanically coupled to (e.g., fixedly connected to) a hopper of the pellet grill 100. For example, the lighting module 114 can be mounted to an interior wall of a pellet fuel storage compartment of a hopper of the pellet grill 100, with the light source(s) 116 of the lighting module 114 being positioned to emit and/or project light into, onto, and/or across the pellet fuel storage compartment of the hopper (e.g., inwardly from the interior wall of the hopper).

The pellet grill 100 of FIG. 1 can include any number of lighting module(s) 114, and each lighting module 114 can include any type(s) and/or any number(s) of light source(s) 116. In the illustrated example of FIG. 1, the light source(s) 116 of the lighting module 114 is/are preferably implemented via one or more light-emitting diode(s) (LED(s)), and more preferably via one or more multicolor LED(s) (e.g., one or more red-green-blue-white (RGBW) multicolor LED(s)).

In other examples, the light source(s) 116 of the lighting module 114 can instead be implemented via one or more halogen bulb(s), one or more fluorescent bulb(s), and/or one or more incandescent bulb(s). In some examples, the light source(s) 116 of the lighting module 114 is/are powered via AC power received from the AC line power source 142 to which the pellet grill 100 is connected. In other examples, the light source(s) 116 of the lighting module 114 is/are powered via DC power supplied by the DC power supply 104 of the pellet grill 100.

In the illustrated example of FIG. 1, the lighting module 114 is a controllable electric device in which the one or more light source(s) 116 is/are configured to individually or collectively transition from an OFF state (e.g., a non-light-projecting state of the light source(s) 116 of the lighting module 114) to an ON state (e.g., a light-projecting state of the light source(s) 116 of the lighting module 114), and vice-versa, in response to instructions, commands, and/or signals (e.g., a supply of current) generated by the controller 138 of the pellet grill 100. In some examples, one or more of the light source(s) 116 of the lighting module 114 can be individually or collectively commanded to illuminate in a manner that causes the light source(s) 116 to appear as being constantly lit (e.g., in a constant light-projecting state) over a duration of time. In other examples, one or more of the light source(s) 116 of the lighting module 114 can be individually or collectively commanded to illuminate in a manner that causes the light source(s) 116 to appear as being periodically lit and/or blinking (e.g., switching up and back between a light-projecting state and a non-light-projecting state) over a duration of time. In still other examples, one or more of the light source(s) 116 of the lighting module 114 can be individually or collectively commanded to cease illuminating such that the light source(s) 116 appear as being constantly unlit (e.g., in a constant non-light-projecting state) over a duration of time.

In instances where one or more of the light source(s) 116 of the lighting module 114 is/are implemented as a multicolor LED, the multicolor LED can be commanded (e.g., by the controller 138) to illuminate in different colors (e.g., red, orange, yellow, green, blue, purple, white, etc.) of the color spectrum. In some examples, the commanded color of illumination of the multicolor LED corresponds to the occurrence of a particular event detected by the control system 102 of the pellet grill 100, with the correlation between the illumination color of the multicolor LED and the particular event detected by the control system 102 being predetermined and/or otherwise configured by the manufacturer of the pellet grill 100. In other examples, the commanded color of illumination of the multicolor LED corresponds to the occurrence of a particular event detected by the control system 102 of the pellet grill 100, with the correlation between the illumination color of the multicolor LED and the particular event detected by the control system 102 being customized by the user of the pellet grill 100 (e.g., the user can reconfigure a default/manufacturer correlation associated with the illumination color and/or the particular event). The implementation of customizable user correlations governing the relationships between the illumination color of the multicolor LED and a particular event detected by the control system 102 of the pellet grill 100 advantageously enhances the user experience by allowing the user to personalize the appearance, operation, and/or performance of the pellet grill 100.

In some examples, the commanded color of illumination of one or more multicolor LED(s) implementing the light source(s) 116 of the lighting module 114 is dependent upon a detected level of pellet fuel within a pellet fuel storage compartment of a hopper of the pellet grill 100. For example, one or more multicolor LED(s) implementing the light source(s) 116 of the lighting module 114 of FIG. 1 can be individually or collectively commanded (e.g., by the controller 138) to illuminate in and/or display (1) a first color (e.g., green) to indicate that the pellet fuel storage compartment of the hopper is occupied with pellet fuel by more than a first fuel level threshold amount (e.g., 50% or more of the compartment), (2) a second color (e.g., yellow) to indicate that the pellet storage compartment is occupied with pellet fuel by less than the first fuel level threshold amount (e.g., less than 50% of the compartment), but more than a second fuel level threshold amount (e.g., 25% or more of the compartment), and (3) a third color (e.g., red) to indicate that the pellet fuel storage compartment is occupied by less than the second fuel level threshold amount (e.g., less than 25% of the compartment). The aforementioned green-yellow-red color scheme is advantageous in that it intuitively informs a user of the pellet grill 100 as to the specific pellet fuel level status associated with the hopper of the pellet grill 100. In this regard, users of various objects implementing a green-yellow-red color scheme conventionally associate the color green with a high, positive, and/or healthy status, the color red with a low, negative, and/or unhealthy status, and the color yellow with a medium or intermediate status between green and red.

In other examples, the commanded color of illumination of one or more multicolor LED(s) implementing the light source(s) 116 of the lighting module 114 is dependent upon a detected position (e.g., open or closed) of a lid of the hopper of the pellet grill 100. For example, one or more multicolor LED(s) implementing the light source(s) 116 of the lighting module 114 of FIG. 1 can be individually or collectively commanded (e.g., by the controller 138) to illuminate in and/or display a fourth color (e.g., white) in response to the lid of the hopper transitioning from a closed position to or toward an open position (e.g., a lid opening movement). Projecting white light (e.g., bright white light) into, onto, and/or across the interior of the hopper (e.g., into, onto, and/or across the pellet fuel storage compartment of the hopper) when the lid of the hopper is open advantageously enhances a user's viewability of the interior of the hopper, which may be beneficial to the user when there is a need to add pellet fuel into the pellet fuel storage compartment of the hopper (e.g., to replace pellet fuel that the engine 106 of the pellet grill 100 has already consumed from the hopper).

While the aforementioned color schemes have generally been described in the context of being implemented by as few as a single multicolor LED, one of ordinary skill in the art would appreciate that similar color schemes can alternatively be implemented using multiple single-color light source(s) 116. For example, rather than implementing the green-yellow-red color scheme described above via one or more multicolor LED(s), the green-yellow-red color scheme can instead be implemented via three separate and individually controllable single-color LEDs including a green LED, a yellow LED, and a red LED. A fourth single-color LED (e.g., a white LED) can be implemented to introduce a fourth color to the color scheme. As another example, the green-yellow-red color scheme can instead be implemented via three separate and individually controllable single-color bulbs including a green bulb, a yellow bulb, and a red bulb. A fourth single-color bulb (e.g., a white bulb) can be implemented to introduce a fourth color to the color scheme.

The switch 118 of FIG. 1 is operable by a user of the pellet grill 100 to control the lighting module 114 and/or, more generally, the control system 102 of the pellet grill 100. More specifically, the switch 118 of FIG. 1 is operable by a user of the pellet grill 100 to control the activation and deactivation of the light source(s) 116 of the lighting module 114 of the pellet grill 100. In the illustrated example of FIG. 1, the switch 118 is operatively coupled to (e.g., in electrical communication with) the lighting module 114, the controller 138, and/or the memory 140 of the control system 102 of the pellet grill 100. In some examples, the switch 118 is mounted on and/or to a hopper of the pellet grill 100. In other examples, the switch 118 can be mounted on and/or to a different structure of the pellet grill 100 (e.g., a frame or a side table of the pellet grill 100). In still other examples, the switch 118 can be fully integrated as part of the user interface 128 of the pellet grill 100.

The switch 118 of FIG. 1 includes an actuatable component (e.g., a button) that is actuatable by a user of the pellet grill 100 to selectively cause the switch 118 to close a circuit of the lighting module 114 and/or the control system 102 of the pellet grill 100. When the switch 118 closes the circuit (e.g., in response to a user actuating the actuatable component of the switch 118), power is transmitted from a power source (e.g., a power supply, a battery, etc.) to the lighting module 114 of the control system 102, thereby enabling light to be generated by and/or projected from the lighting module 114 into, onto, and/or across the pellet fuel storage compartment of the hopper of the pellet grill 100. When the switch 118 opens the circuit (e.g., in response to a user releasing the actuatable component of the switch 118, or actuating the actuatable component of the switch 118 a second time), power is no longer transmitted from the power source to the lighting module 114 of the control system 102, and light is therefore no longer able to be generated by and/or projected from the lighting module 114 into, onto, and/or across the pellet fuel storage compartment of the hopper of the pellet grill 100.

In some examples, the switch 118 of FIG. 1 is configured as an ON/OFF switch. In such examples, a user must press and/or actuate an actuatable component (e.g., a button) of the switch 118 two successive times to cycle the switch 118 and/or the circuit from an OFF state to an ON state and back to an OFF state (e.g., from an open circuit to a closed circuit, and from a closed circuit back to an open circuit). In other examples, the switch 118 of FIG. 1 can instead be configured as a momentary switch. In such examples, a user must press and hold an actuatable component (e.g., a button) of the switch 118 to transition the switch 118 and/or the circuit from an OFF state to an ON state (e.g., from an open circuit to a closed circuit). The user can thereafter release the actuatable component of the switch 118 to transition the switch 118 and/or the circuit from the ON state back to the OFF state (e.g., from a closed circuit back to an open circuit). Implementing the switch 118 as a momentary switch (e.g., as opposed to an ON/OFF switch) can be advantageous with regard to preserving the remaining amount of energy associated with the power source, and/or preventing instances in which a user might otherwise inadvertently leave the switch 118 and/or the lighting module 114 of the pellet grill 100 in a powered state (e.g., an ON state).

The state sensor 120 of FIG. 1 senses and/or detects one or more state(s) (e.g., a power state, an operational state, etc.) of the switch 118, of the control system 102, and/or, more generally, of the pellet grill 100 of FIG. 1. For example, the state sensor 120 can sense and/or detect whether the control system 102 and/or, more generally, the pellet grill 100 is in a powered state (e.g., an ON state). Conversely, the state sensor 120 can also sense and/or detect whether the control system 102 and/or, more generally, the pellet grill 100 is in, or is in the process of transitioning into, an unpowered state (e.g., an OFF state). As another example, the state sensor 120 can sense and/or detect whether the control system 102 and/or, more generally, the pellet grill 100 has initiated and/or is executing a startup sequence (e.g., a sequence that powers on the pellet grill 100 and/or that causes an ignitor of the pellet grill 100 to be in an ON state). Conversely, the state sensor 120 can also sense and/or detect whether the control system 102 and/or, more generally, the pellet grill 100 has initiated and/or is executing a shutdown sequence (e.g., a sequence that causes an auger motor, an ignitor, a fan, and/or, more generally, the pellet grill 100 to be shut down and/or powered off). As yet another example, the state sensor 120 can sense and/or detect whether the switch 118 of FIG. 1 is closed and/or in a powered state (e.g., an ON state). Conversely, the state sensor 120 can also sense and/or detect whether the switch 118 of FIG. 1 is open and/or in an unpowered state (e.g., an OFF state). In the illustrated example of FIG. 1, the state sensor 120 is operatively coupled to (e.g., in electrical communication with) the switch 118, the controller 138, and/or the memory 140 of the control system 102 of the pellet grill 100. Data and/or signals sensed and/or detected by the state sensor 120 of FIG. 1 may be of any quantity, type, form and/or format. Data, information, and/or signals sensed and/or detected by the state sensor 120 of FIG. 1 can be transmitted directly to the controller 138 of FIG. 1, and/or can be transmitted to and stored in a computer-readable storage medium such as the memory 140 of FIG. 1.

The ambient light sensor 122 of FIG. 1 senses, measures and/or detects an amount, an extent, and/or a presence of ambient light in a surrounding area (e.g., an external area or space surrounding the pellet grill 100). In the illustrated example of FIG. 1, the ambient light sensor 122 is operatively coupled to (e.g., in electrical communication with) the controller 138 and/or the memory 140 of the control system 102 of the pellet grill 100. In some examples, the ambient light sensor 122 of FIG. 1 can be implemented by and/or as a photodetector mounted to, positioned on, and/or facing outwardly from an external surface of the pellet grill 100. Data and/or signals sensed, measured, and/or detected by the ambient light sensor 122 of FIG. 1 may be of any quantity, type, form and/or format. Data, information, and/or signals sensed, measured, and/or detected by the ambient light sensor 122 of FIG. 1 can be transmitted directly to the controller 138 of FIG. 1, and/or can be transmitted to and stored in a computer-readable storage medium such as the memory 140 of FIG. 1.

The lid position sensor 124 of FIG. 1 senses, measures and/or detects a position (e.g., an open position and/or a closed position) of a lid of a hopper of the pellet grill 100. In the illustrated example of FIG. 1, the lid position sensor 124 is operatively coupled to (e.g., in electrical communication with) the controller 138 and/or the memory 140 of the control system 102 of the pellet grill 100. In some examples, the lid position sensor 124 can be implemented by and/or as a proximity sensor (e.g., a proximity switch) having one or more component(s) coupled to the lid and/or the main body of the hopper of the pellet grill 100. In other examples, the lid position sensor 124 can alternatively be implemented by a limit sensor (e.g., a limit switch), by an optical sensor (e.g., an optical switch), or by a Bowden cable connected switch. Data and/or signals sensed, measured, and/or detected by the lid position sensor 124 of FIG. 1 may be of any quantity, type, form and/or format. Data, information, and/or signals sensed, measured, and/or detected by the lid position sensor 124 of FIG. 1 can be transmitted directly to the controller 138 of FIG. 1, and/or can be transmitted to and stored in a computer-readable storage medium such as the memory 140 of FIG. 1.

The fuel level sensor 126 senses, measures and/or detects the level or amount of pellet fuel present in a pellet fuel storage compartment of a hopper of the pellet grill 100. In the illustrated example of FIG. 1, the fuel level sensor 126 is operatively coupled to (e.g., in electrical communication with) the controller 138 and/or the memory 140 of the control system 102 of the pellet grill 100. In some examples, the fuel level sensor 126 can be implemented by and/or as an infrared sensor (e.g., a time-of-flight sensor), a LiDAR sensor, an image sensor, an ultrasonic sensor, a pressure sensor, a weight sensor, and/or any type of level, distance, or volume sensor mounted to, positioned in, extending into, and/or directed toward the pellet fuel storage compartment of the hopper of the pellet grill 100. Data and/or signals sensed, measured, and/or detected by the fuel level sensor 126 of FIG. 1 may be of any quantity, type, form and/or format. Data, information, and/or signals sensed, measured, and/or detected by the fuel level sensor 126 of FIG. 1 can be transmitted directly to the controller 138 of FIG. 1, and/or can be transmitted to and stored in a computer-readable storage medium such as the memory 140 of FIG. 1.

The user interface 128 of FIG. 1 enables a user of the pellet grill 100 to interact with the controller 138 of the control system 102 of FIG. 1. In the illustrated example of FIG. 1, the user interface 128 is operatively coupled to (e.g., in electrical communication with) the controller 138 and/or the memory 140 of the control system 102 of the pellet grill 100. In some examples, the user interface 128 is mechanically coupled to (e.g., fixedly connected to) the pellet grill 100. For example, the user interface 128 can be mounted to a cookbox, a lid, a hopper, a frame, or a side table of the pellet grill 100. The user interface 128 is preferably mounted to a portion of the pellet grill 100 that is readily accessible to a user of the pellet grill 100, such as a front portion of a cookbox, a front portion of a lid, a front portion of a hopper, a front portion of a frame, or a front portion of a side table of the pellet grill 100. In some examples, respective ones of the input device(s) 130 and/or the output device(s) 132 of the user interface 128 can be mounted to different portions of the pellet grill 100. The architecture and/or operations of the user interface 128 can be distributed among any number of user interfaces respectively having any number of input device(s) 130 and/or output device(s) 132 located at and/or mounted to any portion of the pellet grill 100.

The input device(s) 130 of the user interface 128 of FIG. 1 permit(s) the user of the pellet grill 100 to enter data, information, selections, inputs, instructions, and/or commands into the controller 138. For example, the input device(s) 130 of the user interface 128 can permit the user of the pellet grill 100 to enter data, information, one or more selection(s), one or more input(s), one or more instruction(s), and/or one or more command(s) into the controller 138 that cause(s) the controller 138 to implement (e.g., to initiate, to execute, and/or to terminate) one or more lighting control process(es) (e.g., one or more process(es) and/or protocol(s) configured to control activation (e.g., powering on) or deactivation (e.g., powering off) of the light source(s) 116 of the lighting module 114 of FIG. 1) via the control system 102 of the pellet grill 100. The input device(s) 130 of the user interface 128 can be implemented, for example, by one or more of a touchscreen, a button, a dial, a knob, a switch, an audio sensor, a microphone, an image sensor, a camera, and/or a voice recognition system.

The output device(s) 132 of the user interface 128 of FIG. 1 facilitate(s) the presentation of data and/or information (e.g., data and/or information generated by the controller 138) to the user of the pellet grill 100. For example, the output device(s) 132 of the user interface 128 can facilitate the presentation (e.g., textually, graphically, and/or audibly) of data and/or information associated with implementing (e.g., initiating, executing, and/or terminating) one or more lighting control process(es) (e.g., one or more process(es) and/or protocol(s) configured to control activation and/or deactivation of the light source(s) 116 of the lighting module 114 of FIG. 1) via the control system 102 of the pellet grill 100. The output device(s) 132 of the user interface 128 can be implemented, for example, by one or more of a display device (e.g., a light emitting diode (LED), an organic light emitting diode (OLED), a liquid crystal display (LCD), a cathode ray tube (CRT) display, an in-plane switching (IPS) display, a touchscreen, etc.), a tactile output device, and/or a speaker.

The network interface 134 of FIG. 1 enables a user of the pellet grill 100 to remotely interact (e.g., via one or more of the remote device(s) 144) with the control system 102 of the pellet grill 100. In the illustrated example of FIG. 1, the network interface 134 is operatively coupled to (e.g., in electrical communication with) the controller 138 and/or the memory 140 of the control system 102 of the pellet grill 100. The network interface 134 of FIG. 1 includes one or more communication device(s) 136 (e.g., transmitter(s), receiver (s), transceiver(s), modem(s), gateway(s), wireless access point(s), etc.) to facilitate the exchange of data with external machines (e.g., computing devices of any kind, including the remote device(s) 144 of FIG. 1) by a wired or wireless communication network. Communications transmitted and/ or received via the communication device(s) 136 and/or, more generally, via the network interface 134 can be made over and/or carried by, for example, an Ethernet connection, a digital subscriber line (DSL) connection, a telephone line connection, a coaxial cable system, a satellite system, a wireless system, a cellular telephone system, an optical connection, etc.

The controller 138 of FIG. 1 implements processor circuitry to control and/or manage one or more operation(s) associated with the control system 102 of the pellet grill of FIG. 1 and/or the components thereof, including the DC power supply 104, the engine 106 (e.g., including the auger motor 108, the ignitor 110, and the fan 112), the lighting module 114 (e.g., including the light source(s) 116), the switch 118, the state sensor 120, the ambient light sensor 122, the lid position sensor 124, the fuel level sensor 126, the user interface 128 (e.g., including the input device(s) 130 and the output device(s) 132), the network interface 134 (e.g., including the communication device(s) 136), and/or the memory 140. The processor circuitry of the controller 138 of FIG. 1 includes any type(s) and/or any number(s) of processor(s), microprocessor(s), controller(s), microcontroller(s), ASIC(s), PLD(s), FPLD(s), FPGA(s), DSP(s), GPU(s), CPU(s), semiconductor-based (e.g., silicon-based) circuit(s), digital circuit(s), analog circuit(s), logic circuit(s), and/or integrated circuit(s) implemented by any type(s) and/or any number(s) of transistor(s), capacitor(s), diode(s), inductor(s), resistor(s), timer(s), counter(s), printed circuit board(s), connector(s), wire(s), and/or other electrical circuit component(s).

In the illustrated example of FIG. 1, the controller 138 is graphically represented as a single, discrete structure that manages and/or controls the operation(s) of various components of the control system 102 of the pellet grill 100. It is to be understood, however, that in other examples, the architecture and/or operations of the controller 138 can be distributed among any number of controllers, with each separate controller having a dedicated subset of one or more operation(s) described herein. In some examples, the control system 102 of the pellet grill 100 can include separate, distinct controllers for one or more of the DC power supply 104, the engine 106 (e.g., including the auger motor 108, the ignitor 110, and the fan 112), the lighting module 114 (e.g., including the light source(s) 116), the switch 118, the state sensor 120, the ambient light sensor 122, the lid position sensor 124, the fuel level sensor 126, the user interface 128 (e.g., including the input device(s) 130 and the output device(s) 132), the network interface 134 (e.g., including the communication device(s) 136), and/or the memory 140 of the control system 102 of the pellet grill 100.

In the illustrated example of FIG. 1, the controller 138 is operatively coupled to (e.g., in electrical communication with) one or more of the DC power supply 104, the engine 106 (e.g., including the auger motor 108, the ignitor 110, and the fan 112), the lighting module 114 (e.g., including the light source(s) 116), the switch 118, the state sensor 120, the ambient light sensor 122, the lid position sensor 124, the fuel level sensor 126, the user interface 128 (e.g., including the input device(s) 130 and the output device(s) 132), the network interface 134 (e.g., including the communication device(s) 136), and/or the memory 140 of the control system

102 of the pellet grill 100. The controller 138 of FIG. 1 is also operatively coupled to (e.g., in wired or wireless electrical communication with) the remote device(s) 144 of FIG. 1 via the network interface 134 (e.g., including the communication device(s) 136) of the control system 102 of the pellet grill 100 of FIG. 1. In some examples, the controller 138 of FIG. 1 receives commands, instructions, signals, and/or data from, and/or transmits commands, instructions, signals, and/or data to, the engine 106 (e.g., including the auger motor 108, the ignitor 110, and the fan 112), the lighting module 114 (e.g., including the light source(s) 116), the switch 118, the state sensor 120, the ambient light sensor 122, the lid position sensor 124, the fuel level sensor 126, the user interface 128 (e.g., including the input device(s) 130 and the output device(s) 132), the network interface 134 (e.g., including the communication device(s) 136), and/or the memory 140 of the control system 102 of the pellet grill 100 in connection with implementing (e.g., initiating, executing, and/or terminating) one or more lighting control process(es) and/or protocol(s), and/or one or more lighting activation subroutine(s) thereof.

In some examples, the controller 138 of FIG. 1 implements, manages, and/or controls a first lighting control process (e.g., a first lighting control protocol) that is based on (e.g., dependent on) power state data associated with the control system 102 of the pellet grill 100 of FIG. 1, as detected by the state sensor 120 of FIG. 1. When executing the first lighting control process, the controller 138 of FIG. 1 determines, based on data sensed, measured, and/or detected by the state sensor 120 of FIG. 1, whether the control system 102 of the pellet grill 100 of FIG. 1 is in a powered state (e.g., an ON state). If the controller 138 determines that the control system 102 of the pellet grill 100 is in a powered state (e.g., an ON state), the controller 138 commands, instructs, signals, and/or otherwise causes one or more of the light source(s) 116 of the light module 114 of FIG. 1 to activate (e.g., to illuminate and/or to display a color). The controller 138 accordingly treats the determination that the control system 102 of the pellet grill 100 is in a powered state (e.g., an ON state) as an activation triggering event with regard to the light source(s) 116 of the lighting module 114. Various lighting activation subroutines that can be implemented by the controller 138 of FIG. 1 in connection with performing and/or executing the first lighting control process are further described below.

When executing the first lighting control process, the controller 138 of FIG. 1 also determines, based on data sensed, measured, and/or detected by the state sensor 120 of FIG. 1, whether the control system 102 of the pellet grill 100 of FIG. 1 is in, or in the process of being transitioned into, an unpowered state (e.g., an OFF state). If the controller 138 determines that the control system 102 of the pellet grill 100 is in, or in the process of being transitioned into, an unpowered state (e.g., an OFF state), the controller 138 commands, instructs, signals, and/or otherwise causes one or more of the light source(s) 116 of the light module 114 of FIG. 1 to deactivate (e.g., to cease illuminating and/or to cease displaying a color). The controller 138 accordingly treats the determination that the control system 102 of the pellet grill 100 is in, or in the process of being transitioned into, an unpowered state (e.g., an OFF state) as a deactivation triggering event with regard to the light source(s) 116 of the lighting module 114.

In some examples, the controller 138 of FIG. 1 implements, manages, and/or controls a second lighting control process (e.g., a second lighting control protocol) that is based on (e.g., dependent on) operational state data associated with the control system 102 of the pellet grill 100 of FIG. 1, as detected by the state sensor 120 of FIG. 1. When executing the second lighting control process, the controller 138 of FIG. 1 determines, based on data sensed, measured, and/or detected by the state sensor 120 of FIG. 1, whether a startup sequence of the pellet grill 100 of FIG. 1 (e.g., a sequence that powers on the pellet grill 100 and/or that causes an ignitor of the pellet grill 100 to be in an ON state) has been initiated. If the controller 138 determines that a startup sequence of the pellet grill 100 has been initiated, the controller 138 commands, instructs, signals, and/or otherwise causes one or more of the light source(s) 116 of the light module 114 of FIG. 1 to activate (e.g., to illuminate and/or to display a color). The controller 138 accordingly treats the determination that a startup sequence of the pellet grill 100 has been initiated as an activation triggering event with regard to the light source(s) 116 of the lighting module 114. Various lighting activation subroutines that can be implemented by the controller 138 of FIG. 1 in connection with performing and/or executing the second lighting control process are further described below.

When executing the second lighting control process, the controller 138 of FIG. 1 also determines, based on data sensed, measured, and/or detected by the state sensor 120 of FIG. 1, whether a shutdown sequence of the pellet grill 100 of FIG. 1 (e.g., a sequence that causes an auger motor, an ignitor, a fan, and/or, more generally, the pellet grill 100 to be shut down and/or powered off) has been initiated. If the controller 138 determines that a shutdown sequence of the pellet grill 100 has been initiated, the controller 138 commands, instructs, signals, and/or otherwise causes one or more of the light source(s) 116 of the light module 114 of FIG. 1 to deactivate (e.g., to cease illuminating and/or to cease displaying a color). The controller 138 accordingly treats the determination that a shutdown sequence of the pellet grill 100 has been initiated as a deactivation triggering event with regard to the light source(s) 116 of the lighting module 114.

In some examples, the controller 138 of FIG. 1 implements, manages, and/or controls a third lighting control process (e.g., a third lighting control protocol) that is based on (e.g., dependent on) power state data associated with the switch 118 of the control system 102 of the pellet grill 100 of FIG. 1, as detected by the state sensor 120 of FIG. 1. When executing the third lighting control process, the controller 138 of FIG. 1 determines, based on data sensed, measured, and/or detected by the state sensor 120 of FIG. 1, whether the switch 118 of the pellet grill 100 of FIG. 1 is closed and/or in a powered state (e.g., an ON state). If the controller 138 determines that the switch 118 of the pellet grill 100 is closed and/or in a powered state (e.g., an ON state), the controller 138 commands, instructs, signals, and/or otherwise causes one or more of the light source(s) 116 of the light module 114 of FIG. 1 to activate (e.g., to illuminate and/or to display a color). The controller 138 accordingly treats the determination that the switch 118 of the pellet grill 100 is closed and/or in a powered state (e.g., an ON state) as an activation triggering event with regard to the light source(s) 116 of the lighting module 114. Various lighting activation subroutines that can be implemented by the controller 138 of FIG. 1 in connection with performing and/or executing the third lighting control process are further described below.

When executing the third lighting control process, the controller 138 of FIG. 1 also determines, based on data sensed, measured, and/or detected by the state sensor 120 of FIG. 1, whether the switch 118 of the pellet grill 100 of FIG.

1 is open, and/or is in, or in the process of being transitioned into, an unpowered state (e.g., an OFF state). If the controller 138 determines that the switch 118 of the pellet grill 100 is open, and/or is in, or in the process of being transitioned into, an unpowered state (e.g., an OFF state), the controller 138 commands, instructs, signals, and/or otherwise causes one or more of the light source(s) 116 of the light module 114 of FIG. 1 to deactivate (e.g., to cease illuminating and/or to cease displaying a color). The controller 138 accordingly treats the determination that the switch 118 of the pellet grill 100 is open, and/or is in, or in the process of being transitioned into, an unpowered state (e.g., an OFF state) as a deactivation triggering event with regard to the light source(s) 116 of the lighting module 114.

In some examples, the controller 138 of FIG. 1 implements, manages, and/or controls a fourth lighting control process (e.g., a fourth lighting control protocol) that is based on (e.g., dependent on) one or more lighting control request(s) received from the user interface 128 or the network interface 134 of the control system 102 of the pellet grill 100 of FIG. 1. When executing the fourth lighting control process, the controller 138 of FIG. 1 determines whether the user interface 128 and/or the network interface 134 of the control system 102 has/have received any commands, instructions, signals, inputs, and/or other data indicative of a request to activate the light source(s) 116 of the lighting module 114 of the pellet grill 100. If the controller 138 determines that the user interface 128 and/or the network interface 134 of the control system 102 has/have received one or more command(s), instruction(s), signal(s), input(s), and/or other data indicative of a request to activate the light source(s) 116 of the lighting module 114 of the pellet grill 100, the controller 138 commands, instructs, signals, and/or otherwise causes one or more of the light source(s) 116 of the light module 114 of FIG. 1 to activate (e.g., to illuminate and/or to display a color). The controller 138 accordingly treats the determination that the user interface 128 and/or the network interface 134 of the control system 102 has/have received one or more command(s), instruction(s), signal(s), input(s), and/or other data indicative of a request to activate the light source(s) 116 of the lighting module 114 of the pellet grill 100 as an activation triggering event with regard to the light source(s) 116 of the lighting module 114. Various lighting activation subroutines that can be implemented by the controller 138 of FIG. 1 in connection with performing and/or executing the fourth lighting control process are further described below.

When executing the fourth lighting control process, the controller 138 of FIG. 1 also determines whether the user interface 128 and/or the network interface 134 of the control system 102 has/have received any commands, instructions, signals, inputs, and/or other data indicative of a request to deactivate the light source(s) 116 of the lighting module 114 of the pellet grill 100. If the controller 138 determines that the user interface 128 and/or the network interface 134 of the control system 102 has/have received one or more command(s), instruction(s), signal(s), input(s), and/or other data indicative of a request to deactivate the light source(s) 116 of the lighting module 114 of the pellet grill 100, the controller 138 commands, instructs, signals, and/or otherwise causes one or more of the light source(s) 116 of the light module 114 of FIG. 1 to deactivate (e.g., to cease illuminating and/or to cease displaying a color). The controller 138 accordingly treats the determination that the user interface 128 and/or the network interface 134 of the control system 102 has/have received one or more command(s), instruction(s), signal(s), input(s), and/or other data indicative of a request to deactivate the light source(s) 116 of the lighting module 114 of the pellet grill 100 as a deactivation triggering event with regard to the light source(s) 116 of the lighting module 114.

In some examples, the controller 138 of FIG. 1 implements, manages, and/or controls a fifth lighting control process (e.g., a fifth lighting control protocol) that is based on (e.g., dependent on) ambient light data sensed, measured, and/or detected by the ambient light sensor 122 of the control system 102 of the pellet grill 100 of FIG. 1. When executing the fifth lighting control process, the controller 138 of FIG. 1 determines, based on data sensed, measured, and/or detected by the ambient light sensor 122 of FIG. 1, whether the ambient light around the exterior of the pellet grill 100 is below an ambient light threshold (e.g., a predetermined or user-specified light intensity threshold configured such that the light source(s) 116 of the lighting module 114 is/are not activated when the exterior of pellet grill 100 in exposed to direct sunlight and/or other high-intensity external lighting conditions). If the controller 138 determines that the ambient light around the exterior of the pellet grill 100 is below the ambient light threshold, the controller 138 commands, instructs, signals, and/or otherwise causes one or more of the light source(s) 116 of the light module 114 of FIG. 1 to activate (e.g., to illuminate and/or to display a color). The controller 138 accordingly treats the determination that the ambient light around the exterior of the pellet grill 100 is below the ambient light threshold as an activation triggering event with regard to the light source(s) 116 of the lighting module 114. Various lighting activation subroutines that can be implemented by the controller 138 of FIG. 1 in connection with performing and/or executing the fifth lighting control process are further described below.

When executing the fifth lighting control process, the controller 138 of FIG. 1 also determines, based on data sensed, measured, and/or detected by the ambient light sensor 122 of FIG. 1, whether the ambient light around the exterior of the pellet grill 100 is above the ambient light threshold. If the controller 138 determines that the ambient light around the exterior of the pellet grill 100 is above the ambient light threshold, the controller 138 commands, instructs, signals, and/or otherwise causes one or more of the light source(s) 116 of the light module 114 of FIG. 1 to deactivate (e.g., to cease illuminating and/or to cease displaying a color). The controller 138 accordingly treats the determination that the ambient light around the exterior of the pellet grill 100 is above the ambient light threshold as a deactivation triggering event with regard to the light source(s) 116 of the lighting module 114.

In some examples, the controller 138 of FIG. 1 implements, manages, and/or controls a sixth lighting control process (e.g., a sixth lighting control protocol) that is based on (e.g., dependent on) lid position data sensed, measured, and/or detected by the lid position sensor 124 of the control system 102 of the pellet grill 100 of FIG. 1. When executing the sixth lighting control process, the controller 138 of FIG. 1 determines, based on data sensed, measured, and/or detected by the lid position sensor 124 of FIG. 1, whether a lid opening movement associated with a lid of a hopper of the pellet grill 100 (e.g., movement of the lid of the hopper from a closed position toward or to an open position) has occurred and/or has been detected. If the controller 138 determines that a lid opening movement associated with the lid of the hopper has occurred and/or has been detected, the controller 138 commands, instructs, signals, and/or otherwise causes one or more of the light source(s) 116 of the light module 114 of FIG. 1 to activate (e.g., to illuminate and/or to display a color). The controller 138 accordingly treats the determination that a lid opening movement associated with the lid of the hopper has occurred and/or has been detected as an activation triggering event with regard to the light source(s) 116 of the lighting module 114. Various lighting activation subroutines that can be implemented by the controller 138 of FIG. 1 in connection with performing and/or executing the sixth lighting control process are further described below.

When executing the sixth lighting control process, the controller 138 of FIG. 1 also determines, based on data sensed, measured, and/or detected by the lid position sensor 124 of FIG. 1, whether a lid closing movement associated with the lid of the hopper of the pellet grill 100 (e.g., movement of the lid of the hopper from an open position toward or to a closed position) has occurred and/or has been detected. If the controller 138 determines that a lid closing movement associated with the lid of the hopper has occurred and/or has been detected, the controller 138 commands, instructs, signals, and/or otherwise causes one or more of the light source(s) 116 of the light module 114 of FIG. 1 to deactivate (e.g., to cease illuminating and/or to cease displaying a color). The controller 138 accordingly treats the determination that a lid closing movement associated with the lid of the hopper has occurred and/or has been detected as a deactivation triggering event with regard to the light source(s) 116 of the lighting module 114.

For any of the various lighting control processes described above (e.g., the first lighting control process, the second lighting control process, the third lighting control process, the fourth lighting control process, the fifth lighting control process, and/or the sixth lighting control process), the controller 138 of FIG. 1 can also determine whether the user interface 128 and/or the network interface 134 of the control system 102 of FIG. 1 has/have received any commands, instructions, signals, inputs, and/or other data indicative of a request to terminate the lighting control process. If the controller 138 determines that the lighting control process is to continue (e.g., that no termination request has been received), the controller 138 continues implementing the lighting control process. If the controller 138 instead determines that the lighting control process is to cease or terminate (e.g., that a termination request has been received), the controller 138 terminates and/or stops execution of the lighting control process.

In some examples, the controller 138 of FIG. 1 implements, manages, and/or controls a first lighting activation subroutine that is based on (e.g., dependent on) fuel level data sensed, measured, and/or detected by the fuel level sensor 126 of the control system 102 of the pellet grill 100 of FIG. 1. When executing the first lighting activation subroutine, the controller 138 of FIG. 1 determines, based on data sensed, measured, and/or detected by the fuel level sensor 126 of FIG. 1, a level or amount of pellet fuel present in a pellet fuel storage compartment of a hopper of the pellet grill 100 (referenced herein as the "fuel level"). The controller 138 then compares the fuel level to one or more fuel level threshold(s). For example, the controller 138 compares the fuel level to a first fuel level threshold corresponding to the pellet fuel storage compartment of the hopper being occupied with pellet fuel by a first threshold amount (e.g., 50% of the compartment), and/or to a second fuel level threshold corresponding to the pellet fuel storage compartment of the hopper being occupied with pellet fuel by a second threshold amount (e.g., 25% of the compartment) that is less than the first threshold amount.

When executing the first lighting activation subroutine, the controller 138 of FIG. 1 first compares the fuel level to the first fuel level threshold. If the controller 138 determines that the fuel level is above the first fuel level threshold, the controller 138 commands, instructs, signals, and/or otherwise causes one or more of the light source(s) 116 of the lighting module 114 of FIG. 1 to display a first color (e.g., to illuminate in a first color). For example, the controller 138 can command, instruct, signal, and/or otherwise cause one or more of the light source(s) 116 of the lighting module 114 of FIG. 1 to display a shade of the color green (e.g., to illuminate in a shade of the color green). If the controller 138 of FIG. 1 instead determines that the fuel level is below the first fuel level threshold, the controller 138 compares the fuel level to the second fuel level threshold. If the controller 138 determines that the fuel level is above the second fuel level threshold, the controller 138 commands, instructs, signals, and/or otherwise causes one or more of the light source(s) 116 of the lighting module 114 of FIG. 1 to display a second color (e.g., to illuminate in a second color) that differs from the first color. For example, the controller 138 can command, instruct, signal, and/or otherwise cause one or more of the light source(s) 116 of the lighting module 114 of FIG. 1 to display a shade of the color yellow (e.g., to illuminate in a shade of the color yellow). If the controller 138 of FIG. 1 instead determines that the fuel level is below the second fuel level threshold, the controller 138 commands, instructs, signals, and/or otherwise causes one or more of the light source(s) 116 of the lighting module 114 of FIG. 1 to display a third color (e.g., to illuminate in a third color) that differs from the first color and from the second color. For example, the controller 138 can command, instruct, signal, and/or otherwise cause one or more of the light source(s) 116 of the lighting module 114 of FIG. 1 to display a shade of the color red (e.g., to illuminate in a shade of the color red).

In some examples, the controller 138 of FIG. 1 implements the first lighting activation subroutine as a looped control function, with such implementation continuing until a deactivation triggering event detected by the control system 102 of the pellet grill 100 dictates otherwise (e.g., detection of the control system 102 of the pellet grill 100 being in or transitioning into an OFF state, detection of the control system 102 of the pellet grill 100 initiating a shutdown sequence, detection of the switch 118 of the pellet grill 100 being in or transitioning into an OFF state, detection that the control system 102 of the pellet grill 100 has received a deactivation request associated with the lighting module 114, detection that the ambient light around the exterior of the pellet grill 100 is above the ambient light threshold, detection of a lid closing movement associated with the lid of the hopper of the pellet grill 100, etc.).

In some examples, the first fuel level threshold, the second fuel level threshold, the first display color, the second display color, and/or the third display color associated with the first lighting activation subroutine as described above is/are predetermined, preset, and/or preconfigured by a manufacturer of the pellet grill 100. In some examples, the first fuel level threshold, the second fuel level threshold, the first display color, the second display color, and/or the third display color associated with the first lighting activation subroutine as described above can be changed, modified, edited, and/or otherwise reconfigured by a user of the pellet grill 100 such that the first fuel level threshold, the second fuel level threshold, the first display color, the second display color, and/or the third display color associated with the first lighting activation subroutine is/are customized and/or personalized according to the user's preferences. While the above-described example of the first lighting activation subroutine specifically describes the use of two unique fuel level thresholds and three unique display colors, it is to be understood that the first lighting activation subroutine can instead be implemented using fewer or more unique fuel level thresholds (e.g., a single fuel level threshold, three unique fuel level thresholds, etc.) and/or fewer or more unique display colors (e.g., two unique display colors, four unique display colors, etc.).

In some examples, the controller 138 of FIG. 1 implements, manages, and/or controls a second lighting activation subroutine that is not based on (e.g., not dependent on) fuel level data sensed, measured, and/or detected by the fuel level sensor 126 of the control system 102 of the pellet grill 100 of FIG. 1. When executing the second lighting activation subroutine, the controller 138 of FIG. 1 commands, instructs, signals, and/or otherwise causes one or more of the light source(s) 116 of the lighting module 114 of FIG. 1 to display a color (e.g., to illuminate in a color). For example, the controller 138 can command, instruct, signal, and/or otherwise cause one or more of the light source(s) 116 of the lighting module 114 of FIG. 1 to display a shade of the color white (e.g., to illuminate in a shade of the color white). In some examples, the display color associated with the second lighting activation subroutine is a fourth display color (e.g., a shade of the color white) that differs from each of the first display color (e.g., a shade of the color green), the second display color (e.g., a shade of the color yellow), and the third display color (e.g., a shade of the color red) described above in connection with the first lighting activation subroutine.

In some examples, the controller 138 of FIG. 1 implements the second lighting activation subroutine as a looped control function, with such implementation continuing until a deactivation triggering event detected by the control system 102 of the pellet grill 100 dictates otherwise (e.g., detection of the control system 102 of the pellet grill 100 being in or transitioning into an OFF state, detection of the control system 102 of the pellet grill 100 initiating a shutdown sequence, detection of the switch 118 of the pellet grill 100 being in or transitioning into an OFF state, detection that the control system 102 of the pellet grill 100 has received a deactivation request associated with the lighting module 114, detection that the ambient light around the exterior of the pellet grill 100 is above the ambient light threshold, detection of a lid closing movement associated with the lid of the hopper of the pellet grill 100, etc.).

In some examples, the display color associated with the second lighting activation subroutine as described above is/are predetermined, preset, and/or preconfigured by a manufacturer of the pellet grill 100. In some examples, the display color associated with the second lighting activation subroutine as described above can be changed, modified, edited, and/or otherwise reconfigured by a user of the pellet grill 100 such that the display color associated with the second lighting activation subroutine is customized and/or personalized according to the user's preferences.

In some examples, the controller 138 of FIG. 1 implements, manages, and/or controls a third lighting activation subroutine that is based on (e.g., dependent on) fuel level data sensed, measured, and/or detected by the fuel level sensor 126 of the control system 102 of the pellet grill 100 of FIG. 1 and lid position data sensed, measured, and/or detected by the lid position sensor 124 of the control system 102 of the pellet grill 100 of FIG. 1. When executing the third lighting activation subroutine, the controller 138 of FIG. 1 determines, based on data sensed, measured, and/or detected by the fuel level sensor 126 of FIG. 1, a level or amount of pellet fuel present in a pellet fuel storage compartment of a hopper of the pellet grill 100 (referenced herein as the "fuel level"). The controller 138 then compares the determined fuel level to one or more fuel level threshold(s), and subsequently commands, instructs, signals, and/or otherwise causes one or more of the light source(s) 116 of the lighting module 114 of FIG. 1 to display a color corresponding to the result of the comparison. For example, the controller 138 of FIG. 1 can command, instruct, signal, and/or otherwise cause one or more of the light source(s) 116 of the lighting module 114 of FIGS. 1 to (1) display a first color (e.g., a shade of the color green) when the determined fuel level is above a first fuel level threshold corresponding to the pellet fuel storage compartment of the hopper being occupied with pellet fuel by a first threshold amount (e.g., 50% of the compartment), (2) display a second color (e.g., a shade of the color yellow) when the determined fuel level is below the first fuel level threshold, but above a second fuel level threshold corresponding to the pellet fuel storage compartment of the hopper being occupied with pellet fuel by a second threshold amount (e.g., 25% of the compartment), and (3) display a third color (e.g., a shade of the color red) when the determined fuel level is below the second fuel level threshold.

When executing the third lighting activation subroutine, the controller 138 of FIG. 1 also determines, based on data sensed, measured, and/or detected by the lid position sensor 124 of FIG. 1, whether a lid opening movement associated with the lid of the hopper of the pellet grill 100 (e.g., movement of the lid of the hopper from a closed position toward or to an open position) has occurred and/or has been detected. If the controller 138 determines that a lid opening movement associated with the lid of the hopper of the pellet grill 100 has occurred and/or has been detected, the controller 138 commands, instructs, signals, and/or otherwise causes one or more of the light source(s) 116 of the lighting module 114 of FIG. 1 to display a color corresponding to the open lid state. For example, the controller 138 of FIG. 1 can command, instruct, signal, and/or otherwise cause one or more of the light source(s) 116 of the lighting module 114 of FIG. 1 to display a fourth color (e.g., a shade of the color white) in response to the detected lid opening movement.

When executing the third lighting activation subroutine, the controller 138 of FIG. 1 also determines, based on data sensed, measured, and/or detected by the lid position sensor 124 of FIG. 1, whether a lid closing movement associated with the lid of the hopper of the pellet grill 100 (e.g., movement of the lid of the hopper from an open position toward or to a closed position) has occurred and/or has been detected. If the controller 138 determines that a lid opening movement associated with the lid of the hopper of the pellet grill 100 has occurred and/or has been detected, the controller 138 commands, instructs, signals, and/or otherwise causes one or more of the light source(s) 116 of the lighting module 114 of FIG. 1 to terminate the display of the color (e.g., to terminate the illumination of the color) corresponding to the open lid state. For example, the controller 138 of FIG. 1 can command, instruct, signal, and/or otherwise cause one or more of the light source(s) 116 of the lighting module 114 of FIG. 1 to terminate the display of the fourth color (e.g., a shade of the color white) that was previously commanded, instructed, signaled, and/or otherwise caused by the controller 138. The controller 138 may thereafter return to implementing the portion of the third lighting activation subroutine that is based on (e.g., dependent on) fuel level data sensed, measured, and/or detected by the fuel level sensor 126 of the control system 102 of the pellet grill 100 of FIG. 1, as described above.

In some examples, the controller 138 of FIG. 1 implements the third lighting activation subroutine as a looped control function, with such implementation continuing until a deactivation triggering event detected by the control system 102 of the pellet grill 100 dictates otherwise (e.g., detection of the control system 102 of the pellet grill 100 being in or transitioning into an OFF state, detection of the control system 102 of the pellet grill 100 initiating a shutdown sequence, detection of the switch 118 of the pellet grill 100 being in or transitioning into an OFF state, detection that the control system 102 of the pellet grill 100 has received a deactivation request associated with the lighting module 114, detection that the ambient light around the exterior of the pellet grill 100 is above the ambient light threshold, etc.).

In some examples, the first fuel level threshold, the second fuel level threshold, the first display color, the second display color, the third display color, and/or the fourth display color associated with the third lighting activation subroutine as described above is/are predetermined, preset, and/or preconfigured by a manufacturer of the pellet grill 100. In some examples, the first fuel level threshold, the second fuel level threshold, the first display color, the second display color, the third display color, and/or the fourth display color associated with the third lighting activation subroutine as described above can be changed, modified, edited, and/or otherwise reconfigured by a user of the pellet grill 100 such that the first fuel level threshold, the second fuel level threshold, the first display color, the second display color, the third display color, and/or the fourth display color associated with the third lighting activation subroutine is/are customized and/or personalized according to the user's preferences. While the above-described example of the third lighting activation subroutine specifically describes the use of two unique fuel level thresholds and four unique display colors, it is to be understood that the third lighting activation subroutine can instead be implemented using fewer or more unique fuel level thresholds (e.g., a single fuel level threshold, three unique fuel level thresholds, etc.) and/or fewer or more unique display colors (e.g., three unique display colors, five unique display colors, etc.).

The memory 140 of FIG. 1 can be implemented by any type(s) and/or any number(s) of storage device(s) such as an optical storage device, a magnetic storage device, a floppy disk drive, a hard disk drive (HDD), a solid state storage device, a flash memory, a read-only memory (ROM), a random-access memory (RAM), a volatile memory, a non-volatile memory, a cache, a CD, a DVD, a Blu-ray disk, and/or any other tangible storage device or tangible storage disk in which information is stored for any duration (e.g., permanently, for extended time periods, for brief instances, for temporarily buffering, and/or for caching of the information). The information and/or data stored in the memory 140 of FIG. 1 can be stored in any file and/or data structure format, organization scheme, and/or arrangement. The memory 140 of FIG. 1 is accessible to one or more of the engine 106 (e.g., including the auger motor 108, the ignitor 110, and the fan 112), the lighting module 114 (e.g., including the light source(s) 116), the switch 118, the state sensor 120, the ambient light sensor 122, the lid position sensor 124, the fuel level sensor 126, the user interface 128 (e.g., including the input device(s) 130 and the output device(s) 132), the network interface 134 (e.g., including the communication device(s) 136), and/or the controller 138 of the control system 102 of the pellet grill 100 of FIG. 1.

The memory 140 of FIG. 1 stores data sensed, measured, detected, generated, determined, computed, calculated, identified, presented, input, output, transmitted, and/or received by, to, and/or from the engine 106 (e.g., including the auger motor 108, the ignitor 110, and the fan 112), the lighting module 114 (e.g., including the light source(s) 116), the switch 118, the state sensor 120, the ambient light sensor 122, the lid position sensor 124, the fuel level sensor 126, the user interface 128 (e.g., including the input device(s) 130 and the output device(s) 132), the network interface 134 (e.g., including the communication device(s) 136), and/or the controller 138 of the control system 102 of the pellet grill 100. The memory 140 also stores one or more ambient light threshold(s), one or more fuel level threshold(s), correlation data (e.g., correlating determined fuel level to commanded display color of the light source(s) 116 of the lighting module 114, correlating detected lid position to commanded display color of the light source(s) 116 of the lighting module 114, etc.), and/or settings data (e.g., customized user settings associated with control and/or illumination of the light source(s) 116 of the lighting module 114) accessed by the controller 138 of the control system 102 of the pellet grill 100 of FIG. 1. The memory 140 also stores instructions (e.g., computer-readable instructions) and associated data corresponding to one or more lighting control protocol(s), process(es), program(s), sequence(s), subroutine(s), and/or method(s) described below in connection with FIGS. 11-19.

The remote device(s) 144 of FIG. 1 can be implemented by any type(s) and/or any number(s) of mobile or stationary computing devices. In this regard, examples of such remote device(s) 144 include a smartphone, a tablet, a laptop, a desktop, a cloud server, a wearable computing device, a wireless control hub, etc. The remote device(s) 144 of FIG. 1 facilitate(s) a remote (e.g., wired, or wireless) extension of the above-described user interface 128 of the pellet grill 100. In this regard, each remote device 144 includes one or more input device(s) and/or one or more output device(s) that mimic and/or enable a remotely-located version of the above-described functionality of the corresponding input device(s) 130 and/or the corresponding output device(s) 132 of the user interface 128 of the pellet grill 100. Accordingly, one or more input(s), selection(s), instruction(s), and/or command(s) received at the pellet grill 100 (e.g., via the communication device(s) 136 of the network interface 134 of the pellet grill 100) from the remote device(s) 144 can be entered and/or made via the input device(s) of the remote device(s) 144 much in the same way that such input(s), selection(s), instruction(s), and/or command(s) would be entered and/or made via the input device(s) 130 of the user interface 128 of the pellet grill 100. Similarly, one or more notification(s), prompt(s), request(s), and/or confirmation(s) transmitted from the pellet grill 100 (e.g., via the communication device(s) 136 of the network interface 134 of the pellet grill 100) to the remote device(s) 144 can be presented via the output device(s) of the remote device(s) 144 much in the same way that such notification(s), prompt(s), request(s), and/or confirmation(s) would be presented via the output device(s) 132 of the user interface 128 of the pellet grill 100.

While an example manner of implementing the control system 102 and/or, more generally, the pellet grill 100 is illustrated in FIG. 1, one or more of the elements, processes, and/or devices illustrated in FIG. 1 may be combined, divided, re-arranged, omitted, eliminated, and/or implemented in any other way. Further, the DC power supply 104, the engine 106 (e.g., including the auger motor 108, the ignitor 110, and the fan 112), the lighting module 114 (e.g., including the light source(s) 116), the switch 118, the state sensor 120, the ambient light sensor 122, the lid position sensor 124, the fuel level sensor 126, the user interface 128 (e.g., including the input device(s) 130 and the output device(s) 132), the network interface 134 (e.g., including the communication device(s) 136), the controller 138, the memory 140, and/or, more generally, the control system 102 of the pellet grill 100 of FIG. 1, may be implemented by hardware alone or by hardware in combination with software and/or firmware. Thus, for example, any of the DC power supply 104, the engine 106 (e.g., including the auger motor 108, the ignitor 110, and the fan 112), the lighting module 114 (e.g., including the light source(s) 116), the switch 118, the state sensor 120, the ambient light sensor 122, the lid position sensor 124, the fuel level sensor 126, the user interface 128 (e.g., including the input device(s) 130 and the output device(s) 132), the network interface 134 (e.g., including the communication device(s) 136), the controller 138, the memory 140, and/or, more generally, the control system 102 of the pellet grill 100 of FIG. 1 could be implemented at least in part by processor circuitry including any type(s) and/or any number(s) of processor(s), microprocessor(s), controller(s), microcontroller(s), ASIC(s), PLD(s), FPLD(s), FPGA(s), DSP(s), GPU(s), CPU(s), semiconductor-based (e.g., silicon-based) circuit(s), digital circuit(s), analog circuit(s), logic circuit(s), and/or integrated circuit(s) implemented by any type(s) and/or any number(s) of transistor(s), capacitor(s), diode(s), inductor(s), resistor(s), timer(s), counter(s), printed circuit board(s), connector(s), wire(s), and/or other electrical circuit component(s). Further still, the example control system 102 of the pellet grill 100 of FIG. 1 may include one or more element(s), component(s), and/or device(s) in addition to, or instead of, those illustrated in FIG. 1, and/or may include more than one of any or all of the illustrated element(s), component(s), and/or device(s).

Figure 2:
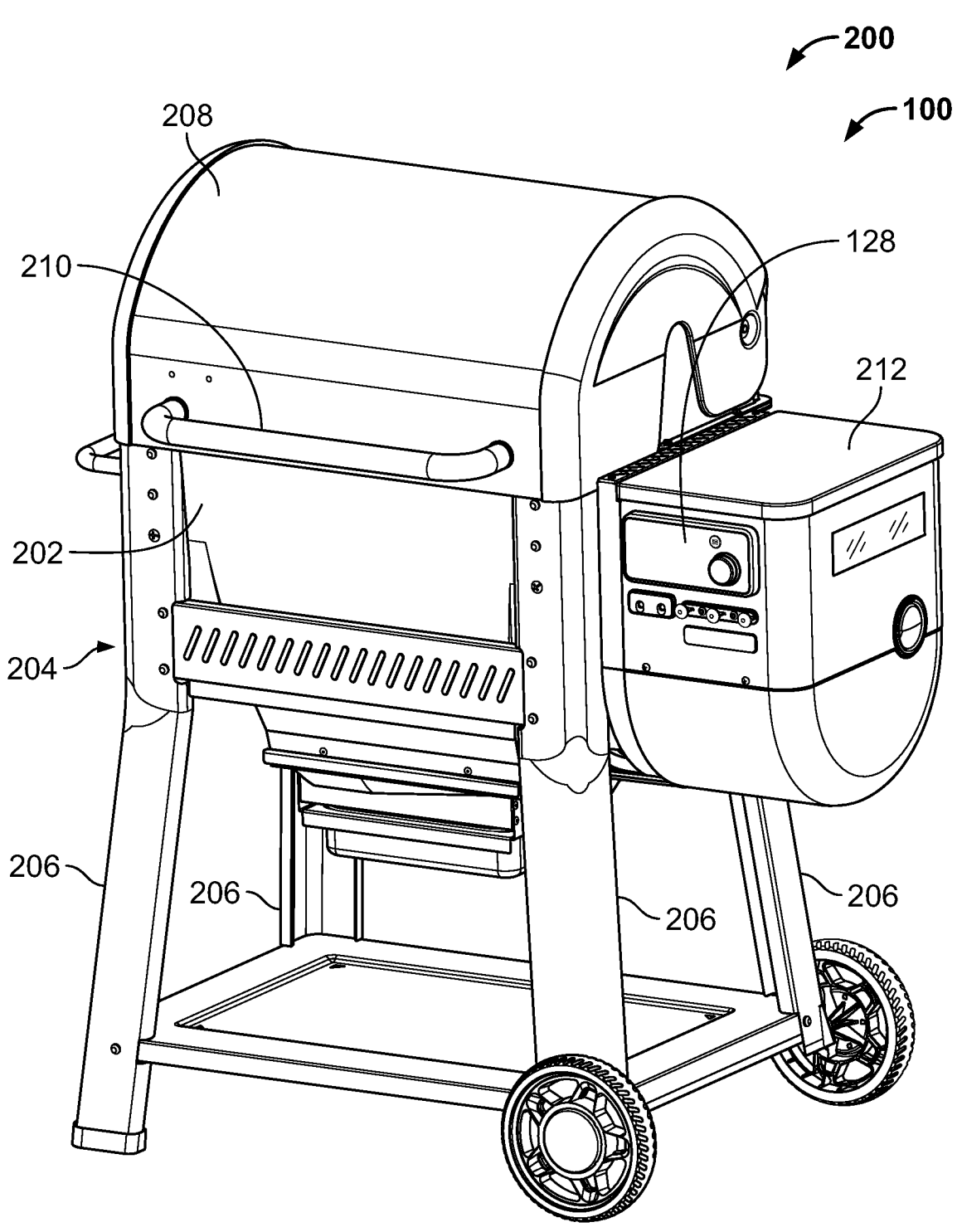
FIG. 2 is perspective view of an example implementation of the pellet grill of FIG. 1.
Figure 3:
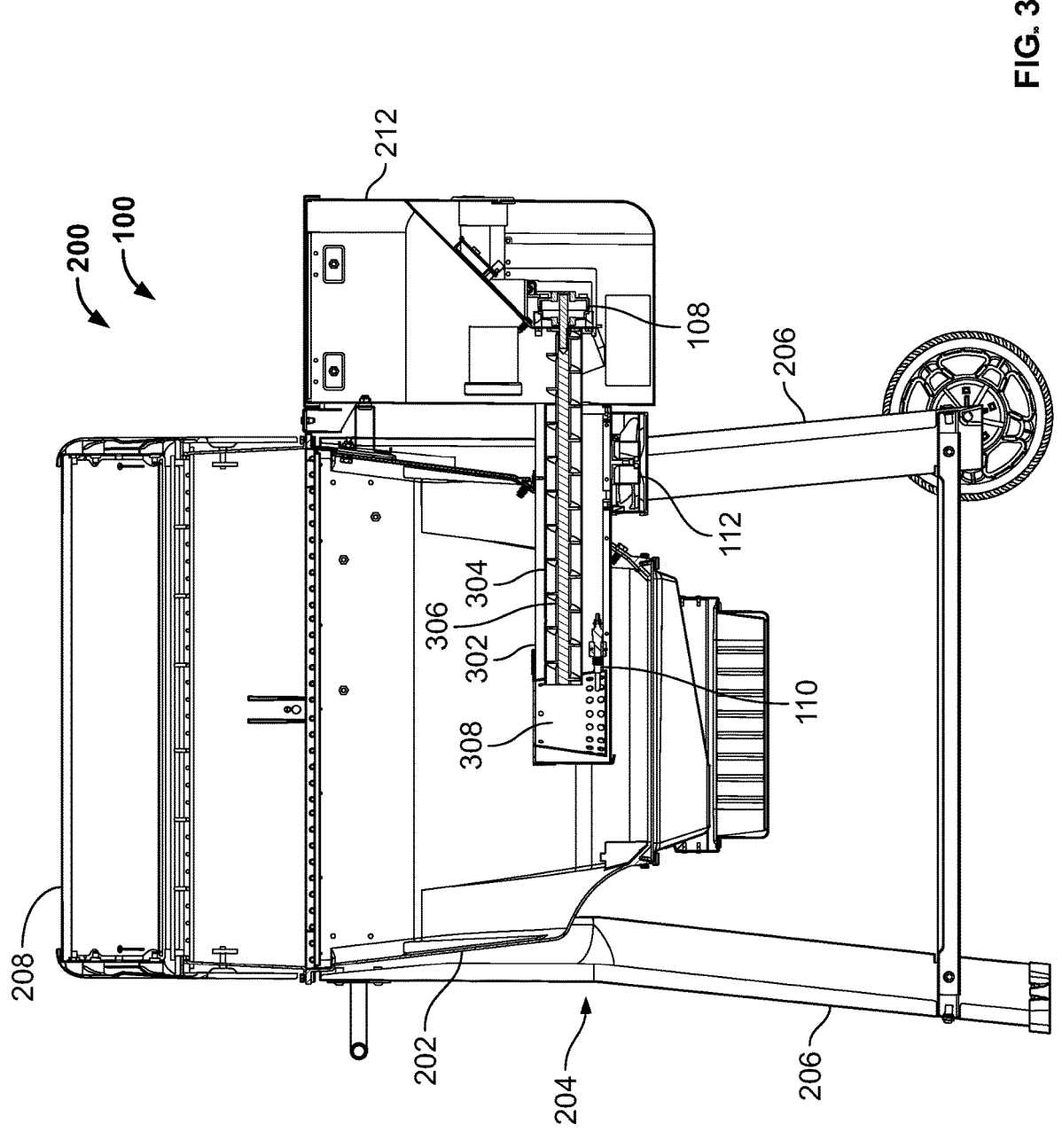
FIG. 3 is a partial cutaway view of the pellet grill of FIG. 2.

FIG. 2 is perspective view of an example implementation 200 of the pellet grill 100 of FIG. 1. FIG. 3 is a partial cutaway view of the pellet grill 100 of FIG. 2. In the illustrated example of FIGS. 2 and 3, the pellet grill 100 includes an example cookbox 202, with the cookbox 202 being configured to form a cooking chamber suitable for cooking one or more item(s) of food. In some examples, the cookbox 202 of FIGS. 2 and 3 is further configured to house, carry, and/or support one or more cooking grate(s) located and/or positioned within the cookbox 202. In some examples, the cookbox 202 of FIGS. 2 and 3 is further configured to house, carry, and/or support one or more grease deflector(s) and/or one or more heat diffuser(s) located and/or positioned within the cookbox 202 below the cooking grate(s).

The pellet grill 100 of FIGS. 2 and 3 further includes an example frame 204. In the illustrated example of FIGS. 2 and 3, the frame 204 includes one or more example support member(s) 206 (e.g., one or more vertically oriented leg(s)) that are configured to support the cookbox 202 above an underlying ground surface. The support member(s) 206 and/or, more generally, the frame 204 can be configured from any number and any type of structural components arranged in any manner that facilitates supporting the cookbox 202 above an underlying ground surface when the pellet grill 100 is in use. For example, while each of the one or more support member(s) 206 shown in FIGS. 2 and 3 is fixed relative to the cookbox 202, in other examples the frame 204 can include one or more foldable, slidable, and/or telescoping support member(s) 206 that facilitate collapsing and/or otherwise modifying the frame 204 of the pellet grill 100 when the pellet grill 100 is not in use. The pellet grill 100 of FIGS. 2 and 3 can further include any number of tables and/or shelves coupled to the frame 204 and/or the cookbox 202 of the pellet grill 100.

The pellet grill 100 of FIGS. 2 and 3 further includes an example lid 208 configured to cover and/or enclose the cookbox 202 of the pellet grill 100 when the lid 208 is in a closed position. The lid 208 is movable relative to the cookbox 202 between a closed position and an open position in which a cooking surface (e.g., a cooking grate) located on or within the cookbox 202 is exposed. In the illustrated example of FIGS. 2 and 3, the lid 208 is pivotally coupled to the cookbox 202 via one or more hinge(s) and/or pivot(s) that mechanically couple the lid 208 to the cookbox 202. Movement of the lid 208 of the pellet grill 100 between the closed position and the open position can be facilitated via user interaction with an example handle 210 that is coupled to the lid 208.

The pellet grill 100 of FIGS. 2 and 3 further includes an example hopper 212, an example engine housing 302, an example auger tube 304, an example auger 306, the auger motor 108, an example burn pot 308, the ignitor 110, and the fan 112. The hopper 212 is coupled to the cookbox 202 and/or to the frame 204, with the hopper 212 being configured to hold and/or contain a supply of combustible wood pellets (e.g., pellet fuel). The auger 306 is located within the auger tube 304. The auger tube 304 and the auger 306 respectively extend from the hopper 212 of the pellet grill 100, through a side opening formed in a sidewall of the cookbox 202, and into a cooking chamber of the cookbox 202 defined by an interior surface of the cookbox 202. Portions of the auger tube 304 and the auger 306 extending into the cooking chamber of the cookbox 202 are located within the engine housing 302. The burn pot 308 and the ignitor 110 are also located within the engine housing 302. The fan 112 is coupled to the engine housing 302. In the illustrated example of FIGS. 2 and 3, the auger tube 304 and the auger 306 respectively extend to and/or or into the burn pot 308 such that that auger tube 304 and the auger 306 collectively transport wood pellets from the hopper 212 into the burn pot 308. A first end of the ignitor 110 also extends into the burn pot 308 such that a heat-generating portion (e.g., an ignition tip) of the ignitor 110 contacts at least some of the wood pellets received in the burn pot 308.

During operation of the pellet grill 100, combustible wood pellets pass from the hopper 212 into the auger tube 304 of the pellet grill 100. Combustible wood pellets received in the auger tube 304 from the hopper 212 are thereafter transported through the auger tube 304 toward and/or into the burn pot 308 of the pellet grill 100 via rotation of the auger 306 of the pellet grill 100 (e.g., as driven by the auger motor 108 of the pellet grill 100). Combustion of the wood pellets received in the burn pot 308 can be initiated via activation of the ignitor 110 of the pellet grill 100. Once combustion of the wood pellets received in the burn pot 304 has commenced via the ignition process, the rate of such combustion can be managed via a controlled airflow generated by the fan 112 of the pellet grill 100, with said airflow being delivered from the fan 112 into the engine housing 302 of the pellet grill 100, and through the engine housing 302 to the burn pot 308.

The pellet grill 100 of FIGS. 2 and 3 further includes the DC power supply 104, the lighting module 114, the switch 118, the state sensor 120, the ambient light sensor 122, the lid position sensor 124, the fuel level sensor 126, the user interface 128, the network interface 134, the controller 138, and/or the memory 140 described above in connection with FIG. 1. In the illustrated example of FIGS. 2 and 3, lighting module 114, the lid position sensor 124, the fuel level sensor 126, and/or the user interface 128 is/are coupled and/or mounted to the hopper 212 of the pellet grill 100. The DC power supply 104, switch 118, the state sensor 120, the ambient light sensor 122, the network interface 134, the controller 138, and/or the memory 140 can also be coupled and/or mounted to the hopper 212 of the pellet grill 100, or can alternatively be coupled and/or mounted to another structural component of the pellet grill 100 such as the frame 204 or the cookbox 202 of the pellet grill 100, and/or to a table or shelf of the pellet grill 100.

Figure 4:
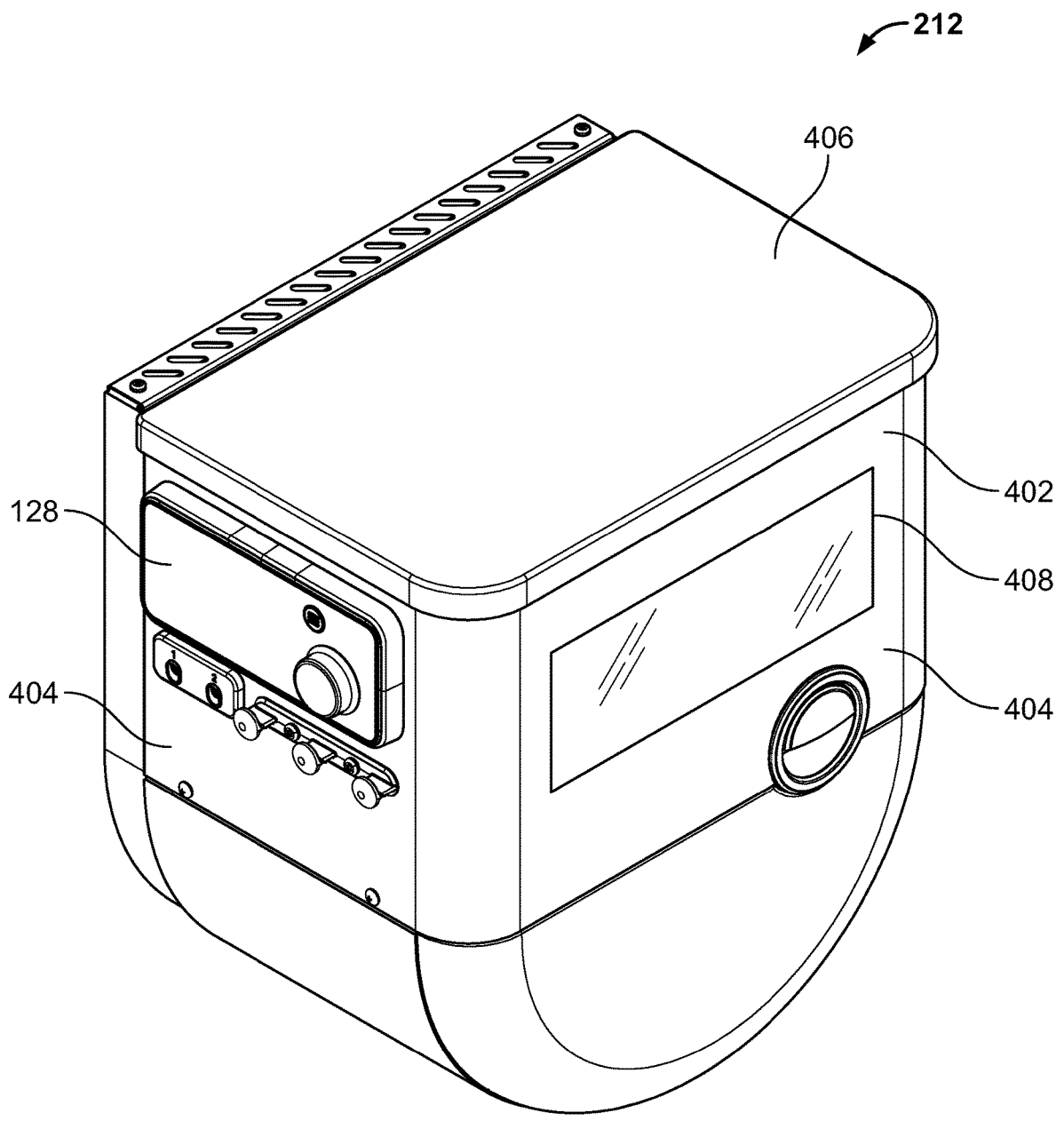
FIG. 4 is a perspective view of the hopper of the pellet grill of FIGS. 2 and 3, with the hopper shown in isolation.
Figure 5:
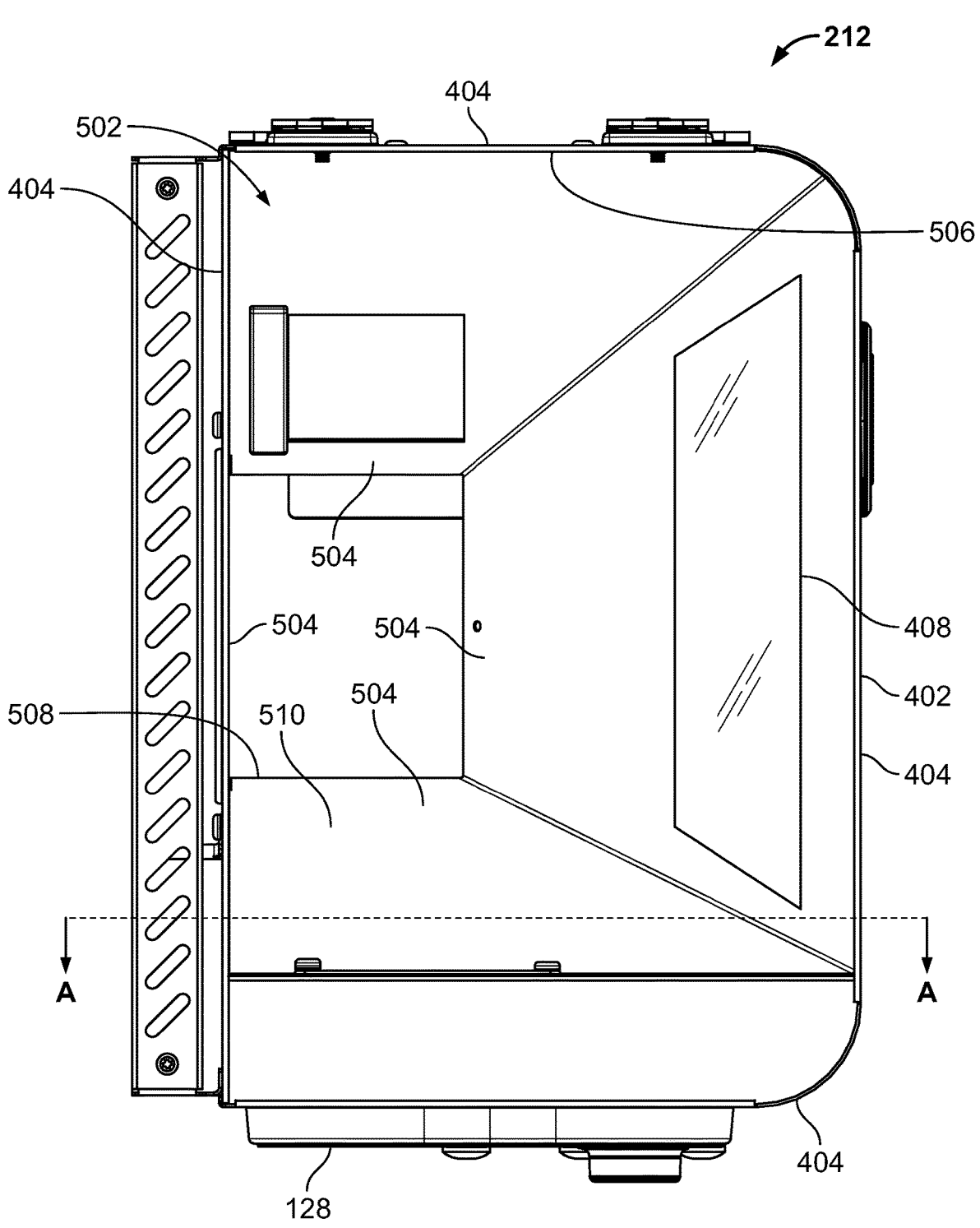
FIG. 5 is a top view of the hopper of FIG. 4, with the lid of the hopper omitted.
Figure 6:
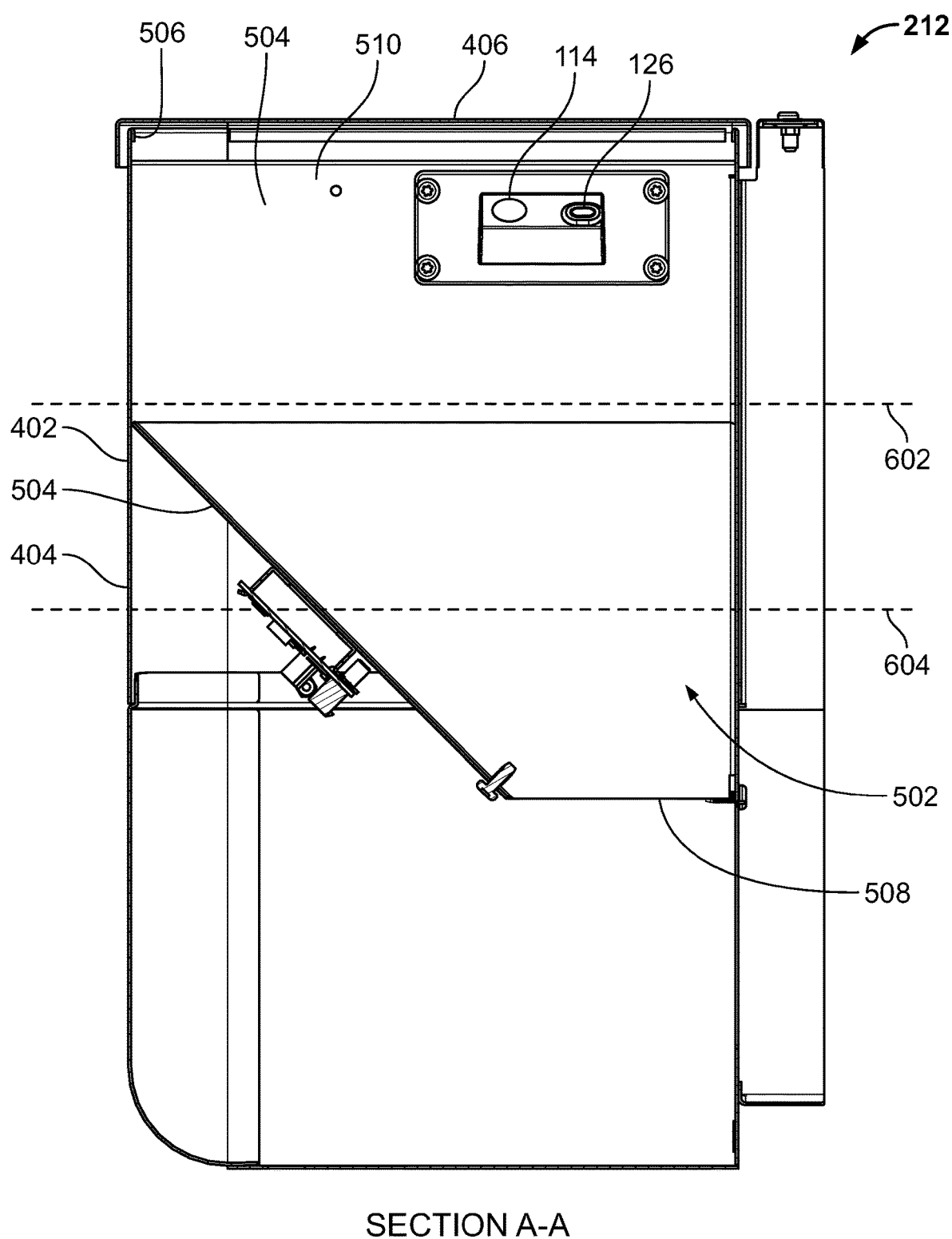
FIG. 6 is a cross-sectional view of the hopper of FIGS. 4 and 5 taken along section A-A of FIG. 6.

FIG. 4 is a perspective view of the hopper 212 of the pellet grill 100 of FIGS. 2 and 3, with the hopper 212 shown in isolation. FIG. 5 is a top view of the hopper 212 of FIG. 4, with the lid of the hopper 212 omitted. FIG. 6 is a cross-sectional view of the hopper 212 of FIGS. 4 and 5 taken along section A-A of FIG. 6. In the illustrated example of FIGS. 4-6, the hopper 212 includes an example housing 402 and example pellet fuel storage compartment 502. The housing 402 of the hopper 212 includes and/or is formed by one or more example exterior wall(s) 404. The pellet fuel storage compartment 502 of the hopper 212 is located within the housing 402 of the hopper 212. The pellet fuel storage compartment 502 is configured to hold and/or contain a supply of combustible wood pellets (e.g., pellet fuel). The pellet fuel storage compartment 502 of the hopper 212 includes and/or is formed by one or more example interior wall(s) 504. In the illustrated example of FIGS. 4-6, one or more of the interior wall(s) 504 of the hopper 212 is/are oriented in a non-vertical plane. In some examples, one or more gap(s) are present between the exterior wall(s) 404 that define(s) the housing 402 of the hopper 212 and the interior wall(s) 504 that define(s) the pellet fuel storage compartment 502 of the hopper 212. In some examples, such gaps form cavities and/or compartments that are suitably configured for receiving one or more portion(s) of the DC power supply 104, the auger motor 108, the lighting module 114, the switch 118, the state sensor 120, the ambient light sensor 122, the lid position sensor 124, the fuel level sensor 126, the user interface 128, the network interface 134, the controller 138, and/or the memory 140 of the pellet grill 100.

In the illustrated example of FIGS. 4-6, the pellet fuel storage compartment 502 of the hopper 212 of includes an example intake opening 506 and an example feed opening 508. The intake opening 506 of the pellet fuel storage compartment 502 is located proximate the upper end of the interior wall(s) 504 of the hopper 212. The intake opening 506 of the pellet fuel storage compartment 502 is configured to intake and/or receive combustible wood pellets into the pellet fuel storage compartment 502 when a lid of the hopper 212 is in an open position, as further described below. The feed opening 508 of the pellet fuel storage compartment 502 is located proximate the lower end of the interior wall(s) 504 of the hopper 212, opposite the intake opening 506 of the pellet fuel storage compartment 502. The feed opening 508 of the pellet fuel storage compartment 502 is configured to feed and/or expel combustible wood pellets from the pellet fuel storage compartment 502 into the auger tube 304 of the pellet grill 100. Combustible wood pellets deposited into the pellet fuel storage compartment 502 of the hopper 212 via the intake opening 506 are stored within the pellet fuel storage compartment 502 for a temporary duration (e.g., minutes, hours, days, weeks, etc.) until such combustible wood pellets are drawn from the pellet fuel storage compartment 502, through the feed opening 508, and into the auger tube 304 of the pellet grill 100 by a combination of gravity and operation of the auger 306 of the pellet grill 100.

In the illustrated example of FIGS. 4-6, the hopper 212 further includes an example lid 406 configured to cover and/or enclose the pellet fuel storage compartment 502 of the hopper 212 when the lid 406 is in a closed position. The lid 406 of the hopper 212 is movable relative to the housing 402 of the hopper 212 between a closed position and an open position in which the intake opening 506 of the pellet fuel storage compartment 502 of the hopper 212 is exposed. Combustible wood pellets can be deposited into the pellet fuel storage compartment 502 of the hopper 212 via the intake opening 506 of the pellet fuel storage compartment 502 when the lid 406 of the hopper 212 is in the open position. In the illustrated example of FIGS. 4-6, the lid 406 of the hopper 212 is pivotally coupled to the housing 402 of the hopper 212 via one or more hinge(s) and/or pivot(s) that mechanically couple the lid 406 to the housing 402. In some examples, the lid position sensor 124 is coupled and/or mounted to the lid 406 of the hopper 212 to facilitate sensing, measuring, and or detecting the position of the lid 406 of the hopper 212 (e.g., relative to the housing 402 of the hopper 212), and/or to facilitate sensing, measuring, and or detecting movement of the lid 406 of the hopper 212 (e.g., relative to the housing 402 of the hopper 212) between the closed position and the open position (e.g., a lid opening movement, or a lid closing movement).

In the illustrated example of FIGS. 4-6, the lighting module 114 of the pellet grill 100 is located on and/or in the hopper 212 of the pellet grill 100 at a position that enables light generated by the light source(s) 116 of the lighting module 114 to be projected into, onto, and/or across the pellet fuel storage compartment 502 of the hopper 212. Similarly, the fuel level sensor 126 of the pellet grill 100 is located on and/or in the hopper 212 of the pellet grill 100 at a position that enables the fuel level sensor 126 to sense, measure, and/or detect the level or amount of pellet fuel present in the pellet fuel storage compartment 502 of the hopper 212. In the illustrated example of FIGS. 4-6, the lighting module 114 and the fuel level sensor 126 of the pellet grill 100 are respectively mounted on and/or otherwise located along one or more of the interior wall(s) 504 of the hopper 212. For example, as shown in FIG. 6, the lighting module 114 and the fuel level sensor 126 are both mounted on and/or otherwise located along an example front interior wall 510 of the hopper 212. In other examples, the lighting module 114 and/or the fuel level sensor 126 can instead be mounted on and/or located along a different one of the interior wall(s) 504 of the hopper 212, such as a rear interior wall or a side interior wall of the hopper 212. In still other examples, the lighting module 114 and/or the fuel level sensor 126 can instead be mounted on and/or located along an underside of the lid 406 of the hopper 212.

Figure 7:
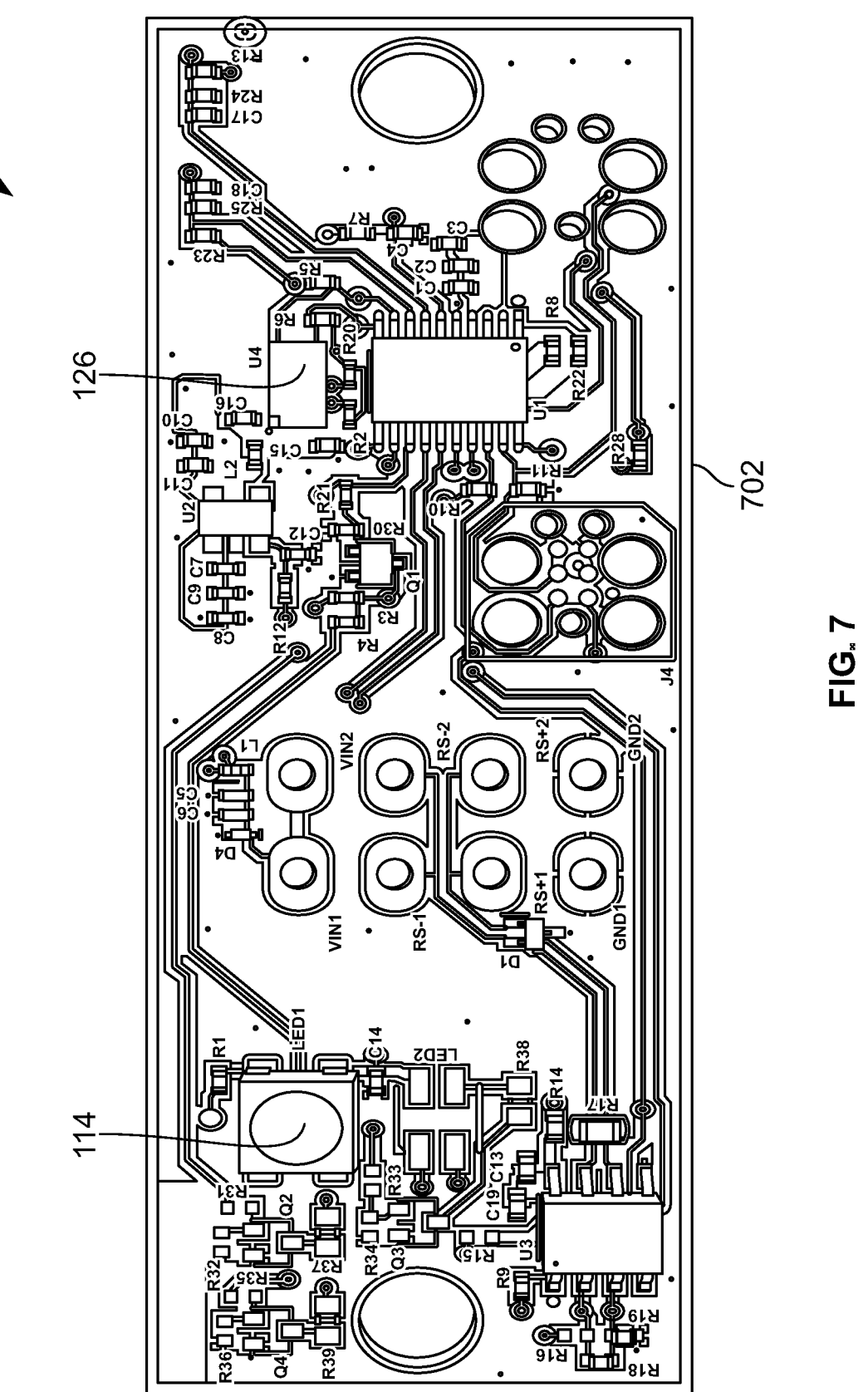
FIG. 7 is an example printed circuit board assembly implemented in the hopper of FIGS. 4-6.

In some examples, the lighting module 114 and the fuel level sensor 126 of the pellet grill 100 are both mounted on a printed circuit board (PCB) such that the lighting module 114 and the fuel level sensor 126 are integral components of a printed circuit board assembly (PCBA) that includes the PCB. For example, FIG. 7 is an example PCBA 700 implemented in the hopper 212 of FIGS. 4-6. The PCBA 700 of FIG. 7 includes an example PCB 702 on which example implementations of the lighting module 114 and the fuel level sensor 126 of the pellet grill 100 are mounted. In the illustrated example of FIG. 7, the lighting module 114 (e.g., including the light source(s) 116) is implemented as a multicolor LED (e.g., a RGBW LED), and the fuel level sensor 126 is implemented as an infrared sensor. The PCBA 700 of FIG. 7 is configured to be mounted on and/or located along the front interior wall 510 of the hopper 212, as generally shown in FIGS. 5 and 6.

Returning to the illustrated example of FIGS. 4-6, one or more fuel level threshold(s) are associated with the fuel level sensor 126 and/or the pellet fuel storage compartment 502 of the hopper 212. As shown in FIG. 6, an example first fuel level threshold 602 corresponds to the pellet fuel storage compartment 502 of the hopper 212 being occupied with pellet fuel by a first threshold amount (e.g., 50% of the compartment). As further shown in FIG. 6, an example second fuel level threshold 604 corresponds to the pellet fuel storage compartment 502 of the hopper 212 being occupied with pellet fuel by a second threshold amount (e.g., 25% of the compartment) that is less than the first threshold amount. While the illustrated example of FIGS. 4-6 shows the use of two unique fuel level thresholds, it is to be understood that a different number of unique fuel level thresholds (e.g., a single fuel level threshold, three unique fuel level thresholds, etc.) can instead be implemented.

In the illustrated example of FIGS. 4-6, the hopper 212 further includes an example viewing window 408 formed in one of the exterior wall(s) 404 of the housing 402 and/or formed in one of the interior wall(s) 504 of the pellet fuel storage compartment 502. The viewing window 408 of the hopper 212 is formed from a transparent or translucent material that advantageously enables a user to view the level or amount of pellet fuel that is occupying the pellet fuel storage compartment 502 of the hopper 212 without requiring the user to open the lid 406 of the hopper 212. The transparency and/or translucency of the viewing window 408 also advantageously enables a user of the pellet grill to view a displayed color of light projected into and/or otherwise presented within the pellet fuel storage compartment 502 of the hopper 212 (e.g., by the light source(s) 116 of the lighting module 114) without requiring the user to open the lid 406 of the hopper 212. The user can accordingly make an intuitive (e.g., visual) determination as to the level or amount of pellet fuel remaining in the pellet fuel storage compartment 502 of the hopper 212 at any given time based on the color of displayed light that is visible to the user through the viewing window 408. For example, a user who views the color red via the viewing window 408 of the hopper 212 will intuitively realize that the level and/or amount of pellet fuel occupying the pellet fuel storage compartment 502 is low, and/or that more pellet fuel should be added to the pellet fuel storage compartment 502 so that the pellet grill 100 can continue performing cooking operations that require the use and/or consumption of pellet fuel. Conversely, a user who views the color green via the viewing window 408 of the hopper 212 will intuitively realize that the level and/or amount of pellet fuel occupying the pellet fuel storage compartment 502 is high, and/or that there is no current need to add more pellet fuel to the pellet fuel storage compartment 502.

In the illustrated example of FIGS. 4-6, the viewing window 408 is located on and/or along a side wall of the hopper 212. In other examples, the viewing window 408 can instead be located on and/or along a different wall (e.g., a front wall) of the hopper 212, or on and/or along the lid 406 of the hopper 212. While the presence of the viewing window 408 can provide certain benefits, advantages, and/or conveniences to the user of the pellet grill 100, it is to be understood that the viewing window 408 is not required for the controller 138 and/or, more generally, for the control system 102 of the pellet grill 100 to implement and/or perform any of the lighting control processes and/or the lighting activation subroutines described above.

Figure 8:
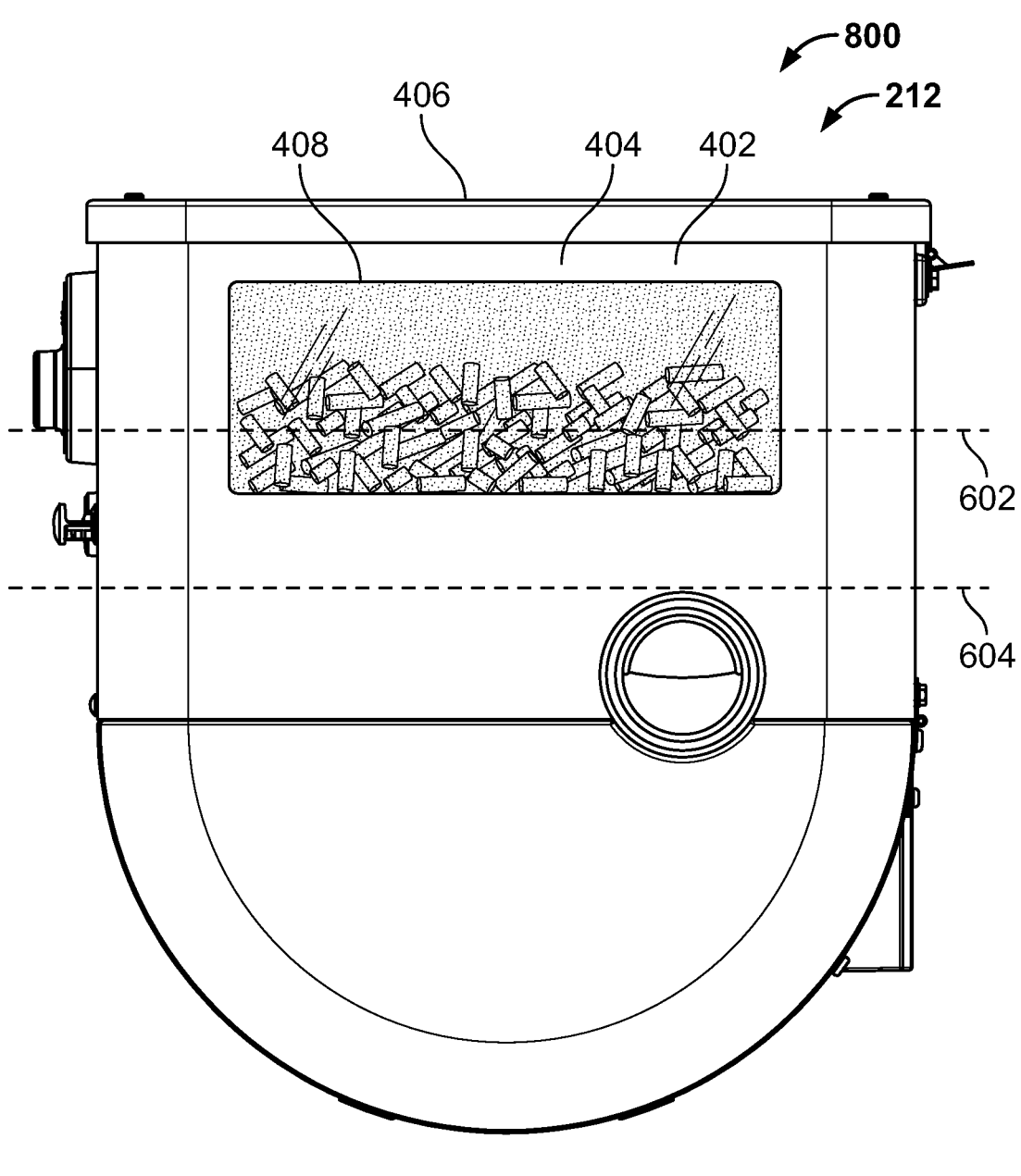
FIG. 8 is a side view of the hopper of FIGS. 4-6, with the hopper implementing an example first lighting configuration.
Figure 9:
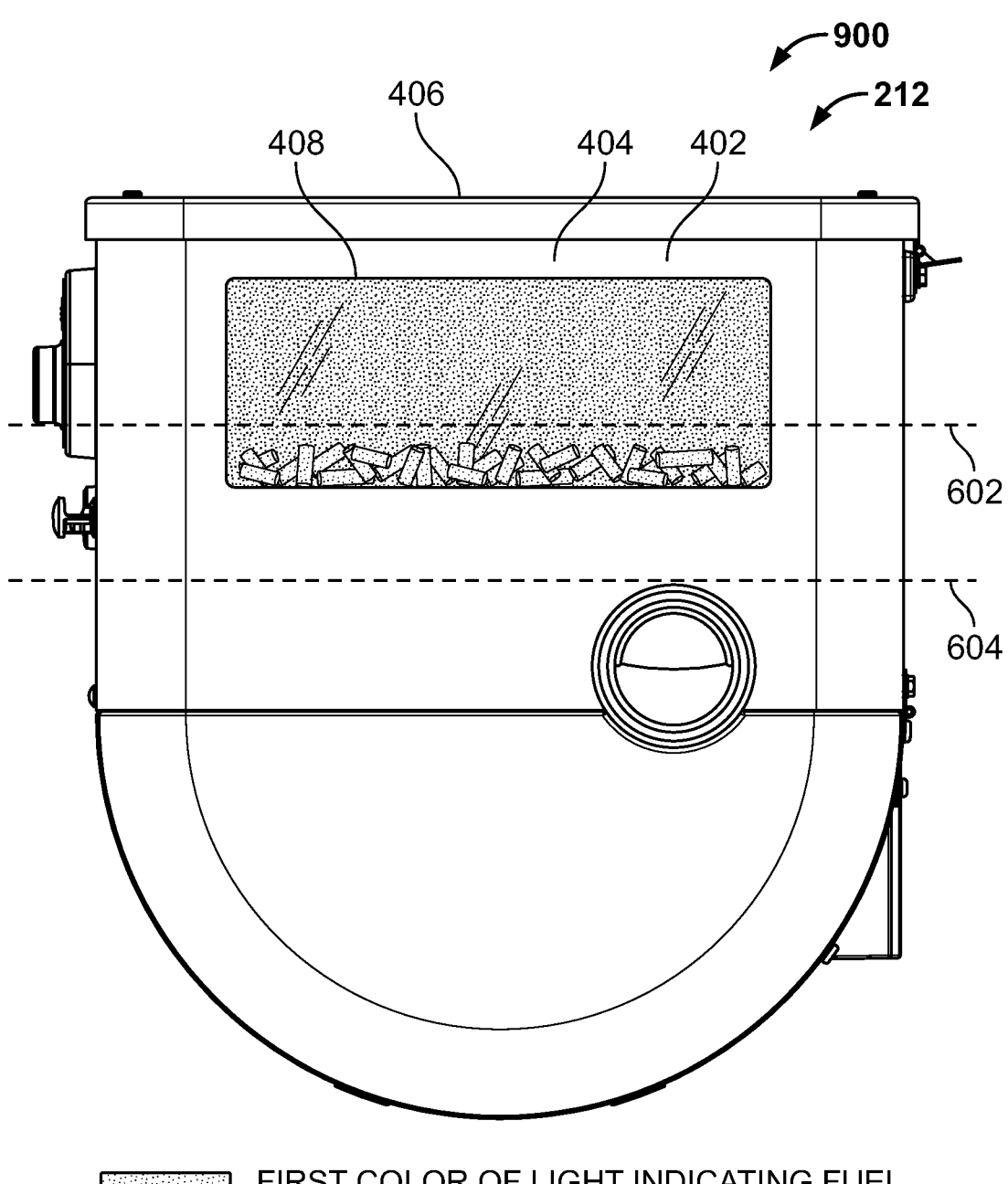
FIG. 9 is a side view of the hopper of FIGS. 4-6 and 8, with the hopper implementing an example second lighting configuration.

FIGS. 8-10 illustrate example lighting configurations of the hopper 212 corresponding to detected pellet fuel levels within the pellet fuel storage compartment 502 of the hopper 212 in relation to the first fuel level threshold 602 and the second fuel level threshold 604 associated with the pellet fuel storage compartment 502 of the hopper 212. FIG. 8 is a side view of the hopper 212 of FIGS. 4-6, with the hopper 212 implementing an example first lighting configuration 800. In the first lighting configuration 800 of FIG. 8, the level or amount of pellet fuel occupying the pellet fuel storage compartment 502 of the hopper 212 is above the first fuel level threshold 602. In response to the fuel level sensor 126 sensing, measuring, and/or detecting the illustrated level or amount of pellet fuel shown in FIG. 8, the controller 138 determines that the detected level or amount of pellet fuel is above the first fuel level threshold 602. The controller 138 accordingly commands, instructs, signals, and/or otherwise causes one or more of the light source(s) 116 of the lighting module 114 of FIG. 1 to display, project, and/or present a first color (e.g., a shade of the color green) within the pellet fuel storage compartment 502 of the hopper 212. The first color displayed, projected, and/or presented by the lighting source(s) 116 of the lighting module 114 is visible to a user from an external location (e.g., remote from the pellet grill 100) through the viewing window 408 of the hopper 212.

FIG. 9 is a side view of the hopper 212 of FIGS. 4-6 and 8, with the hopper 212 implementing an example second lighting configuration 900. In the second lighting configuration 900 of FIG. 9, the level or amount of pellet fuel occupying the pellet fuel storage compartment 502 of the hopper 212 is below the first fuel level threshold 602, but above the second fuel level threshold 604. In response to the fuel level sensor 126 sensing, measuring, and/or detecting the illustrated level or amount of pellet fuel shown in FIG. 9, the controller 138 determines that the detected level or amount of pellet fuel is below the first fuel level threshold 602 and above the second fuel level threshold 604. The controller 138 accordingly commands, instructs, signals, and/or otherwise causes one or more of the light source(s) 116 of the lighting module 114 of FIG. 1 to display, project, and/or present a second color (e.g., a shade of the color yellow) within the pellet fuel storage compartment 502 of the hopper 212, with the second color differing from the first color discussed above in connection with FIG. 8. The second color displayed, projected, and/or presented by the lighting source(s) 116 of the lighting module 114 is visible to a user from an external location (e.g., remote from the pellet grill 100) through the viewing window 408 of the hopper 212.

FIG. 10 is a side view of the hopper 212 of FIGS. 4-6, 8, and 9, with the hopper 212 implementing an example third lighting configuration 1000. In the third lighting configuration 1000 of FIG. 10, the level or amount of pellet fuel occupying the pellet fuel storage compartment 502 of the hopper 212 is below the second fuel level threshold 604. In response to the fuel level sensor 126 sensing, measuring, and/or detecting the illustrated level or amount of pellet fuel shown in FIG. 10, the controller 138 determines that the detected level or amount of pellet fuel is below the second fuel level threshold 604. The controller 138 accordingly commands, instructs, signals, and/or otherwise causes one or more of the light source(s) 116 of the lighting module 114 of FIG. 1 to display, project, and/or present a third color (e.g., a shade of the color red) within the pellet fuel storage compartment 502 of the hopper 212, with the third color differing from the first color discussed above in connection with FIG. 8 and also differing from the second color discussed above in connection with FIG. 9. The third color displayed, projected, and/or presented by the lighting source(s) 116 of the lighting module 114 is visible to a user from an external location (e.g., remote from the pellet grill 100) through the viewing window 408 of the hopper 212.

Flowcharts representing example machine-readable instructions, which may be executed to configure processor circuitry to implement the pellet grill 100 of FIG. 1, are shown in FIGS. 11-19. The machine-readable instructions may be one or more executable program(s) or portion(s) thereof for execution by processor circuitry, such as the processor circuitry 2002 shown in the example processor platform 2000 discussed below in connection with FIG. 20. The program(s) may be embodied in software stored on one or more non-transitory computer readable storage media such as an optical storage device, a magnetic storage device, a floppy disk drive, a hard disk drive (HDD), a solid state storage device, a flash memory, a read-only memory (ROM), a random-access memory (RAM), a volatile memory, a non-volatile memory, a cache, a CD, a DVD, a Blu-ray disk, and/or any other tangible storage device or tangible storage disk associated with processor circuitry located in one or more hardware device(s). Alternatively, the entire program(s) and/or the portion(s) thereof could be executed by one or more hardware device(s) other than the processor circuitry and/or embodied in firmware or dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer-readable storage media may include one or more medium(s) located in one or more hardware device(s). Further, although example programs are described with reference to the flowcharts illustrated in FIGS. 11-19, many other methods of implementing the example pellet grill 100 of FIG. 1 may alternatively be used. For example, the order of execution of the blocks may be changed, and/or some of the blocks described may be changed, eliminated, or combined. Additionally, or alternatively, any or all of the blocks may be implemented by one or more hardware circuit(s) (e.g., processor circuitry) and/or hardware device(s) structured to perform the corresponding operation(s) without executing software or firmware. The hardware circuit(s) and/or hardware device(s) can be located on a single machine, or can be located across multiple machines in different network locations.

The machine-readable instructions described herein may be stored in one or more of a compressed format, an encrypted format, a fragmented format, a compiled format, an executable format, a packaged format, etc. Machine-readable instructions as described herein may be stored as data or a data structure (e.g., as portions of instructions, code, representations of code, etc.) that may be utilized to create, manufacture, and/or produce machine-executable instructions. For example, the machine-readable instructions may be fragmented and stored on one or more storage device(s) and/or computing device(s) (e.g., one or more server(s)) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or any other machine. For example, the machine-readable instructions may be stored in multiple parts, which are individually compressed, encrypted, and/or stored on separate computing devices, wherein the parts when decrypted, decompressed, and/or combined form a set of machine-executable instructions that implement one or more operation(s) that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or any other device. In another example, the machine-readable instructions may need to be configured (e.g., settings stored, data input, network addresses recorded, etc.) before the machine-readable instructions and/or the corresponding program(s) can be executed in whole or in part. Thus, machine-readable media, as used herein, may include machine-readable instructions and/or program(s) regardless of the particular format or state of the machine-readable instructions and/or program(s) when stored or otherwise at rest or in transit. The machine-readable instructions described herein can be represented by any past, present, or future instruction language, scripting language, programming language, etc. For example, the machine-readable instructions may be represented using any of the following languages: C, C++, C#, Java, JavaScript, Python, Perl, HyperText Markup Language (HTML), Structured Query Language (SQL), Non-relational SQL (NoSQL), Swift, etc.

As mentioned above, the example operations of FIGS. 11-19 may be implemented using executable instructions (e.g., computer and/or machine-readable instructions) stored on one or more non-transitory computer and/or machine-readable media such as an optical storage device, a magnetic storage device, a hard disk drive (HDD), a solid state storage device, a flash memory, a read-only memory (ROM), a random-access memory (RAM), a volatile memory, a non-volatile memory, a cache, a CD, a DVD, a Blu-ray disk, and/or any other tangible storage device or tangible storage disk in which information is stored for any duration (e.g., permanently, for extended time periods, for brief instances, for temporarily buffering, and/or for caching of the information).

Figure 11:
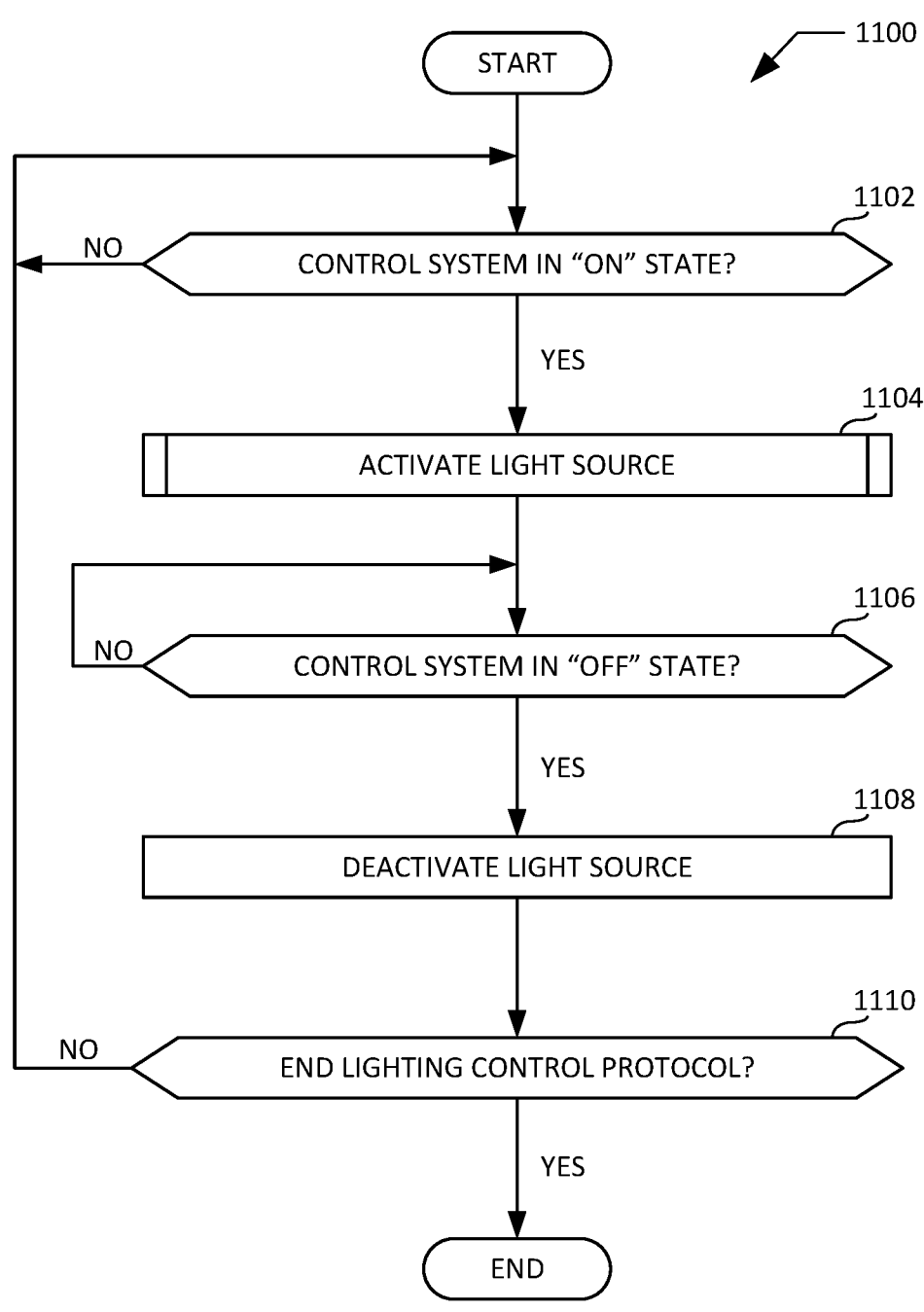
FIG. 11 is a flowchart representative of example machine-readable instructions and/or example operations that may be executed by processor circuitry to implement a first lighting control process via the pellet grill of FIG. 1.

FIG. 11 is a flowchart representative of example machine-readable instructions and/or example operations 1100 that may be executed by processor circuitry (e.g., processor circuitry of the controller 138 of FIG. 1) to implement a first lighting control process via the pellet grill 100 of FIG. 1. The machine-readable instructions and/or operations 1100 of FIG. 11 begin at Block 1102 when the processor circuitry of the controller 138 of FIG. 1 determines whether the control system 102 of the pellet grill 100 of FIG. 1 is in an ON state (e.g., a powered state). For example, the processor circuitry of the controller 138 can determine, based on data sensed, measured, and/or detected by the state sensor 120 of FIG. 1, that the control system 102 of the pellet grill 100 is in an ON state. If the processor circuitry of the controller 138 determines at Block 1102 that the control system 102 of the pellet grill 100 is in an ON state, control of the machine-readable instructions and/or operations 1100 of FIG. 11 proceeds to Block 1104. If the processor circuitry of the controller 138 instead determines at Block 1102 that the control system 102 of the pellet grill 100 is not in an ON state, control of the machine-readable instructions and/or operations 1100 of FIG. 11 remains at Block 1102.

At Block 1104, the processor circuitry of the controller 138 of FIG. 1 commands, instructs, signals, and/or otherwise causes one or more of the light source(s) 116 of the light module 114 of FIG. 1 to activate (e.g., to illuminate and/or to display a color). Various lighting activation subroutines that can be implemented by the processor circuitry of the controller 138 of FIG. 1 in connection with performing and/or executing Block 1104 of the first lighting control process 1100 of FIG. 11 are described below in connection with FIGS. 17-19. Following Block 1104, control of the machine-readable instructions and/or operations 1100 of FIG. 11 proceeds to Block 1106.

At Block 1106, the processor circuitry of the controller 138 of FIG. 1 determines whether the control system 102 of the pellet grill 100 of FIG. 1 is in an OFF state (e.g., unpowered, or in the process of losing power). For example, the processor circuitry of the controller 138 can determine, based on data sensed, measured, and/or detected by the state sensor 120 of FIG. 1, that the control system 102 of the pellet grill 100 is in an OFF state. If the processor circuitry of the controller 138 determines at Block 1106 that the control system 102 of the pellet grill 100 is in an OFF state, control of the machine-readable instructions and/or operations 1100 of FIG. 11 proceeds to Block 1108. If the processor circuitry of the controller 138 instead determines at Block 1106 that the control system 102 of the pellet grill 100 is not in an OFF state, control of the machine-readable instructions and/or operations 1100 of FIG. 11 remains at Block 1106.

At Block 1108, the processor circuitry of the controller 138 of FIG. 1 commands, instructs, signals, and/or otherwise causes one or more of the light source(s) 116 of the light module 114 of FIG. 1 to deactivate (e.g., to cease illuminating and/or to cease displaying a color). Following Block 1108, control of the machine-readable instructions and/or operations 1100 of FIG. 11 proceeds to Block 1110.

At Block 1110, the processor circuitry of the controller 138 of FIG. 1 determines whether to end the first lighting control process and/or protocol set forth in FIG. 11. For example, the processor circuitry of the controller 138 can determine whether the user interface 128 and/or the network interface 134 of the control system 102 of FIG. 1 has/have received any commands, instructions, signals, inputs, and/or other data indicative of a request to terminate the first lighting control process and/or protocol of FIG. 11. If the processor circuitry of the controller 138 determines at Block 1110 that the first lighting control process and/or protocol of FIG. 11 is to continue (e.g., that no termination request has been received), control of the machine-readable instructions and/or operations 1100 of FIG. 11 returns to Block 1102. If the processor circuitry of the controller 138 instead determines at Block 1110 that the first lighting control process and/or protocol of FIG. 11 is to cease or terminate (e.g., that a termination request has been received), the machine-readable instructions and/or operations 1100 of FIG. 11 end.

Figure 12:
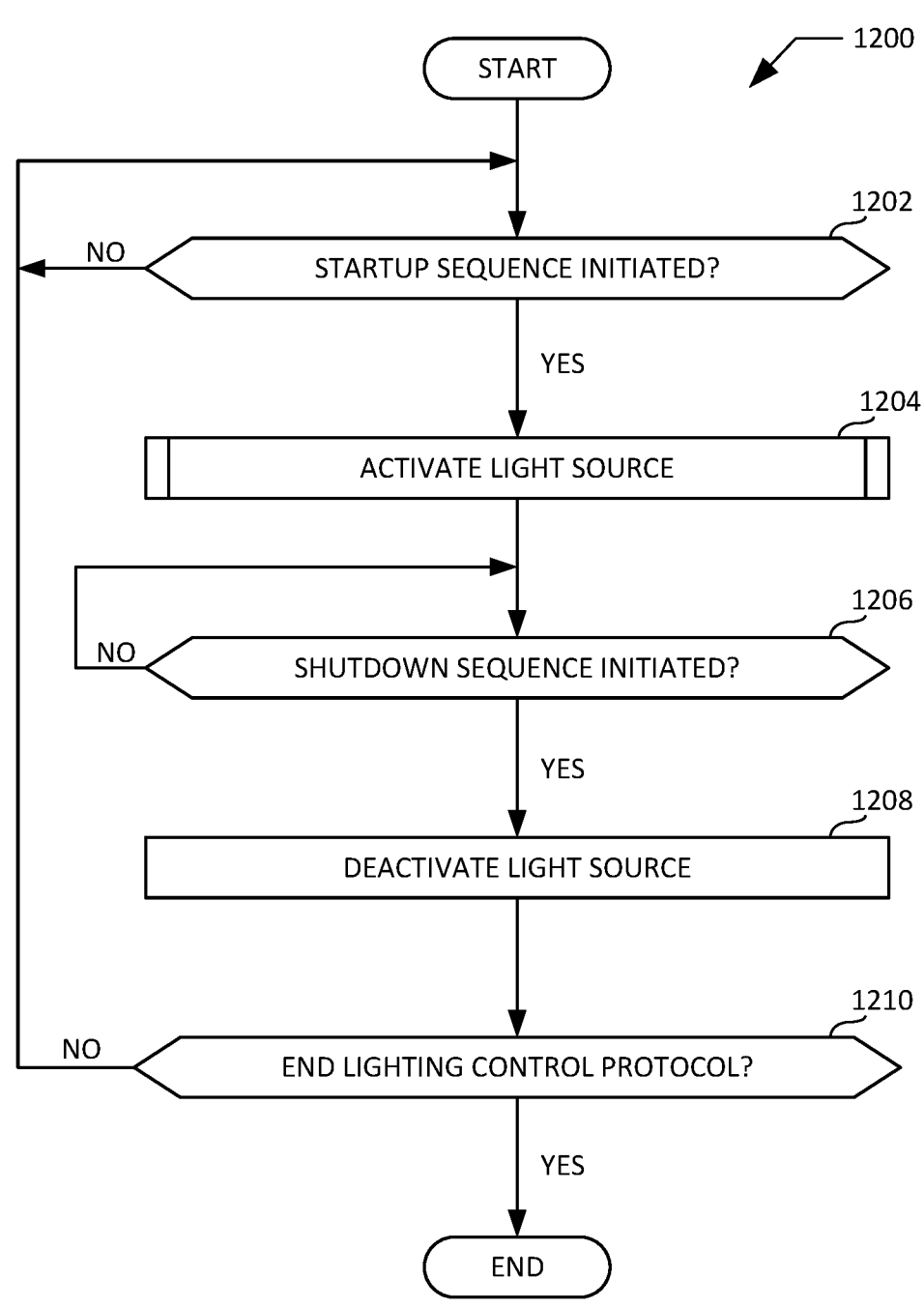
FIG. 12 is a flowchart representative of example machine-readable instructions and/or example operations that may be executed by processor circuitry to implement a second lighting control process via the pellet grill of FIG. 1.

FIG. 12 is a flowchart representative of example machine-readable instructions and/or example operations 1200 that may be executed by processor circuitry (e.g., processor circuitry of the controller 138 of FIG. 1) to implement a second lighting control process via the pellet grill 100 of FIG. 1. The machine-readable instructions and/or operations 1200 of FIG. 12 begin at Block 1202 when the processor circuitry of the controller 138 of FIG. 1 determines whether a startup sequence of the pellet grill 100 of FIG. 1 (e.g., a sequence that powers on the pellet grill 100 and/or that causes an ignitor of the pellet grill 100 to be in an ON state) has been initiated. For example, the processor circuitry of the controller 138 can determine, based on data sensed, measured, and/or detected by the state sensor 120 of FIG. 1, that a startup sequence of the pellet grill 100 has been initiated. If the processor circuitry of the controller 138 determines at Block 1202 that a startup sequence of the pellet grill 100 has been initiated, control of the machine-readable instructions and/or operations 1200 of FIG. 12 proceeds to Block 1204. If the processor circuitry of the controller 138 instead determines at Block 1202 that a startup sequence of the pellet grill 100 has not been initiated, control of the machine-readable instructions and/or operations 1200 of FIG. 12 remains at Block 1202.

At Block 1204, the processor circuitry of the controller 138 of FIG. 1 commands, instructs, signals, and/or otherwise causes one or more of the light source(s) 116 of the light module 114 of FIG. 1 to activate (e.g., to illuminate and/or to display a color). Various lighting activation subroutines that can be implemented by the processor circuitry of the controller 138 of FIG. 1 in connection with performing and/or executing Block 1204 of the second lighting control process 1200 of FIG. 12 are described below in connection with FIGS. 17-19. Following Block 1204, control of the machine-readable instructions and/or operations 1200 of FIG. 12 proceeds to Block 1206.

At Block 1206, the processor circuitry of the controller 138 of FIG. 1 determines whether a shutdown sequence of the pellet grill 100 of FIG. 1 (e.g., a sequence that causes an auger motor, an ignitor, a fan, and/or, more generally, the pellet grill 100 to be shut down and/or powered off) has been initiated. For example, the processor circuitry of the controller 138 can determine, based on data sensed, measured, and/or detected by the state sensor 120 of FIG. 1, that a shutdown sequence of the pellet grill 100 has been initiated. If the processor circuitry of the controller 138 determines at Block 1206 that a shutdown sequence of the pellet grill 100 has been initiated, control of the machine-readable instructions and/or operations 1200 of FIG. 12 proceeds to Block 1208. If the processor circuitry of the controller 138 instead determines at Block 1206 that a shutdown sequence of the pellet grill 100 has not been initiated, control of the machine-readable instructions and/or operations 1200 of FIG. 12 remains at Block 1206.

At Block 1208, the processor circuitry of the controller 138 of FIG. 1 commands, instructs, signals, and/or otherwise causes one or more of the light source(s) 116 of the light module 114 of FIG. 1 to deactivate (e.g., to cease illuminating and/or to cease displaying a color). Following Block 1208, control of the machine-readable instructions and/or operations 1200 of FIG. 12 proceeds to Block 1210.

At Block 1210, the processor circuitry of the controller 138 of FIG. 1 determines whether to end the second lighting control process and/or protocol set forth in FIG. 12. For example, the processor circuitry of the controller 138 can determine whether the user interface 128 and/or the network interface 134 of the control system 102 of FIG. 1 has/have received any commands, instructions, signals, inputs, and/or other data indicative of a request to terminate the second lighting control process and/or protocol of FIG. 12. If the processor circuitry of the controller 138 determines at Block 1210 that the second lighting control process and/or protocol of FIG. 12 is to continue (e.g., that no termination request has been received), control of the machine-readable instructions and/or operations 1200 of FIG. 12 returns to Block 1202. If the processor circuitry of the controller 138 instead determines at Block 1210 that the second lighting control process and/or protocol of FIG. 12 is to cease or terminate (e.g., that a termination request has been received), the machine-readable instructions and/or operations 1200 of FIG. 12 end.

Figure 13:
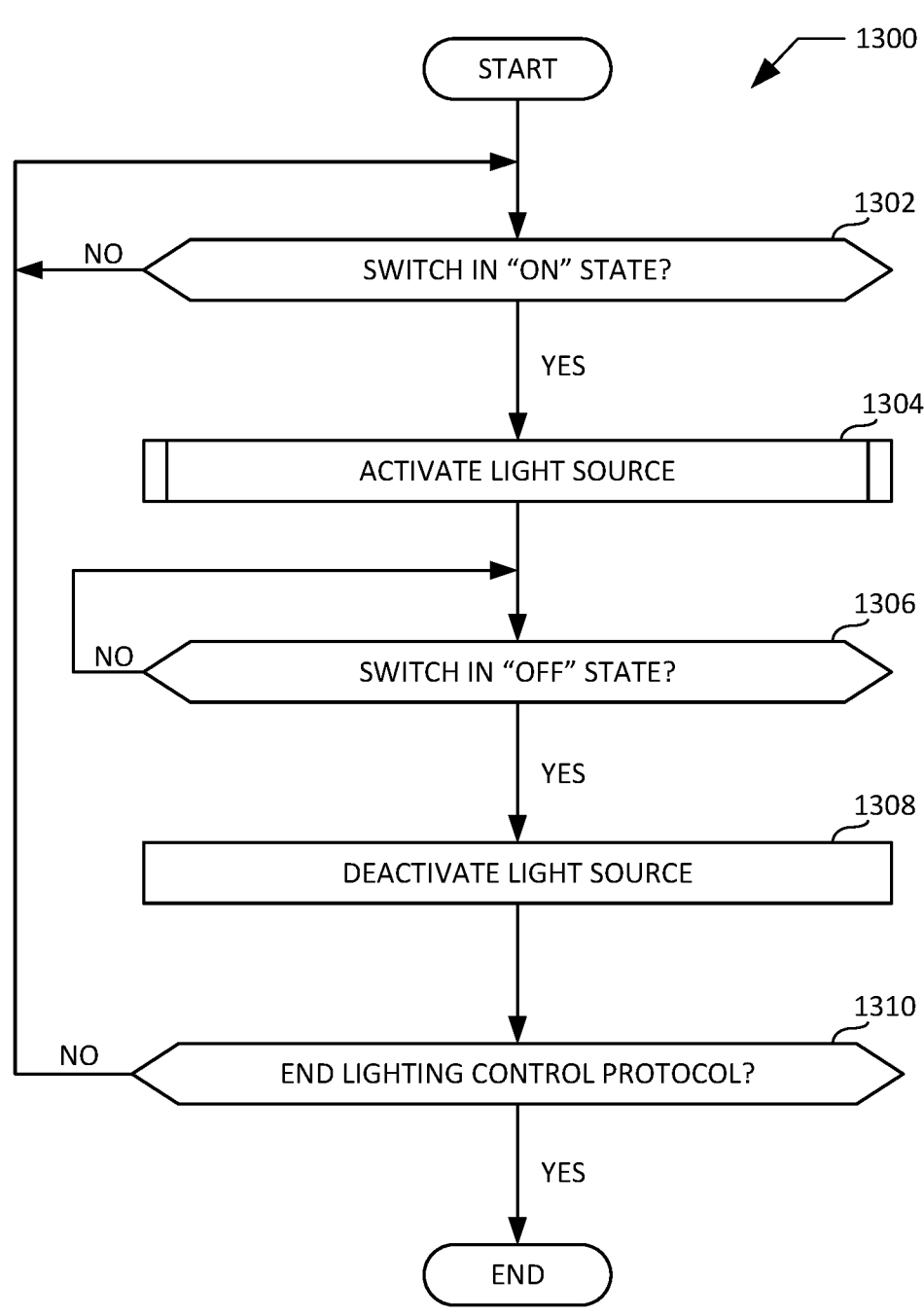
FIG. 13 is a flowchart representative of example machine-readable instructions and/or example operations that may be executed by processor circuitry to implement a third lighting control process via the pellet grill of FIG. 1.

FIG. 13 is a flowchart representative of example machine-readable instructions and/or example operations 1300 that may be executed by processor circuitry (e.g., processor circuitry of the controller 138 of FIG. 1) to implement a third lighting control process via the pellet grill 100 of FIG. 1. The machine-readable instructions and/or operations 1300 of FIG. 13 begin at Block 1302 when the processor circuitry of the controller 138 of FIG. 1 determines whether the switch 118 of the pellet grill 100 of FIG. 1 is in an ON state (e.g., closed and/or in a powered state). For example, the processor circuitry of the controller 138 can determine, based on data sensed, measured, and/or detected by the state sensor 120 of FIG. 1, that the switch 118 of the pellet grill 100 is in an ON state. If the processor circuitry of the controller 138 determines at Block 1302 that the switch 118 of the pellet grill 100 is in an ON state, control of the machine-readable instructions and/or operations 1300 of FIG. 13 proceeds to Block 1304. If the processor circuitry of the controller 138 instead determines at Block 1302 that the switch 118 of the pellet grill 100 is not in an ON state, control of the machine-readable instructions and/or operations 1300 of FIG. 13 remains at Block 1302.

At Block 1304, the processor circuitry of the controller 138 of FIG. 1 commands, instructs, signals, and/or otherwise causes one or more of the light source(s) 116 of the light module 114 of FIG. 1 to activate (e.g., to illuminate and/or to display a color). Various lighting activation subroutines that can be implemented by the processor circuitry of the controller 138 of FIG. 1 in connection with performing and/or executing Block 1304 of the third lighting control process 1300 of FIG. 13 are described below in connection with FIGS. 17-19. Following Block 1304, control of the machine-readable instructions and/or operations 1300 of FIG. 13 proceeds to Block 1306.

At Block 1306, the processor circuitry of the controller 138 of FIG. 1 determines whether the switch 118 of the pellet grill 100 of FIG. 1 is in an OFF state (e.g., open and/or in an unpowered state). For example, the processor circuitry of the controller 138 can determine, based on data sensed, measured, and/or detected by the state sensor 120 of FIG. 1, that the switch 118 of the pellet grill 100 is in an OFF state. If the processor circuitry of the controller 138 determines at Block 1306 that the switch 118 of the pellet grill 100 is in an OFF state, control of the machine-readable instructions and/or operations 1300 of FIG. 13 proceeds to Block 1308. If the processor circuitry of the controller 138 instead determines at Block 1306 that the switch 118 of the pellet grill 100 is not in an OFF state, control of the machine-readable instructions and/or operations 1300 of FIG. 13 remains at Block 1306.

At Block 1308, the processor circuitry of the controller 138 of FIG. 1 commands, instructs, signals, and/or otherwise causes one or more of the light source(s) 116 of the light module 114 of FIG. 1 to deactivate (e.g., to cease illuminating and/or to cease displaying a color). Following Block 1308, control of the machine-readable instructions and/or operations 1300 of FIG. 13 proceeds to Block 1310.

At Block 1310, the processor circuitry of the controller 138 of FIG. 1 determines whether to end the third lighting control process and/or protocol set forth in FIG. 13. For example, the processor circuitry of the controller 138 can determine whether the user interface 128 and/or the network interface 134 of the control system 102 of FIG. 1 has/have received any commands, instructions, signals, inputs, and/or other data indicative of a request to terminate the third lighting control process and/or protocol of FIG. 13. If the processor circuitry of the controller 138 determines at Block 1310 that the third lighting control process and/or protocol of FIG. 13 is to continue (e.g., that no termination request has been received), control of the machine-readable instructions and/or operations 1300 of FIG. 13 returns to Block 1302. If the processor circuitry of the controller 138 instead determines at Block 1310 that the third lighting control process and/or protocol of FIG. 13 is to cease or terminate (e.g., that a termination request has been received), the machine-readable instructions and/or operations 1300 of FIG. 13 end.

Figure 14:
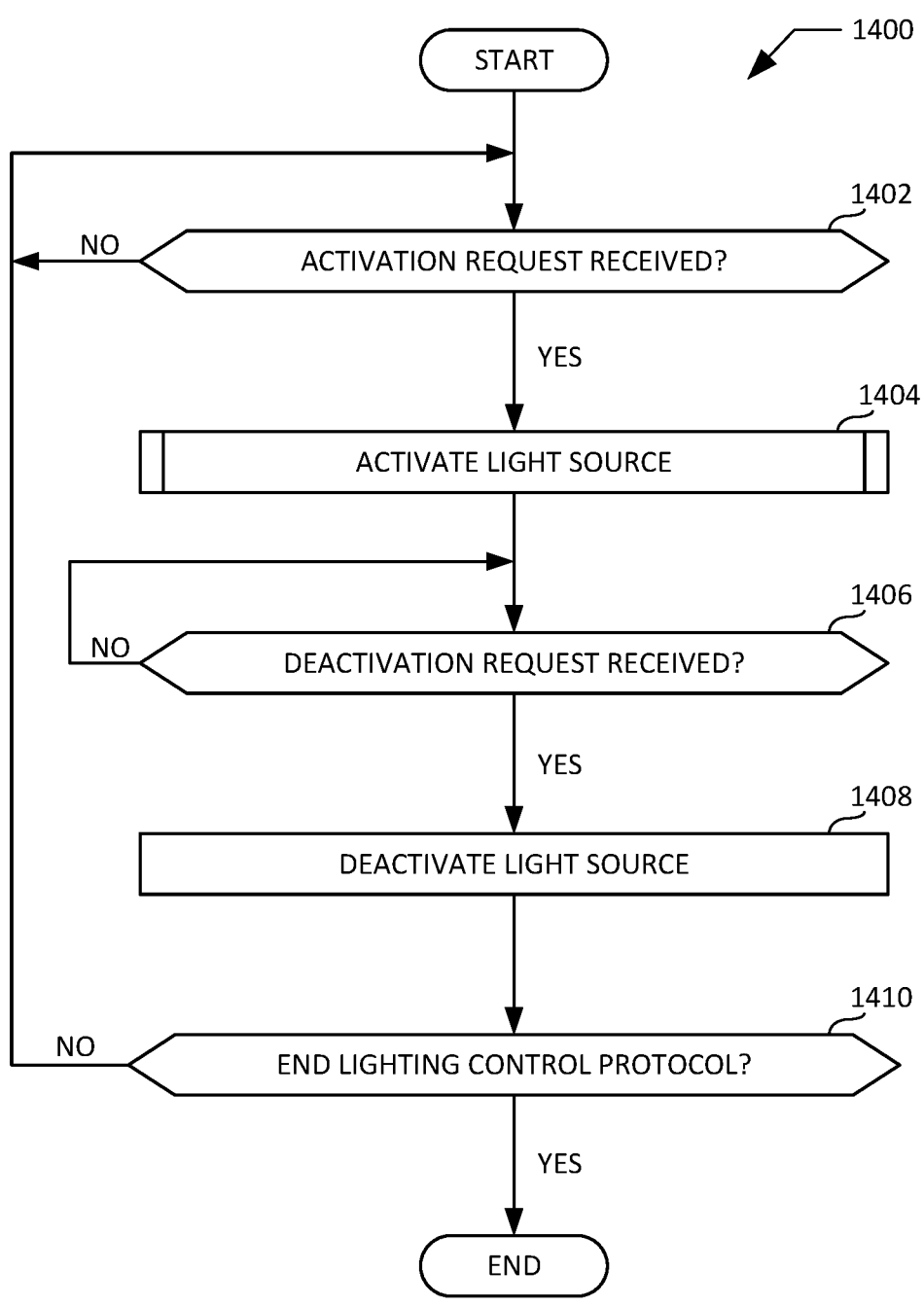
FIG. 14 is a flowchart representative of example machine-readable instructions and/or example operations that may be executed by processor circuitry to implement a fourth lighting control process via the pellet grill of FIG. 1.

FIG. 14 is a flowchart representative of example machine-readable instructions and/or example operations 1400 that may be executed by processor circuitry (e.g., processor circuitry of the controller 138 of FIG. 1) to implement a fourth lighting control process via the pellet grill 100 of FIG. 1. The machine-readable instructions and/or operations 1400 of FIG. 14 begin at Block 1402 when the processor circuitry of the controller 138 of FIG. 1 determines whether the control system 102 of the pellet grill 100 of FIG. 1 has received an activation request associated with the lighting module 114 of the pellet grill 100 of FIG. 1. For example, the processor circuitry of the controller 138 can determine whether the user interface 128 and/or the network interface 134 of the control system 102 of FIG. 1 has/have received any commands, instructions, signals, inputs, and/or other data indicative of a request to activate the light source(s) 116 of the lighting module 114 of the pellet grill 100. If the processor circuitry of the controller 138 determines at Block 1402 that the control system 102 of the pellet grill 100 has received an activation request associated with the lighting module 114 of the pellet grill 100, control of the machine-readable instructions and/or operations 1400 of FIG. 14 proceeds to Block 1404. If the processor circuitry of the controller 138 instead determines at Block 1402 that the control system 102 of the pellet grill 100 has not received an activation request associated with the lighting module 114 of the pellet grill 100, control of the machine-readable instructions and/or operations 1400 of FIG. 14 remains at Block 1402.

At Block 1404, the processor circuitry of the controller 138 of FIG. 1 commands, instructs, signals, and/or otherwise causes one or more of the light source(s) 116 of the light module 114 of FIG. 1 to activate (e.g., to illuminate and/or to display a color). Various lighting activation subroutines that can be implemented by the processor circuitry of the controller 138 of FIG. 1 in connection with performing and/or executing Block 1404 of the fourth lighting control process 1400 of FIG. 14 are described below in connection with FIGS. 17-19. Following Block 1404, control of the machine-readable instructions and/or operations 1400 of FIG. 14 proceeds to Block 1406.

At Block 1406, the processor circuitry of the controller 138 of FIG. 1 determines whether the control system 102 of the pellet grill 100 of FIG. 1 has received a deactivation request associated with the lighting module 114 of the pellet grill 100 of FIG. 1. For example, the processor circuitry of the controller 138 can determine whether the user interface 128 and/or the network interface 134 of the control system 102 of FIG. 1 has/have received any commands, instructions, signals, inputs, and/or other data indicative of a request to deactivate the light source(s) 116 of the lighting module 114 of the pellet grill 100. If the processor circuitry of the controller 138 determines at Block 1406 that the control system 102 of the pellet grill 100 has received a deactivation request associated with the lighting module 114 of the pellet grill 100, control of the machine-readable instructions and/or operations 1400 of FIG. 14 proceeds to Block 1408. If the processor circuitry of the controller 138 instead determines at Block 1406 that the control system 102 of the pellet grill 100 has not received a deactivation request associated with the lighting module 114 of the pellet grill 100, control of the machine-readable instructions and/or operations 1400 of FIG. 14 remains at Block 1406.

At Block 1408, the processor circuitry of the controller 138 of FIG. 1 commands, instructs, signals, and/or otherwise causes one or more of the light source(s) 116 of the light module 114 of FIG. 1 to deactivate (e.g., to cease illuminating and/or to cease displaying a color). Following Block 1408, control of the machine-readable instructions and/or operations 1400 of FIG. 14 proceeds to Block 1410.

At Block 1410, the processor circuitry of the controller 138 of FIG. 1 determines whether to end the fourth lighting control process and/or protocol set forth in FIG. 14. For example, the processor circuitry of the controller 138 can determine whether the user interface 128 and/or the network interface 134 of the control system 102 of FIG. 1 has/have received any commands, instructions, signals, inputs, and/or other data indicative of a request to terminate the fourth lighting control process and/or protocol of FIG. 14. If the processor circuitry of the controller 138 determines at Block 1410 that the fourth lighting control process and/or protocol of FIG. 14 is to continue (e.g., that no termination request has been received), control of the machine-readable instructions and/or operations 1400 of FIG. 14 returns to Block 1402. If the processor circuitry of the controller 138 instead determines at Block 1410 that the fourth lighting control process and/or protocol of FIG. 14 is to cease or terminate (e.g., that a termination request has been received), the machine-readable instructions and/or operations 1400 of FIG. 14 end.

Figure 15:
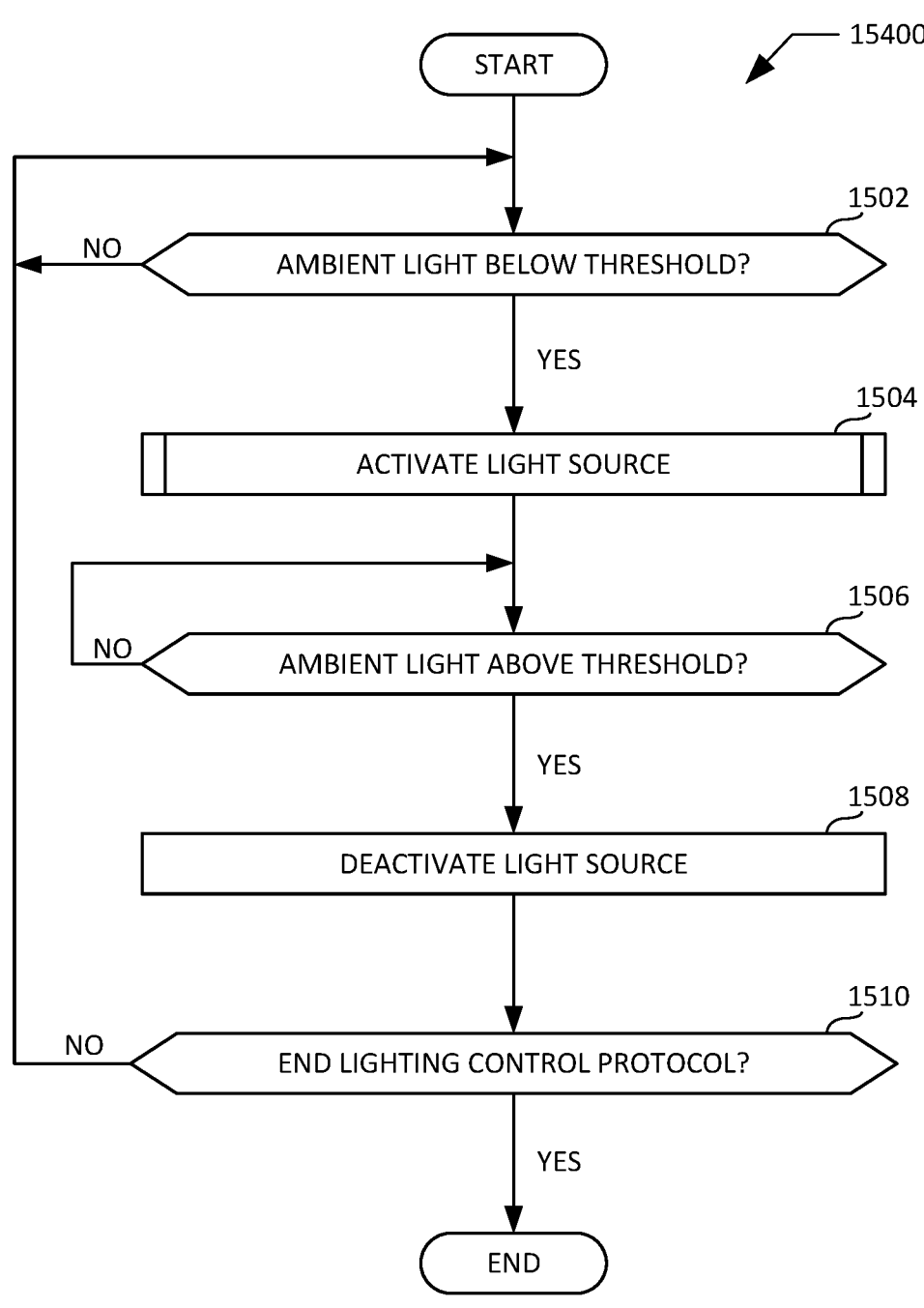
FIG. 15 is a flowchart representative of example machine-readable instructions and/or example operations that may be executed by processor circuitry to implement a fifth lighting control process via the pellet grill of FIG. 1.

FIG. 15 is a flowchart representative of example machine-readable instructions and/or example operations 1500 that may be executed by processor circuitry (e.g., processor circuitry of the controller 138 of FIG. 1) to implement a fifth lighting control process via the pellet grill 100 of FIG. 1. The machine-readable instructions and/or operations 1500 of FIG. 15 begin at Block 1502 when the processor circuitry of the controller 138 of FIG. 1 determines whether the ambient light around an exterior of the pellet grill 100 of FIG. 1 is below an ambient light threshold. For example, the processor circuitry of the controller 138 can determine, based on data sensed, measured, and/or detected by the ambient light sensor 122 of FIG. 1, that the ambient light around the exterior of the pellet grill 100 is below an ambient light threshold. If the processor circuitry of the controller 138 determines at Block 1502 that the ambient light around the exterior of the pellet grill 100 is below the ambient light threshold, control of the machine-readable instructions and/or operations 1500 of FIG. 15 proceeds to Block 1504. If the processor circuitry of the controller 138 instead determines at Block 1502 that the ambient light around the exterior of the pellet grill 100 is not below the ambient light threshold, control of the machine-readable instructions and/or operations 1500 of FIG. 15 remains at Block 1502.

At Block 1504, the processor circuitry of the controller 138 of FIG. 1 commands, instructs, signals, and/or otherwise causes one or more of the light source(s) 116 of the light module 114 of FIG. 1 to activate (e.g., to illuminate and/or to display a color). Various lighting activation subroutines that can be implemented by the processor circuitry of the controller 138 of FIG. 1 in connection with performing and/or executing Block 1504 of the fifth lighting control process 1500 of FIG. 15 are described below in connection with FIGS. 17-19. Following Block 1504, control of the machine-readable instructions and/or operations 1500 of FIG. 15 proceeds to Block 1506.

At Block 1506, the processor circuitry of the controller 138 of FIG. 1 determines whether the ambient light around the exterior of the pellet grill 100 of FIG. 1 is above the ambient light threshold. For example, the processor circuitry of the controller 138 can determine, based on data sensed, measured, and/or detected by the ambient light sensor 122 of FIG. 1, that the ambient light around the exterior of the pellet grill 100 is above the ambient light threshold. If the processor circuitry of the controller 138 determines at Block 1506 that the ambient light around the exterior of the pellet grill 100 is above the ambient light threshold, control of the machine-readable instructions and/or operations 1500 of FIG. 15 proceeds to Block 1508. If the processor circuitry of the controller 138 instead determines at Block 1506 that the ambient light around the exterior of the pellet grill 100 is not above the ambient light threshold, control of the machine-readable instructions and/or operations 1500 of FIG. 15 remains at Block 1506.

At Block 1508, the processor circuitry of the controller 138 of FIG. 1 commands, instructs, signals, and/or otherwise causes one or more of the light source(s) 116 of the light module 114 of FIG. 1 to deactivate (e.g., to cease illuminating and/or to cease displaying a color). Following Block 1508, control of the machine-readable instructions and/or operations 1500 of FIG. 15 proceeds to Block 1510.

At Block 1510, the processor circuitry of the controller 138 of FIG. 1 determines whether to end the fifth lighting control process and/or protocol set forth in FIG. 15. For example, the processor circuitry of the controller 138 can determine whether the user interface 128 and/or the network interface 134 of the control system 102 of FIG. 1 has/have received any commands, instructions, signals, inputs, and/or other data indicative of a request to terminate the fifth lighting control process and/or protocol of FIG. 15. If the processor circuitry of the controller 138 determines at Block 1510 that the fifth lighting control process and/or protocol of FIG. 15 is to continue (e.g., that no termination request has been received), control of the machine-readable instructions and/or operations 1500 of FIG. 15 returns to Block 1502. If the processor circuitry of the controller 138 instead determines at Block 1510 that the fifth lighting control process and/or protocol of FIG. 15 is to cease or terminate (e.g., that a termination request has been received), the machine-readable instructions and/or operations 1500 of FIG. 15 end.

Figure 16:
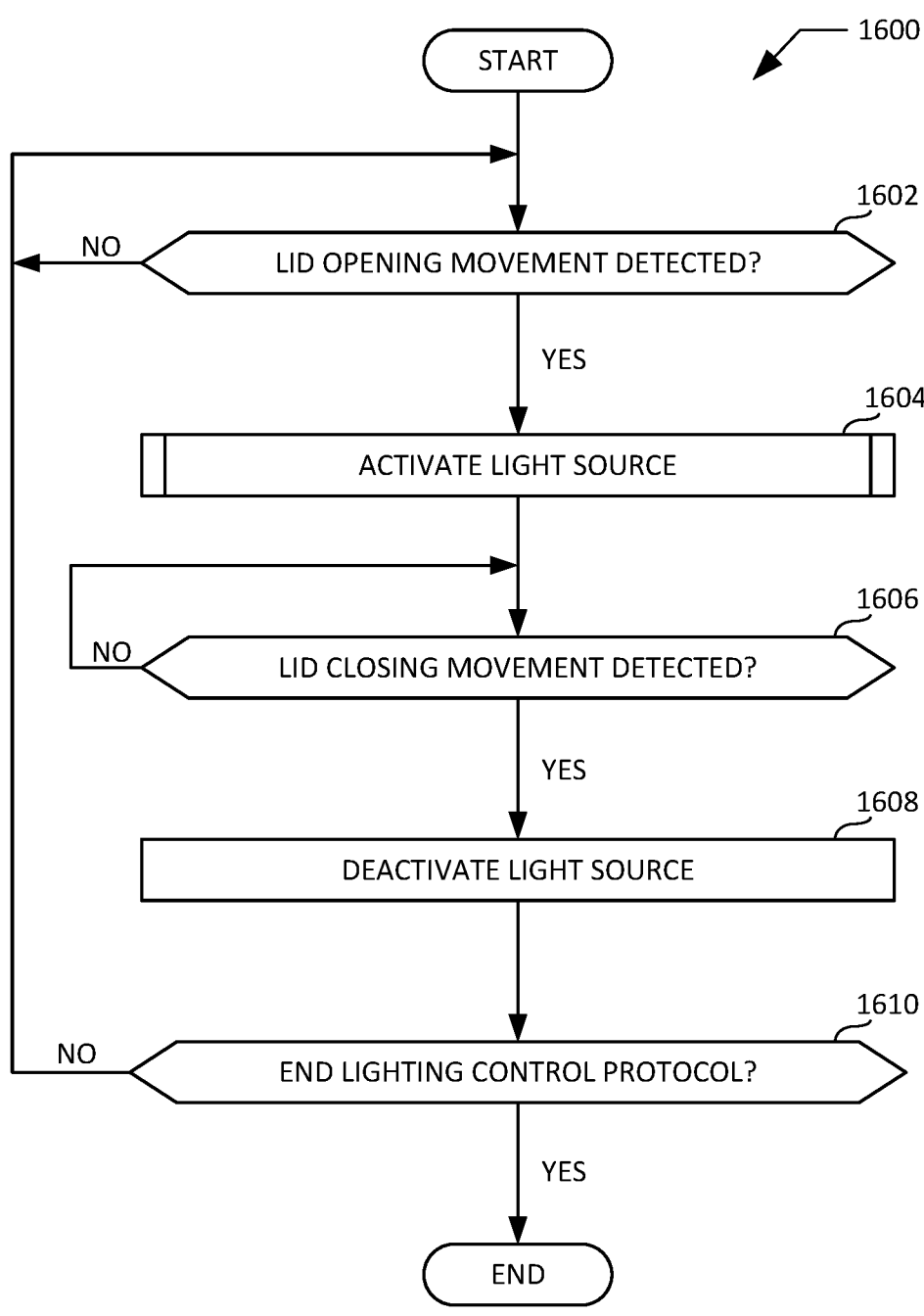
FIG. 16 is a flowchart representative of example machine-readable instructions and/or example operations that may be executed by processor circuitry to implement a sixth lighting control process via the pellet grill of FIG. 1.

FIG. 16 is a flowchart representative of example machine-readable instructions and/or example operations 1600 that may be executed by processor circuitry (e.g., processor circuitry of the controller 138 of FIG. 1) to implement a sixth lighting control process via the pellet grill 100 of FIG. 1. The machine-readable instructions and/or operations 1600 of FIG. 16 begin at Block 1602 when the processor circuitry of the controller 138 of FIG. 1 determines whether a lid opening movement associated with a lid of a hopper of the pellet grill 100 (e.g., movement of the lid of the hopper from a closed position toward or to an open position) has occurred and/or has been detected. For example, the processor circuitry of the controller 138 can determine, based on data sensed, measured, and/or detected by the lid position sensor 124 of FIG. 1, that a lid opening movement associated with the lid of the hopper of the pellet grill 100 has occurred and/or has been detected. If the processor circuitry of the controller 138 determines at Block 1602 that a lid opening movement associated with the lid of the hopper of the pellet grill 100 has occurred and/or has been detected, control of the machine-readable instructions and/or operations 1600 of FIG. 16 proceeds to Block 1604. If the processor circuitry of the controller 138 instead determines at Block 1602 that a lid opening movement associated with the lid of the hopper of the pellet grill 100 has not occurred and/or has not been detected, control of the machine-readable instructions and/or operations 1600 of FIG. 16 remains at Block 1602.

At Block 1604, the processor circuitry of the controller 138 of FIG. 1 commands, instructs, signals, and/or otherwise causes one or more of the light source(s) 116 of the light module 114 of FIG. 1 to activate (e.g., to illuminate and/or to display a color). Various lighting activation subroutines that can be implemented by the processor circuitry of the controller 138 of FIG. 1 in connection with performing and/or executing Block 1604 of the sixth lighting control process 1600 of FIG. 16 are described below in connection with FIGS. 17 and 18. Following Block 1604, control of the machine-readable instructions and/or operations 1600 of FIG. 16 proceeds to Block 1606.

At Block 1606, the processor circuitry of the controller 138 of FIG. 1 determines whether a lid closing movement associated with the lid of the hopper of the pellet grill 100 (e.g., movement of the lid of the hopper from an open position toward or to a closed position) has occurred and/or has been detected. For example, the processor circuitry of the controller 138 can determine, based on data sensed, measured, and/or detected by the lid position sensor 124 of FIG. 1, that a lid closing movement associated with the lid of the hopper of the pellet grill 100 has occurred and/or has been detected. If the processor circuitry of the controller 138 determines at Block 1606 that a lid closing movement associated with the lid of the hopper of the pellet grill 100 has occurred and/or has been detected, control of the machine-readable instructions and/or operations 1600 of FIG. 16 proceeds to Block 1608. If the processor circuitry of the controller 138 instead determines at Block 1606 that a lid closing movement associated with the lid of the hopper of the pellet grill 100 has not occurred and/or has not been detected, control of the machine-readable instructions and/or operations 1600 of FIG. 16 remains at Block 1606.

At Block 1608, the processor circuitry of the controller 138 of FIG. 1 commands, instructs, signals, and/or otherwise causes one or more of the light source(s) 116 of the light module 114 of FIG. 1 to deactivate (e.g., to cease illuminating and/or to cease displaying a color). Following Block 1608, control of the machine-readable instructions and/or operations 1600 of FIG. 16 proceeds to Block 1610.

At Block 1610, the processor circuitry of the controller 138 of FIG. 1 determines whether to end the sixth lighting control process and/or protocol set forth in FIG. 16. For example, the processor circuitry of the controller 138 can determine whether the user interface 128 and/or the network interface 134 of the control system 102 of FIG. 1 has/have received any commands, instructions, signals, inputs, and/or other data indicative of a request to terminate the sixth lighting control process and/or protocol of FIG. 16. If the processor circuitry of the controller 138 determines at Block 1610 that the sixth lighting control process and/or protocol of FIG. 16 is to continue (e.g., that no termination request has been received), control of the machine-readable instructions and/or operations 1600 of FIG. 16 returns to Block 1602. If the processor circuitry of the controller 138 instead determines at Block 1610 that the sixth lighting control process and/or protocol of FIG. 16 is to cease or terminate (e.g., that a termination request has been received), the machine-readable instructions and/or operations 1600 of FIG. 16 end.

Figures 17, 18:
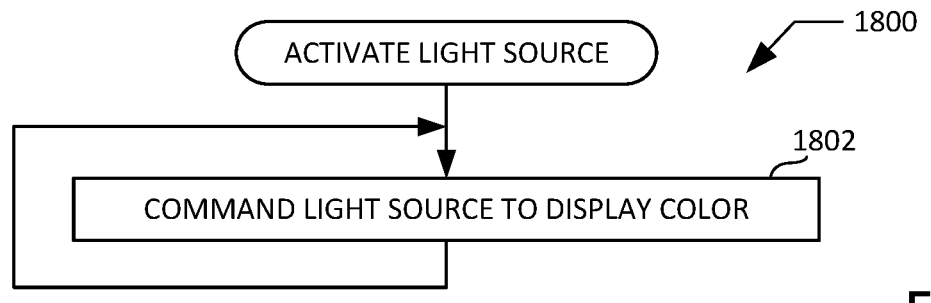
FIG. 17 is a flowchart representative of example machine-readable instructions and/or example operations that may be executed by processor circuitry to implement a first lighting activation subroutine via the pellet grill of FIG. 1.
FIG. 18 is a flowchart representative of example machine-readable instructions and/or example operations that may be executed by processor circuitry to implement a second lighting activation subroutine via the pellet grill of FIG. 1.

FIG. 17 is a flowchart representative of example machine-readable instructions and/or example operations 1700 that may be executed by processor circuitry (e.g., processor circuitry of the controller 138 of FIG. 1) to implement a first lighting activation subroutine via the pellet grill 100 of FIG. 1. Example machine-readable instructions and/or operations of Block 1702, Block 1704, Block 1706, Block 1708, Block 1710, and Block 1712 of FIG. 17 can be used to implement Block 1104 of the first lighting control process 1100 of FIG. 11, Block 1204 of the second lighting control process 1200 of FIG. 12, Block 1304 of the third lighting control process 1300 of FIG. 13, Block 1404 of the fourth lighting control process 1400 of FIG. 14, Block 1504 of the fifth lighting control process 1500 of FIG. 15, and/or Block 1604 of the sixth lighting control process 1600 of FIG. 16. The machine-readable instructions and/or operations 1700 of FIG. 17 begin at Block 1702 when the processor circuitry of the controller 138 of FIG. 1 determines a level or amount of pellet fuel present in a pellet fuel storage compartment of a hopper of the pellet grill 100 (referenced herein as the "fuel level"). For example, the processor circuitry of the controller 138 can determine the fuel level based on data sensed, measured, and/or detected by the fuel level sensor 126 of FIG. 1. Following Block 1702, control of the machine-readable instructions and/or operations 1700 of FIG. 17 proceeds to Block 1704.

At Block 1704, the processor circuitry of the controller 138 of FIG. 1 determines whether the fuel level is above a first fuel level threshold. For example, the processor circuitry of the controller 138 can compare the fuel level determined at Block 1702 to a first fuel level threshold corresponding to the pellet fuel storage compartment of the hopper being occupied with pellet fuel by a first threshold amount (e.g., 50% of the compartment). If the processor circuitry of the controller 138 determines at Block 1704 that the fuel level is above the first fuel level threshold, control of the machine-readable instructions and/or operations 1700 of FIG. 17 proceeds to Block 1706. If the processor circuitry of the controller 138 instead determines at Block 1704 that the fuel level is not above the first fuel level threshold, control of the machine-readable instructions and/or operations 1700 of FIG. 17 proceeds to Block 1708.

At Block 1706, the processor circuitry of the controller 138 of FIG. 1 commands, instructs, signals, and/or otherwise causes one or more of the light source(s) 116 of the lighting module 114 of FIG. 1 to display a first color (e.g., to illuminate in a first color). For example, the processor circuitry of the controller 138 of FIG. 1 can command, instruct, signal, and/or otherwise cause one or more of the light source(s) 116 of the lighting module 114 of FIG. 1 to display a shade of the color green (e.g., to illuminate in a shade of the color green). Following Block 1706, control of the machine-readable instructions and/or operations 1700 of FIG. 17 returns to Block 1702.

At Block 1708, the processor circuitry of the controller 138 of FIG. 1 determines whether the fuel level is above a second fuel level threshold. For example, the processor circuitry of the controller 138 can compare the fuel level determined at Block 1702 to a second fuel level threshold corresponding to the pellet fuel storage compartment of the hopper being occupied with pellet fuel by a second threshold amount (e.g., 25% of the compartment) that is less than the first threshold amount (e.g., 50%). If the processor circuitry of the controller 138 determines at Block 1708 that the fuel level is above the second fuel level threshold, control of the machine-readable instructions and/or operations 1700 of FIG. 17 proceeds to Block 1710. If the processor circuitry of the controller 138 instead determines at Block 1708 that the fuel level is not above the second fuel level threshold, control of the machine-readable instructions and/or operations 1700 of FIG. 17 proceeds to Block 1712.

At Block 1710, the processor circuitry of the controller 138 of FIG. 1 commands, instructs, signals, and/or otherwise causes one or more of the light source(s) 116 of the lighting module 114 of FIG. 1 to display a second color (e.g., to illuminate in a second color) that differs from the first color referenced in Block 1706 above. For example, the processor circuitry of the controller 138 of FIG. 1 can command, instruct, signal, and/or otherwise cause one or more of the light source(s) 116 of the lighting module 114 of FIG. 1 to display a shade of the color yellow (e.g., to illuminate in a shade of the color yellow). Following Block 1710, control of the machine-readable instructions and/or operations 1700 of FIG. 17 returns to Block 1702.

At Block 1712, the processor circuitry of the controller 138 of FIG. 1 commands, instructs, signals, and/or otherwise causes one or more of the light source(s) 116 of the lighting module 114 of FIG. 1 to display a third color (e.g., to illuminate in a third color) that differs from the first color referenced in Block 1706 above as well as the second color referenced in Block 1710 above. For example, the processor circuitry of the controller 138 of FIG. 1 can command, instruct, signal, and/or otherwise cause one or more of the light source(s) 116 of the lighting module 114 of FIG. 1 to display a shade of the color red (e.g., to illuminate in a shade of the color red). Following Block 1710, control of the machine-readable instructions and/or operations 1700 of FIG. 17 returns to Block 1702.

The processor circuitry of the controller 138 of FIG. 1 implements the machine-readable instructions and/or operations 1700 of FIG. 17 described above (e.g., including Block 1702, Block 1704, Block 1706, Block 1708, Block 1710, and Block 1712) as a looped control function or subroutine, with such implementation continuing until a deactivation triggering event detected by the control system 102 of the pellet grill 100 dictates otherwise (e.g., detection of the control system 102 of the pellet grill 100 being in or transitioning into an OFF state, detection of the control system 102 of the pellet grill 100 initiating a shutdown sequence, detection of the switch 118 of the pellet grill 100 being in or transitioning into an OFF state, detection that the control system 102 of the pellet grill 100 has received a deactivation request associated with the lighting module 114, detection that the ambient light around an exterior of the pellet grill 100 is above an ambient light threshold, detection of a lid closing movement associated with the lid of the hopper of the pellet grill 100, etc.).

FIG. 18 is a flowchart representative of example machine-readable instructions and/or example operations 1800 that may be executed by processor circuitry (e.g., processor circuitry of the controller 138 of FIG. 1) to implement a second lighting activation subroutine via the pellet grill 100 of FIG. 1. Example machine-readable instructions and/or operations of Block 1802 of FIG. 18 can be used to implement Block 1104 of the first lighting control process 1100 of FIG. 11, Block 1204 of the second lighting control process 1200 of FIG. 12, Block 1304 of the third lighting control process 1300 of FIG. 13, Block 1404 of the fourth lighting control process 1400 of FIG. 14, Block 1504 of the fifth lighting control process 1500 of FIG. 15, and/or Block 1604 of the sixth lighting control process 1600 of FIG. 16.

The machine-readable instructions and/or operations 1800 of FIG. 18 begin at Block 1802 when the processor circuitry of the controller 138 of FIG. 1 commands, instructs, signals, and/or otherwise causes one or more of the light source(s) 116 of the lighting module 114 of FIG. 1 to display a color (e.g., to illuminate in a color). For example, the processor circuitry of the controller 138 of FIG. 1 can command, instruct, signal, and/or otherwise cause one or more of the light source(s) 116 of the lighting module 114 of FIG. 1 to display a shade of the color white (e.g., to illuminate in a shade of the color white). Following Block 1802, control of the machine-readable instructions and/or operations 1800 of FIG. 18 returns to and/or remains at Block 1802.

The processor circuitry of the controller 138 of FIG. 1 implements the machine-readable instructions and/or operations 1800 of FIG. 18 described above (e.g., including Block 1802) as a looped control function or subroutine, with such implementation continuing until a deactivation triggering event detected by the control system 102 of the pellet grill 100 dictates otherwise (e.g., detection of the control system 102 of the pellet grill 100 being in or transitioning into an OFF state, detection of the control system 102 of the pellet grill 100 initiating a shutdown sequence, detection of the switch 118 of the pellet grill 100 being in or transitioning into an OFF state, detection that the control system 102 of the pellet grill 100 has received a deactivation request associated with the lighting module 114, detection that the ambient light around an exterior of the pellet grill 100 is above an ambient light threshold, detection of a lid closing movement associated with the lid of the hopper of the pellet grill 100, etc.).

FIG. 19 is a flowchart representative of example machine-readable instructions and/or example operations 1900 that may be executed by processor circuitry (e.g., processor circuitry of the controller 138 of FIG. 1) to implement a third lighting activation subroutine via the pellet grill 100 of FIG. 1. Example machine-readable instructions and/or operations of Block 1902, Block 1904, Block 1906, Block 1908, Block 1910, and Block 1912 of FIG. 19 can be used to implement Block 1104 of the first lighting control process 1100 of FIG. 11, Block 1204 of the second lighting control process 1200 of FIG. 12, Block 1304 of the third lighting control process 1300 of FIG. 13, Block 1404 of the fourth lighting control process 1400 of FIG. 14, and/or Block 1504 of the fifth lighting control process 1500 of FIG. 15. The machine-readable instructions and/or operations 1900 of FIG. 19 begin at Block 1902 when the processor circuitry of the controller 138 of FIG. 1 determines a level or amount of pellet fuel present in a pellet fuel storage compartment of a hopper of the pellet grill 100 (referenced herein as the "fuel level"). For example, the processor circuitry of the controller 138 can determine the fuel level based on data sensed, measured, and/or detected by the fuel level sensor 126 of FIG. 1. Following Block 1902, control of the machine-readable instructions and/or operations 1900 of FIG. 19 proceeds to Block 1904.

At Block 1904, the processor circuitry of the controller 138 of FIG. 1 commands, instructs, signals, and/or otherwise causes one or more of the light source(s) 116 of the lighting module 114 of FIG. 1 to display a color (e.g., to illuminate in a color) corresponding to the determined fuel level. For example, the processor circuitry of the controller 138 of FIG. 1 can command, instruct, signal, and/or otherwise cause one or more of the light source(s) 116 of the lighting module 114 of FIGS. 1 to (1) display a first color (e.g., a shade of the color green) when the determined fuel level is above a first fuel level threshold corresponding to the pellet fuel storage compartment of the hopper being occupied with pellet fuel by a first threshold amount (e.g., 50% of the compartment), (2) display a second color (e.g., a shade of the color yellow) when the determined fuel level is below the first fuel level threshold, but above a second fuel level threshold corresponding to the pellet fuel storage compartment of the hopper being occupied with pellet fuel by a second threshold amount (e.g., 25% of the compartment), and (3) display a third color (e.g., a shade of the color red) when the determined fuel level is below the second fuel level threshold. Following Block 1904, control of the machine-readable instructions and/or operations 1900 of FIG. 19 proceeds to Block 1906.

At Block 1906, the processor circuitry of the controller 138 of FIG. 1 determines whether a lid opening movement associated with a lid of a hopper of the pellet grill 100 (e.g., movement of the lid of the hopper from a closed position toward or to an open position) has occurred and/or has been detected. For example, the processor circuitry of the controller 138 can determine, based on data sensed, measured, and/or detected by the lid position sensor 124 of FIG. 1, that a lid opening movement associated with the lid of the hopper of the pellet grill 100 has occurred and/or has been detected. If the processor circuitry of the controller 138 determines at Block 1906 that a lid opening movement associated with the lid of the hopper of the pellet grill 100 has occurred and/or has been detected, control of the machine-readable instructions and/or operations 1900 of FIG. 19 proceeds to Block 1908. If the processor circuitry of the controller 138 instead determines at Block 1906 that a lid opening movement associated with the lid of the hopper of the pellet grill 100 has not occurred and/or has not been detected, control of the machine-readable instructions and/or operations 1900 of FIG. 19 returns to Block 1902.

At Block 1908, the processor circuitry of the controller 138 of FIG. 1 commands, instructs, signals, and/or otherwise causes one or more of the light source(s) 116 of the lighting module 114 of FIG. 1 to display a color (e.g., to illuminate in a color) corresponding to the open lid state. For example, the processor circuitry of the controller 138 of FIG. 1 can command, instruct, signal, and/or otherwise cause one or more of the light source(s) 116 of the lighting module 114 of FIG. 1 to display a fourth color (e.g., a shade of the color white) in response to the detected lid opening movement of the lid of the hopper. Following Block 1908, control of the machine-readable instructions and/or operations 1900 of FIG. 19 proceeds to Block 1910.

At Block 1910, the processor circuitry of the controller 138 of FIG. 1 determines whether a lid closing movement associated with the lid of the hopper of the pellet grill 100 (e.g., movement of the lid of the hopper from an open position toward or to a closed position) has occurred and/or has been detected. For example, the processor circuitry of the controller 138 can determine, based on data sensed, measured, and/or detected by the lid position sensor 124 of FIG. 1, that a lid closing movement associated with the lid of the hopper of the pellet grill 100 has occurred and/or has been detected. If the processor circuitry of the controller 138 determines at Block 1910 that a lid closing movement associated with the lid of the hopper of the pellet grill 100 has occurred and/or has been detected, control of the machine-readable instructions and/or operations 1900 of FIG. 19 proceeds to Block 1912. If the processor circuitry of the controller 138 instead determines at Block 1910 that a lid closing movement associated with the lid of the hopper of the pellet grill 100 has not occurred and/or has not been detected, control of the machine-readable instructions and/or operations 1900 of FIG. 19 remains at Block 1910.

At Block 1912, the processor circuitry of the controller 138 of FIG. 1 commands, instructs, signals, and/or otherwise causes one or more of the light source(s) 116 of the lighting module 114 of FIG. 1 to terminate the display of the color (e.g., to terminate the illumination of the color) corresponding to the open lid state. For example, the processor circuitry of the controller 138 of FIG. 1 can command, instruct, signal, and/or otherwise cause one or more of the light source(s) 116 of the lighting module 114 of FIG. 1 to terminate the display of the fourth color (e.g., a shade of the color white) that was previously commanded, instructed, signaled, and/or otherwise caused by the processor circuitry of the controller 138 at Block 1908. Following Block 1912, control of the machine-readable instructions and/or operations 1900 of FIG. 19 returns to Block 1902.

The processor circuitry of the controller 138 of FIG. 1 implements the machine-readable instructions and/or operations 1900 of FIG. 19 described above (e.g., including Block 1902, Block 1904, Block 1906, Block 1908, Block 1910, and Block 1912) as a looped control function or subroutine, with such implementation continuing until a deactivation triggering event detected by the control system 102 of the pellet grill 100 dictates otherwise (e.g., detection of the control system 102 of the pellet grill 100 being in or transitioning into an OFF state, detection of the control system 102 of the pellet grill 100 initiating a shutdown sequence, detection of the switch 118 of the pellet grill 100 being in or transitioning into an OFF state, detection that the control system 102 of the pellet grill 100 has received a deactivation request associated with the lighting module 114, detection that the ambient light around an exterior of the pellet grill 100 is above an ambient light threshold, etc.).

Figure 20:
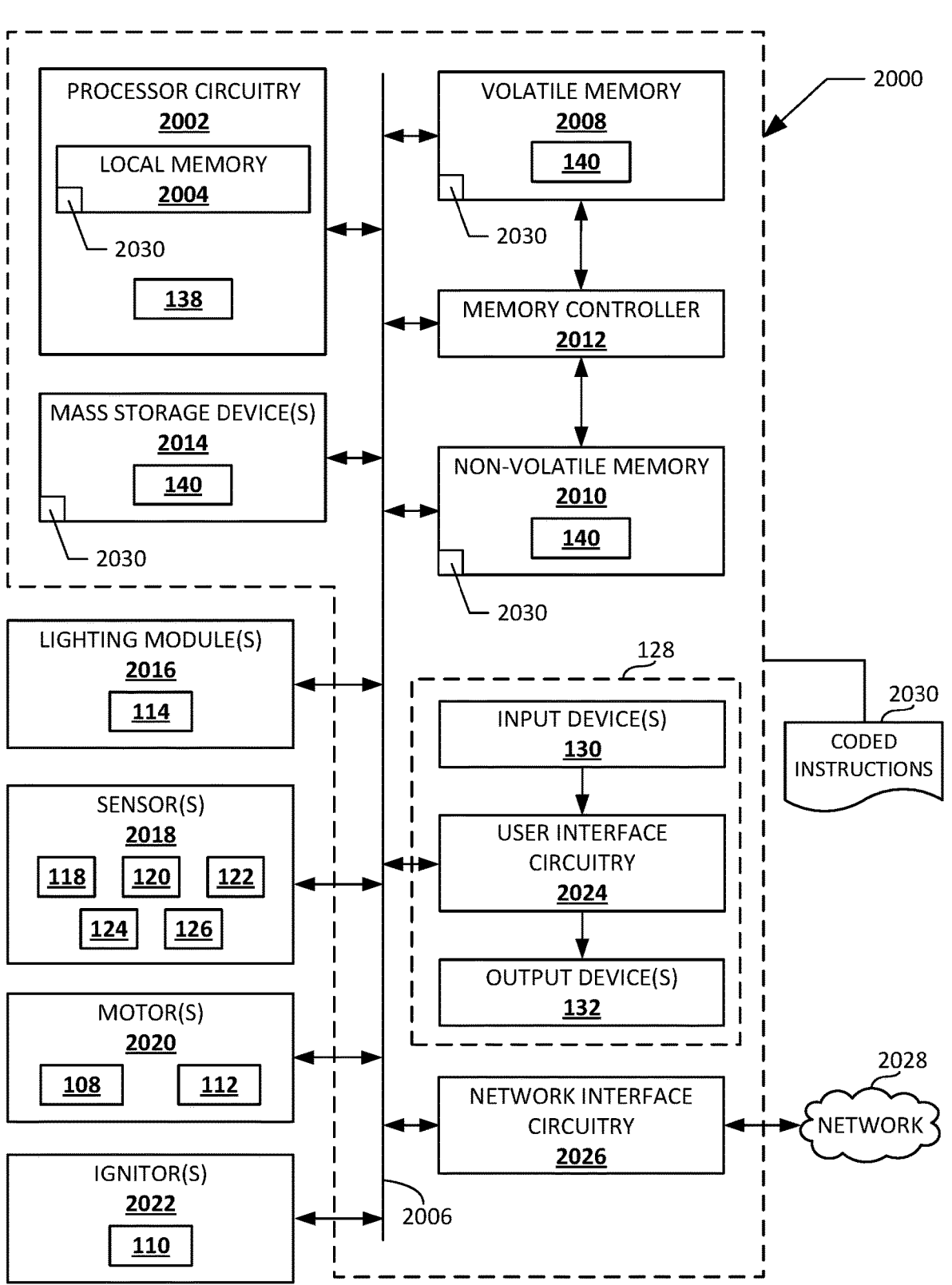
FIG. 20 is a block diagram of an example processor platform including processor circuitry structured to execute and/or instantiate the machine-readable instructions and/or operations of FIGS. 11-19 to implement the pellet grill of FIG. 1.

FIG. 20 is a block diagram of an example processor platform 2000 including processor circuitry structured to execute and/or instantiate the machine-readable instructions and/or operations of FIGS. 11-19 to implement the pellet grill 100 of FIG. 1. The processor platform 2000 of the illustrated example includes processor circuitry 2002. The processor circuitry 2002 of the illustrated example is hardware. For example, the processor circuitry 2002 includes any type(s) and/or any number(s) of processor(s), microprocessor(s), controller(s), microcontroller(s), ASIC(s), PLD(s), FPLD(s), FPGA(s), DSP(s), GPU(s), CPU(s), semiconductor-based (e.g., silicon-based) circuit(s), digital circuit(s), analog circuit(s), logic circuit(s), and/or integrated circuit(s) implemented by any type(s) and/or any number(s) of transistor(s), capacitor(s), diode(s), inductor(s), resistor(s), timer(s), counter(s), printed circuit board(s), connector(s), wire(s), and/or other electrical circuit component(s). In this example, the processor circuitry 2002 implements the controller 138 of FIG. 1.

The processor circuitry 2002 of the illustrated example includes a local memory 2004 (e.g., a cache, registers, etc.). The processor circuitry 2002 is in electrical communication with a main memory via a bus 2006, with the main memory including a volatile memory 2008 and a non-volatile memory 2010. The volatile memory 2008 may be implemented by any type of random-access memory (RAM) (e.g., Synchronous Dynamic Random Access Memory (SDRAM), Dynamic Random Access Memory (DRAM), RAMBUS® Dynamic Random Access Memory (RDRAM®), etc.). The non-volatile memory 2010 may be implemented by flash memory and/or any other desired type of memory device. Access to the main memory 2008, 2010 of the illustrated example is controlled by a memory controller 2012.

The processor platform 2000 of the illustrated example also includes one or more mass storage device(s) 2014 to store software and/or data. Examples of such mass storage device(s) 2014 include an optical storage device, a magnetic storage device, a floppy disk drive, a hard disk drive (HDD), a solid state storage device, a flash memory device, a read-only memory (ROM), a random-access memory (RAM), a cache, a CD, a DVD, a Blu-ray disk, and/or any other tangible storage device or tangible storage disk in which information is stored for any duration (e.g., permanently, for extended time periods, for brief instances, for temporarily buffering, and/or for caching of the information). In the illustrated example of FIG. 20, one or more of the volatile memory 2008, the non-volatile memory 2010, and/or the mass storage device(s) 2014 implement(s) the memory 140 of FIG. 1.

The processor circuitry 2002 is also in electrical communication with one or more lighting module(s) 2016 via the bus 2006. In this example, the lighting module(s) 2016 include the lighting module 114 of FIG. 1. The processor circuitry 2002 is also in electrical communication with one or more sensor(s) 2018 via the bus 2006. In this example, the sensor(s) 2018 include the switch 118, the state sensor 120, the ambient light sensor 122, the lid position sensor 124, and the fuel level sensor 126 of FIG. 1. The processor circuitry 2002 is also in electrical communication with one or more motor(s) 2020 via the bus 2006. In this example, the motor(s) 2020 include the auger motor 108 and the fan 112 of FIG. 1. The processor circuitry 2002 is also in electrical communication with one or more ignitor(s) 2022 via the bus 2006. In this example, the ignitor(s) 2022 include the ignitor 110 of FIG. 1.

The processor platform 2000 of the illustrated example also includes user interface circuitry 2024. The user interface circuitry 2024 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. In the illustrated example, one or more input device(s) 130 are connected to the user interface circuitry 2024. The input device(s) 130 permit(s) a user to enter data and/or commands into the processor circuitry 2002. The input device(s) 130 can be implemented, for example, by one or more of a touchscreen, a button, a dial, a knob, a switch, an audio sensor, a microphone, an image sensor, a camera, and/or a voice recognition system. One or more output device(s) 132 are also connected to the user interface circuitry 2024 of the illustrated example. The output device(s) 132 can be implemented, for example, by one or more of a display device (e.g., a light emitting diode (LED), an organic light emitting diode (OLED), a liquid crystal display (LCD), a cathode ray tube (CRT) display, an in-plane switching (IPS) display, a touchscreen, etc.), a tactile output device, and/or a speaker. The user interface circuitry 2024 of the illustrated example, thus, typically includes a graphics driver card, a graphics driver chip, and/or graphics processor circuitry such as a GPU. In the illustrated example of FIG. 20, the user interface circuitry 2024, the input device(s) 130, and the output device(s) 132 collectively implement the user interface 128 of FIG. 1.

The processor platform 2000 of the illustrated example also includes network interface circuitry 2026. The network interface circuitry 2026 includes one or more communication device(s) (e.g., transmitter(s), receiver(s), transceiver(s), modem(s), gateway(s), wireless access point(s), etc.) to facilitate exchange of data with external machines (e.g., computing devices of any kind, including the remote device(s) 144 of FIG. 1) by a network 2028. The communication can be by, for example, a satellite system, a wireless system, a cellular telephone system, an Ethernet connection, a digital subscriber line (DSL) connection, a telephone line connection, a coaxial cable system, an optical connection, etc. In the illustrated example of FIG. 20, the network interface circuitry 2026 implements the network interface 134 (e.g., including the communication device(s) 136) of FIG. 1.

Coded instructions 2030 including the above-described machine-readable instructions and/or operations of FIGS. 11-19 may be stored in the local memory 2004, in the volatile memory 2008, in the non-volatile memory 2010, on the mass storage device(s) 2014, and/or on a removable non-transitory computer-readable storage medium such as a flash memory stick, a dongle, a CD, a DVD, or a Blu-ray disk.

The following paragraphs provide various examples in relation to the disclosed hopper lighting for pellet grills.

Example 1 includes a pellet grill. In Example 1, the pellet grill includes a hopper, a lighting module, and a controller. The hopper includes a pellet fuel storage compartment. The pellet fuel storage compartment is configured to contain pellet fuel. The lighting module includes a light source. The light source is configured to display light into, onto, or across the pellet fuel storage compartment when the light source is activated. The controller is configured to activate the light source in response to detecting an occurrence of an activation triggering event.

Example 2 includes the pellet grill of Example 1. In Example 2, detecting the occurrence of the activation triggering event includes determining that a control system of the pellet grill is in an ON state or that the control system has initiated a startup sequence.

Example 3 includes the pellet grill of Example 1. In Example 3, detecting the occurrence of the activation triggering event includes determining that a switch of the pellet grill is in an ON state.

Example 4 includes the pellet grill of Example 1. In Example 4, detecting the occurrence of the activation triggering event includes determining that a lighting activation request has been received via a user interface or a network interface of the pellet grill.

Example 5 includes the pellet grill of Example 1. In Example 5, detecting the occurrence of the activation triggering event includes determining that an amount of ambient light detected around an exterior of the pellet grill is below an ambient light threshold.

Example 6 includes the pellet grill of Example 1. In Example 6, the pellet grill further includes a lid coupled to the hopper. The lid is movable between a closed position to cover the pellet fuel storage compartment and an open position to provide access to the pellet fuel storage compartment. In Example 6, detecting the occurrence of the activation triggering event includes detecting a lid opening movement of the lid.

Example 7 includes the pellet grill of Example 1. In Example 7, the controller, in connection with activating the light source, is further configured to compare a level of the pellet fuel contained in the pellet fuel storage compartment to a first fuel level threshold. In response to determining that the level of the pellet fuel is above the first fuel level threshold, the controller is further configured to command the light source to display a first color of light. In response to determining that the level of the pellet fuel is below the first fuel level threshold, the controller is further configured to command the light source to display a second color of light different from the first color of light.

Example 8 includes the pellet grill of Example 7. In Example 8, the controller is further configured to compare the level of the pellet fuel contained in the pellet fuel storage compartment to a second fuel level threshold. In Example 8, the second fuel level threshold is less than the first fuel level threshold. In response to determining that the level of the pellet fuel is below the first fuel level threshold and above the second fuel level threshold, the controller is further configured to command the light source to display the second color of light. In response to determining that the level of the pellet fuel is below the second fuel level threshold, the controller is further configured to command the light source to display a third color of light different from the first color of light and different from the second color of light.

Example 9 includes the pellet grill of Example 7. In Example 9, the light source is a multicolor light-emitting diode (LED).

Example 10 includes the pellet grill of Example 7. In Example 10, the pellet grill further includes a fuel level sensor configured to detect the level of the pellet fuel.

Example 11 includes the pellet grill of Example 10. In Example 11, the fuel level sensor is an infrared sensor.

Example 12 includes the pellet grill of Example 10. In Example 12, the pellet grill further comprises a printed circuit board assembly (PCBA) including a printed circuit board (PCB), the lighting module, and the fuel level sensor.

Example 13 includes the pellet grill of Example 12. In Example 13, the PCBA is located along an interior wall that defines the pellet fuel storage compartment of the hopper.

Example 14 includes the pellet grill of Example 1. In Example 14, the hopper includes a lid and a viewing window. The lid is movable between a closed position to cover the pellet fuel storage compartment and an open position to provide access to the pellet fuel storage compartment. The viewing window is formed in a wall of the hopper. The viewing window is transparent or translucent. The viewing window is configured to enable viewing of light displayed by the light source when the light source is activated, including while the lid of the hopper is in the closed position.

Example 15 includes the pellet grill of Example 1. In Example 15, the controller is further configured to deactivate the light source in response to detecting an occurrence of a deactivation triggering event.

Example 16 includes the pellet grill of Example 15. In Example 16, detecting the occurrence of the deactivation triggering event includes determining that a control system of the pellet grill is in an OFF state or that the control system has initiated a shutdown sequence.

Example 17 includes the pellet grill of Example 15. In Example 17, detecting the occurrence of the deactivation triggering event includes determining that a switch of the pellet grill is in an OFF state.

Example 18 includes the pellet grill of Example 15. In Example 18, detecting the occurrence of the deactivation triggering event includes determining that a lighting deactivation request has been received via a user interface or a network interface of the pellet grill.

Example 19 includes the pellet grill of Example 15. In Example 19, detecting the occurrence of the activation triggering event includes determining that an amount of ambient light detected around an exterior of the pellet grill is above an ambient light threshold.

Example 20 includes the pellet grill of Example 15. In Example 20, the pellet grill further includes a lid coupled to the hopper. The lid is movable between a closed position to cover the pellet fuel storage compartment and an open position to provide access to the pellet fuel storage compartment. In Example 20, detecting the occurrence of the deactivation triggering event includes detecting a lid closing movement of the lid.

Although certain example apparatus, systems, methods, and articles of manufacture have been disclosed herein, the scope of coverage of this patent is not limited thereto. On the contrary, this patent covers all apparatus, systems, methods, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A pellet grill, comprising:
a hopper including a pellet fuel storage compartment, the pellet fuel storage compartment configured to contain pellet fuel;
a lighting module including a light source, the light source configured to display light into, onto, or across the pellet fuel storage compartment when the light source is activated;
a fuel level sensor configured to detect a level of the pellet fuel within the pellet fuel storage compartment; and
a controller operatively coupled to the lighting module and the fuel level sensor, the controller configured to activate the light source in response to detecting an occurrence of an activation triggering event, wherein the controller, in connection with activating the light source, is further configured to:
compare the level of the pellet fuel contained in the pellet fuel storage compartment to a first fuel level threshold;
in response to determining that the level of the pellet fuel is above the first fuel level threshold, command the light source to display a first color of light; and
in response to determining that the level of the pellet fuel is below the first fuel level threshold, command the light source to display a second color of light different from the first color of light.

2. The pellet grill of claim 1, wherein detecting the occurrence of the activation triggering event includes determining that a control system of the pellet grill is in an ON state or that the control system has initiated a startup sequence.

3. The pellet grill of claim 1, wherein detecting the occurrence of the activation triggering event includes determining that a switch of the pellet grill is in an ON state.

4. The pellet grill of claim 1, wherein detecting the occurrence of the activation triggering event includes determining that a lighting activation request has been received via a user interface or a network interface of the pellet grill.

5. The pellet grill of claim 1, wherein detecting the occurrence of the activation triggering event includes determining that an amount of ambient light detected around an exterior of the pellet grill is below an ambient light threshold.

6. The pellet grill of claim 1, further comprising a lid coupled to the hopper, the lid being movable between a closed position to cover the pellet fuel storage compartment and an open position to provide access to the pellet fuel storage compartment, wherein detecting the occurrence of the activation triggering event includes detecting a lid opening movement of the lid.

7. The pellet grill of claim 1, wherein the controller, in connection with activating the light source, is further configured to:
compare the level of the pellet fuel contained in the pellet fuel storage compartment to a second fuel level threshold, the second fuel level threshold being less than the first fuel level threshold;
in response to determining that the level of the pellet fuel is below the first fuel level threshold and above the second fuel level threshold, command the light source to display the second color of light; and
in response to determining that the level of the pellet fuel is below the second fuel level threshold, command the light source to display a third color of light different from the first color of light and different from the second color of light.

8. The pellet grill of claim 1, wherein the light source is a multicolor light-emitting diode (LED).

9. The pellet grill of claim 1, wherein the fuel level sensor is an infrared sensor.

10. The pellet grill of claim 1, further comprising a printed circuit board assembly (PCBA) including a printed circuit board (PCB), the lighting module, and the fuel level sensor.

11. The pellet grill of claim 10, wherein the PCBA is located along an interior wall that defines the pellet fuel storage compartment of the hopper.

12. The pellet grill of claim 1, wherein the hopper includes:
a lid movable between a closed position to cover the pellet fuel storage compartment and an open position to provide access to the pellet fuel storage compartment; and
a viewing window formed in a wall of the hopper, the viewing window being transparent or translucent, the viewing window configured to enable viewing of light displayed by the light source when the light source is activated, including while the lid of the hopper is in the closed position.

13. The pellet grill of claim 1, wherein the controller is further configured to deactivate the light source in response to detecting an occurrence of a deactivation triggering event.

14. The pellet grill of claim 13, wherein detecting the occurrence of the deactivation triggering event includes determining that a control system of the pellet grill is in an OFF state or that the control system has initiated a shutdown sequence.

15. The pellet grill of claim 13, wherein detecting the occurrence of the deactivation triggering event includes determining that a switch of the pellet grill is in an OFF state.

16. The pellet grill of claim 13, wherein detecting the occurrence of the deactivation triggering event includes determining that a lighting deactivation request has been received via a user interface or a network interface of the pellet grill.

17. The pellet grill of claim 13, wherein detecting the occurrence of the activation triggering event includes determining that an amount of ambient light detected around an exterior of the pellet grill is above an ambient light threshold.

18. The pellet grill of claim 13, further comprising a lid coupled to the hopper, the lid being movable between a closed position to cover the pellet fuel storage compartment and an open position to provide access to the pellet fuel storage compartment, wherein detecting the occurrence of the deactivation triggering event includes detecting a lid closing movement of the lid.

19. A pellet grill, comprising:
a hopper including a pellet fuel storage compartment, the pellet fuel storage compartment configured to contain pellet fuel;
a lighting module including a light source, the light source configured to display light into, onto, or across the pellet fuel storage compartment when the light source is activated;
an ambient light sensor configured to detect an amount of ambient light around an exterior of the pellet grill; and
a controller operatively coupled to the lighting module and the ambient light sensor, the controller configured to activate the light source in response to determining that the amount of ambient light detected around the exterior of the pellet grill is below an ambient light threshold.

20. The pellet grill of claim 19, wherein the controller is further configured to deactivate the light source in response to determining that the amount of ambient light detected around the exterior of the pellet grill is above the ambient light threshold.

21. A pellet grill, comprising:
a hopper including a pellet fuel storage compartment, the pellet fuel storage compartment configured to contain pellet fuel;
a lighting module including a light source, the light source configured to display light into, onto, or across the pellet fuel storage compartment when the light source is activated;
a fuel level sensor configured to detect a level of the pellet fuel within the pellet fuel storage compartment; and
a controller operatively coupled to the lighting module and the fuel level sensor, the controller configured to activate the light source in response to detecting an occurrence of an activation triggering event, wherein the controller, in connection with activating the light source, is further configured to command the light source to display a color of light determined based on a comparison of the level of the pellet fuel contained in the pellet fuel storage compartment to a fuel level threshold, wherein the color of light displayed by the light source differs depending on whether the level of the pellet fuel contained in the pellet fuel storage compartment is above or below the fuel level threshold.

* * * * *